(12) United States Patent
Shiga et al.

(10) Patent No.: US 10,099,089 B2
(45) Date of Patent: Oct. 16, 2018

(54) GOLF BALL RESIN COMPOSITION AND GOLF BALL

(71) Applicant: Dunlop Sports Co., Ltd., Kobe-shi, Hyogo (JP)

(72) Inventors: Kazuyoshi Shiga, Kobe (JP); Masanori Taguchi, Kobe (JP); Takahiro Shigemitsu, Kobe (JP); Shoichi Kutsumizu, Gifu (JP); Yohei Miwa, Gifu (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/354,464

(22) Filed: Nov. 17, 2016

(65) Prior Publication Data

US 2017/0136309 A1     May 18, 2017

(30) Foreign Application Priority Data

Nov. 18, 2015 (JP) .................. 2015-225654
Nov. 18, 2015 (JP) .................. 2015-225655
Nov. 18, 2015 (JP) .................. 2015-225656
Nov. 18, 2015 (JP) .................. 2015-225657

(51) Int. Cl.

| C08K 5/19 | (2006.01) |
|---|---|
| C08K 5/09 | (2006.01) |
| A63B 37/00 | (2006.01) |
| C08F 210/02 | (2006.01) |
| C08K 5/098 | (2006.01) |
| C08K 5/14 | (2006.01) |

(52) U.S. Cl.
CPC ...... *A63B 37/0039* (2013.01); *A63B 37/0004* (2013.01); *A63B 37/0045* (2013.01); *A63B 37/0075* (2013.01); *C08F 210/02* (2013.01); *C08K 5/09* (2013.01); *C08K 5/19* (2013.01); *C08F 2500/12* (2013.01); *C08F 2800/20* (2013.01); *C08K 5/098* (2013.01); *C08K 5/14* (2013.01)

(58) Field of Classification Search
None
See application file for complete search history.

(56) References Cited

U.S. PATENT DOCUMENTS

| 2009/0118040 A1* | 5/2009 | De Garavilla ........... C08K 5/09 473/373 |
|---|---|---|
| 2010/0048327 A1* | 2/2010 | Bulpett .............. A63B 37/0038 473/374 |
| 2012/0165120 A1 | 6/2012 | Shiga et al. |
| 2012/0165121 A1 | 6/2012 | Shiga et al. |
| 2012/0196699 A1* | 8/2012 | De Garavilla ..... A63B 37/0003 473/342 |
| 2013/0079178 A1 | 3/2013 | Shiga et al. |
| 2015/0057103 A1 | 2/2015 | Shiga et al. |

FOREIGN PATENT DOCUMENTS

| JP | 2012-139320 A | 7/2012 |
|---|---|---|
| JP | 2012-139321 A | 7/2012 |
| JP | 2013-78563 A | 5/2013 |
| JP | 2015-39543 A | 3/2015 |

* cited by examiner

*Primary Examiner* — David J Buttner
(74) *Attorney, Agent, or Firm* — Birch, Stewart, Kolasch & Birch LLP

(57) ABSTRACT

An object of the present invention is to provide a golf ball resin composition having an excellent rebound resilience. The present invention provides a golf ball resin composition containing an ionomer resin as a resin component. In a DSC measurement (a measuring atmosphere: a nitrogen atmosphere, a measuring temperature range: from −50° C. to 150° C., and a temperature rising rate: 10° C./min) of the golf ball resin composition of the first embodiment, a first endothermic peak and a second endothermic peak appear, and a peak top temperature (Ti) of the first endothermic peak is equal to or lower than a peak top temperature (Tm) of the second endothermic peak and the peak top temperature (Ti) ranges from 60° C. to 70° C.

20 Claims, 15 Drawing Sheets

GOLF BALL RESIN COMPOSITION AND GOLF BALL

This application is based on Japanese patent applications No. 2015-225654, No. 2015-225655, No. 2015-225656 and No. 2015-225657, filed on Nov. 18, 2015, the contents of which are hereby incorporated by reference.

FIELD OF THE INVENTION

The present invention relates to a golf ball resin composition containing an ionomer resin.

DESCRIPTION OF THE RELATED ART

Examples of a golf ball construction include a two-piece golf ball comprising a core and a cover; a three-piece golf ball comprising a core, one intermediate layer covering the core, and a cover covering the intermediate layer; and a multi-piece golf ball comprising a core, at least two intermediate layers covering the core, and a cover covering the intermediate layers. Examples of a material constituting each layer of the golf ball include an ionomer resin. The ionomer resin has high stiffness, and thus a golf ball travelling a great flight distance is obtained if the ionomer resin is used for a golf ball constituent member. Therefore, the ionomer resin is widely used as a material constituting the intermediate layer or cover of the golf ball.

For example, Japanese Patent Publication No. 2012-139320 A discloses a golf ball resin composition, wherein a storage elastic modulus E' (Pa) and a loss elastic modulus E" (Pa) satisfy $\log(E'/E''^2) \geq -6.08$ when measured at the conditions of an oscillation frequency of 10 Hz, a temperature of 12° C. and a measuring strain of 0.05% in a tensile mode using a dynamic viscoelasticity apparatus. Japanese Patent Publication No. 2012-139321 A discloses a golf ball resin composition having a spin-lattice relaxation time (T1) of $^{13}C$ nucleus measured by a high resolution solid state carbon nuclear magnetic resonance method (NMR method) of 7.3 seconds or shorter.

Japanese Patent Publication No. 2013-78563 A discloses a golf ball resin composition containing (A) at least one selected from the group consisting of (a-1) a binary copolymer composed of an olefin and an α,β-unsaturated carboxylic acid having 3 to 8 carbon atoms, (a-2) a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) a metal ion-neutralized product of a ternary copolymer composed of an olefin, an α,β-unsaturated carboxylic acid having 3 to 8 carbon atoms and an α,β-unsaturated carboxylic acid ester; and (B) a compound having a hydrocarbon chain, a cationic moiety and an anionic moiety in the molecule.

Japanese Patent Publication No. 2015-39543 A discloses a golf ball resin composition containing (A) at least one selected from the group consisting of (a-1) a binary copolymer composed of an olefin and an α,β-unsaturated carboxylic acid having 3 to 8 carbon atoms, (a-2) a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) a metal ion-neutralized product of a ternary copolymer composed of an olefin, an α,β-unsaturated carboxylic acid having 3 to 8 carbon atoms and an α,β-unsaturated carboxylic acid ester; (B) a compound having an unsaturated hydrocarbon chain, a cationic moiety and an anionic moiety in the molecule; and (C) an unsaturated fatty acid.

SUMMARY OF THE INVENTION

As described above, various golf ball resin compositions using the ionomer resin have been proposed. However, there is still room for improvement in resilience. The present invention has been achieved in view of the above problems, and an object of the present invention is to provide a golf ball resin composition having excellent rebound resilience.

The golf ball resin composition of the first embodiment which has solved the above problem contains (A1) a metal ion-neutralized product of a binary copolymer composed of an olefin and an α,β-unsaturated carboxylic acid having 3 to 8 carbon atoms, and/or (A2) a metal ion-neutralized product of a ternary copolymer composed of an olefin, an α,β-unsaturated carboxylic acid having 3 to 8 carbon atoms and an α,β-unsaturated carboxylic acid ester as a resin component, wherein in a DSC measurement (a measuring atmosphere: a nitrogen atmosphere, a measuring temperature range: from −50° C. to 150° C., and a temperature rising rate: 10° C./min) of the golf ball resin composition, a first endothermic peak and a second endothermic peak appear, and a peak top temperature (Ti) of the first endothermic peak is equal to or lower than a peak top temperature (Tm) of the second endothermic peak and the peak top temperature (Ti) ranges from 60° C. to 70° C.

The golf ball resin composition of the second embodiment which has solved the above problem contains an ionomer resin as a resin component, wherein a constrained layer of an ion association of the golf ball resin composition has an average thickness ranging from 0.04 nm to 0.50 nm, measured by an X-ray small angle scattering method.

The golf ball resin composition of the third embodiment which has solved the above problem contains an ionomer resin as a resin component, wherein a hyperfine coupling constant ($A_{zz}$) of the golf ball resin composition ranges from 31.6 G to 35.0 G, measured by a spin probe-electron spin resonance method (spin probe: 5-doxylstearic acid).

The golf ball resin composition of the fourth embodiment which has solved the above problem contains an ionomer resin as a resin component, wherein a constrained layer of an ion association of the golf ball resin composition has an average thickness ranging from 3.0 Å to 9.0 Å, measured by a temperature variable spin probe-electron spin resonance method.

According to the present invention, a golf ball having excellent resilience is obtained.

DESCRIPTION OF THE PREFERRED EMBODIMENT

[Golf Ball Resin Composition]

Figure 1:
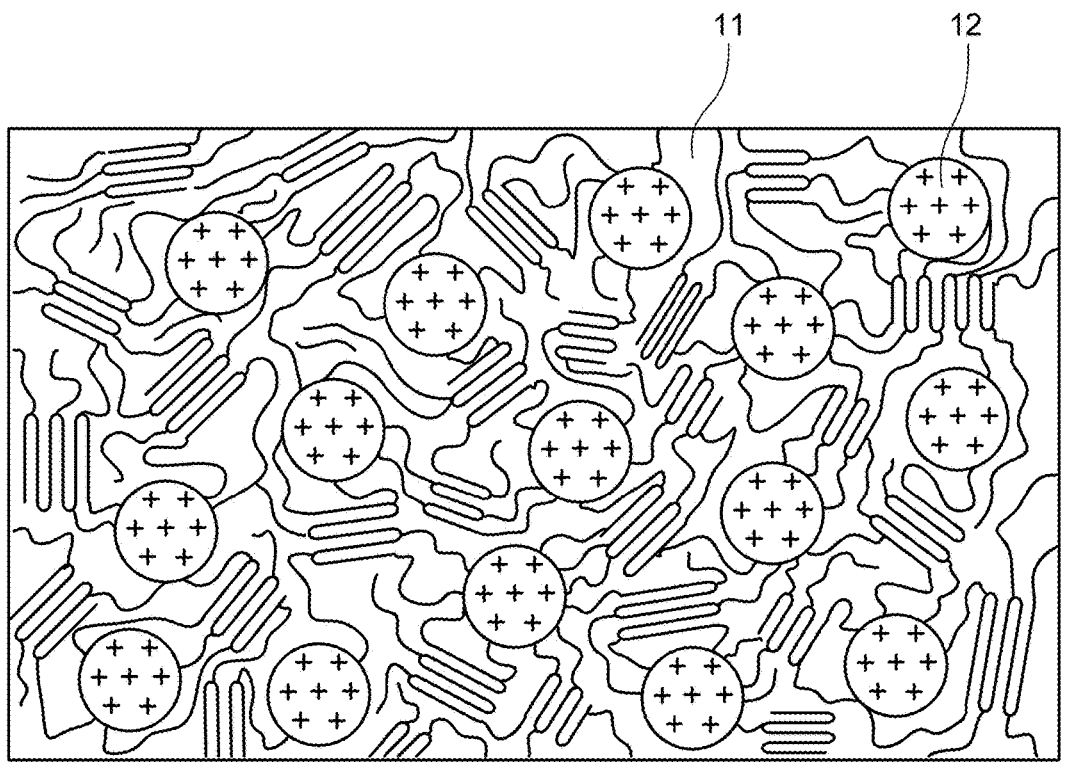
FIG. 1 is a schematic diagram of an interior structure of an ionomer resin.

The golf ball resin composition contains an ionomer resin as a resin component. Examples of the ionomer resin include an olefin-based ionomer resin, a urethane-based ionomer resin, a styrene-based ionomer resin, and a mixture thereof. As the ionomer resin, the olefin-based ionomer resin is preferable.

As the olefin-based ionomer resin, (A1) a metal ion-neutralized product of a binary copolymer composed of an olefin and an α,β-unsaturated carboxylic acid having 3 to 8 carbon atoms (hereinafter sometimes referred to as "(A1) a binary ionomer resin"), and/or (A2) a metal ion-neutralized product of a ternary copolymer composed of an olefin, an α,β-unsaturated carboxylic acid having 3 to 8 carbon atoms and an α,β-unsaturated carboxylic acid ester (hereinafter sometimes referred to as "(A2) a ternary ionomer resin") is preferable. (A1) The binary ionomer resin and (A2) the ternary ionomer resin are ionomer resins obtained by neutralizing carboxyl groups of the copolymers with a metal ion.

The olefin is preferably an olefin having 2 to 8 carbon atoms. Examples of the olefin include ethylene, propylene, butene, pentene, hexene, heptene and octene, and ethylene is preferable. Examples of the α,β-unsaturated carboxylic acid having 3 to 8 carbon atoms include acrylic acid, methacrylic acid, fumaric acid, maleic acid and crotonic acid, and acrylic acid or methacrylic acid is preferable.

As the α,β-unsaturated carboxylic acid ester, an alkyl ester of an α,β-unsaturated carboxylic acid having 3 to 8 carbon atoms is preferable, an alkyl ester of acrylic acid, methacrylic acid, fumaric acid or maleic acid is more preferable, an alkyl ester of acrylic acid or an alkyl ester of methacrylic acid is particularly preferable. Examples of the alkyl ester include methyl ester, ethyl ester, propyl ester, n-butyl ester, and isobutyl ester.

As (A1) the binary ionomer resin, a metal ion-neutralized product of a binary copolymer composed of ethylene and (meth)acrylic acid is preferable. As (A2) the ternary ionomer resin, a metal ion-neutralized product of a ternary copolymer composed of ethylene, (meth)acrylic acid and (meth)acrylic acid ester is preferable. Here, (meth)acrylic acid means acrylic acid and/or methacrylic acid.

In the binary copolymer constituting (A1) the binary ionomer resin and the ternary copolymer constituting (A2) the ternary ionomer resin, the amount of the α,β-unsaturated carboxylic acid component having 3 to 8 carbon atoms is preferably 4 mass % or more, more preferably 6 mass % or more, even more preferably 8 mass % or more, and is preferably 50 mass % or less, more preferably 30 mass % or less, even more preferably 20 mass % or less, particularly preferably 15 mass % or less. If the amount of the α,β-unsaturated carboxylic acid component having 3 to 8 carbon atoms is 4 mass % or more, the ionomer resin has a higher rebound resilience, and if the amount of the α,β-unsaturated carboxylic acid component having 3 to 8 carbon atoms is 50 mass % or less, the ionomer resin has a better flexibility.

Examples of the metal ion neutralizing at least a part of carboxyl groups of (A1) the binary ionomer resin and/or (A2) the ternary ionomer resin include a monovalent metal ion such as sodium, potassium, lithium and the like; a divalent metal ion such as magnesium, calcium, zinc, barium, cadmium and the like; a trivalent metal ion such as aluminum and the like; and other ion such as tin, zirconium and the like. It is preferred that (A1) the binary ionomer resin and (A2) the ternary ionomer resin are neutralized with at least one metal ion selected from the group consisting of $Na^+$, $Mg^{2+}$, $Ca^{2+}$, and $Zn^{2+}$.

The resin component may further contain other thermoplastic resin than the ionomer resin. In this case, the amount of the ionomer resin in the resin component is preferably 50 mass % or more, more preferably 60 mass % or more, even more preferably 70 mass % or more. It is also preferred that the resin component consists of the ionomer resin. In particular, it is also preferred that the resin component consists of (A1) the binary ionomer resin and/or (A2) the ternary ionomer resin.

Examples of the other thermoplastic resin include thermoplastic resins such as a thermoplastic olefin copolymer, a thermoplastic polyurethane, a thermoplastic polyamide, a thermoplastic styrene-based resin, a thermoplastic polyester, a thermoplastic acrylic resin, a thermoplastic polyolefin, a thermoplastic polydiene, and a thermoplastic polyether.

The golf ball resin composition may further contain a pigment component such as a white pigment (e.g. titanium oxide) and a blue pigment, a weight adjusting agent, a dispersant, an antioxidant, an ultraviolet absorber, a light stabilizer, a fluorescent material or a fluorescent brightener, as long as they do not impair the performance of the golf ball.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component. If the amount of the white pigment is 0.5 part by mass or more, it is possible to impart the opacity to the resultant golf ball constituent member. In addition, if the amount of the white pigment is 10 parts by mass or less, lowering in the durability of the resultant golf ball may be suppressed.

It is preferred that the golf ball resin composition is obtained by mixing a copolymer composition and (c) a metal compound. The copolymer composition contains a copolymer having a carboxyl group or sulfo group in the molecule and/or a metal ion-neutralized product thereof as a resin component, and further contains at least one selected from the group consisting of (b1) a betaine type amphoteric surfactant, (b2) a saturated fatty acid, and (b3) an unsaturated fatty acid. If the copolymer composition containing the resin component and at least one selected from the group consisting of the component (b1), the component (b2) and the component (b3) is blended with (c) the metal compound, the ionomer resin having a structure in which the component (b1), the component (b2) and/or the component (b3) is taken into the ion association is obtained.

Examples of the copolymer having a carboxyl group or sulfo group in the molecule and/or the metal ion-neutralized product thereof include at least one selected from the group consisting of (a1-1) a binary copolymer composed of an olefin and an α,β-unsaturated carboxylic acid having 3 to 8 carbon atoms, (a1-2) a metal ion-neutralized product of a binary copolymer composed of an olefin and an α,β-unsaturated carboxylic acid having 3 to 8 carbon atoms, (a2-1) a ternary copolymer composed of an olefin, an α,β-unsaturated carboxylic acid having 3 to 8 carbon atoms and an α,β-unsaturated carboxylic acid ester, and (a2-2) a metal ion-neutralized product of a ternary copolymer composed of an olefin, an α,β-unsaturated carboxylic acid having 3 to 8 carbon atoms and an α,β-unsaturated carboxylic acid ester.

(a1-1) The binary copolymer composed of an olefin and an α,β-unsaturated carboxylic acid having 3 to 8 carbon atoms (hereinafter sometimes referred to as "(a1-1) the binary copolymer") and/or (a2-1) the ternary copolymer composed of an olefin, an α,β-unsaturated carboxylic acid having 3 to 8 carbon atoms and an α,β-unsaturated carboxylic acid ester (hereinafter sometimes referred to as "(a2-1) the ternary copolymer") is a nonionic copolymer wherein carboxyl groups thereof are not neutralized.

The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred.

As (a1-1) the binary copolymer, a binary copolymer composed of ethylene and (meth)acrylic acid is preferable. As (a2-1) the ternary copolymer, a ternary copolymer composed of ethylene, (meth)acrylic acid and (meth)acrylic acid ester is preferable.

In (a1-1) the binary copolymer and (a2-1) the ternary copolymer, the amount of the α,β-unsaturated carboxylic acid component having 3 to 8 carbon atoms is preferably 4 mass % or more, more preferably 6 mass % or more, even more preferably 8 mass % or more, and is preferably 50 mass % or less, more preferably 30 mass % or less, even more preferably 20 mass % or less, particularly preferably 15 mass % or less.

The MFR (190° C., 2.16 kgf) of (a1-1) the binary copolymer and (a2-1) the ternary copolymer is preferably 5 g/10 min or more, more preferably 10 g/10 min or more, even more preferably 15 g/10 min or more, and is preferably 1700 g/10 min or less, more preferably 1500 g/10 min or less, even more preferably 1300 g/10 min or less.

Examples of (a1-1) the binary copolymer include Nucrel (registered trademark) N1050H, N1560, N2050H, N2060, N1108C, N0908C, N1110H, N0200H (available from Mitsui-Du Pont Polychemicals Co., Ltd.); and PRIMACOR (registered trademark) 5980I (available from Dow Chemical Company). Examples of (a2-1) the ternary copolymer include Nucrel AN4318, AN4319 (available from Mitsui-Du Pont Polychemicals Co., Ltd.); and PRIMACOR AT310, AT320 (available from Dow Chemical Company). (a1-1) The binary copolymer and (a2-1) the ternary copolymer may be used solely, or at least two of them may be used in combination.

Examples of (a1-2) the metal ion-neutralized product of a binary copolymer composed of an olefin and an α,β-unsaturated carboxylic acid having 3 to 8 carbon atoms (hereinafter sometimes referred to as "(a1-2) the binary ionomer resin"), and (a2-2) the metal ion-neutralized product of a ternary copolymer composed of an olefin, an α,β-unsaturated carboxylic acid having 3 to 8 carbon atoms and an α,β-unsaturated carboxylic acid ester (hereinafter sometimes referred to as "(a2-2) the ternary ionomer resin") include a product obtained by neutralizing carboxyl groups of (a1-1) the binary copolymer or (a2-1) the ternary copolymer with a metal ion.

Examples of the metal ion include a monovalent metal ion such as sodium, potassium, lithium and the like; a divalent metal ion such as magnesium, calcium, zinc, barium, cadmium and the like; a trivalent metal ion such as aluminum and the like; and other ion such as tin, zirconium and the like. It is preferred that (a1-2) the binary ionomer resin and (a2-2) the ternary ionomer resin are neutralized with at least one metal ion selected from the group consisting of $Na^+$, $Mg^{2+}$, $Ca^{2+}$, and $Zn^{2+}$.

The neutralization degree of the carboxyl group of (a1-2) the binary ionomer resin and (a2-2) the ternary ionomer resin is preferably 10 mole % or more, more preferably 15 mole % or more, even more preferably 18 mole % or more. If the neutralization degree is 10 mole % or more, the resultant golf ball resin composition has a further enhanced rebound resilience. The upper limit of the neutralization degree is preferably, without any limitation, 100 mole %, more preferably 80 mole %, even more preferably 60 mole %. It is noted that the neutralization degree of the carboxyl group of the ionomer resin may be calculated by the following expression.

Neutralization degree of ionomer resin (mole %)=100×(mole number of neutralized carboxyl groups in copolymer/mole number of all carboxyl groups in copolymer)

Examples of (a1-2) the binary ionomer resin include Himilan (registered trademark) 1555 (Na), 1557 (Zn), 1605 (Na), 1706 (Zn), 1707 (Na), AM7311 (Mg), AM7329 (Zn) (available from Mitsui-Du Pont Polychemicals Co., Ltd.); Surlyn (registered trademark) 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li) (available from E.I. du Pont de Nemours and Company); and Iotek (registered trademark) 8000 (Na), 8030 (Na), 7010 (Zn), 7030 (Zn) (available from ExxonMobil Chemical Corporation).

Examples of (a2-2) the ternary ionomer resin include Himilan AM7327 (Zn), 1855 (Zn), 1856 (Na), AM7331 (Na) (available from Mitsui-Du Pont Polychemicals Co., Ltd.); Surlyn 6320 (Mg), 8120 (Na), 8320 (Na), 9320 (Zn), 9320W (Zn), HPF1000 (Mg), HPF2000 (Mg) (available from E.I. du Pont de Nemours and Company); and Iotek 7510 (Zn), 7520 (Zn) (available from ExxonMobil Chemical Corporation).

The resin component of the copolymer composition may further contain other thermoplastic resin than (a1-1) the binary copolymer, (a1-2) the binary ionomer resin, (a2-1) the ternary copolymer and (a2-2) the ternary ionomer resin.

In this case, the total amount of (a1-1) the binary copolymer, (a1-2) the binary ionomer resin, (a2-1) the ternary copolymer and (a2-2) the ternary ionomer resin in the resin component is preferably 50 mass % or more, more preferably 60 mass % or more, even more preferably 70 mass % or more. It is also preferred that the resin component consists of (a1-1) the binary copolymer, (a1-2) the binary ionomer resin, (a2-1) the ternary copolymer and/or (a2-2) the ternary ionomer resin. It is also preferred that the resin component consists of (a1-1) the binary copolymer and/or (a2-1) the ternary copolymer.

Examples of the other thermoplastic resin include thermoplastic resins such as a thermoplastic olefin copolymer, a thermoplastic polyurethane, a thermoplastic polyamide, a thermoplastic styrene-based resin, a thermoplastic polyester, a thermoplastic acrylic resin, a thermoplastic polyolefin, a thermoplastic polydiene, and a thermoplastic polyether.

Specific examples of (b1) the betaine type amphoteric surfactant include alkyldimethylaminoacetic acid betaine (the general formula (1)), alkyldihydroxyalkylaminoacetic acid betaine (the general formula (2)), alkylamidoalkylbetaine (the general formula (3)), alkylhydroxysulfobetaine (the general formula (4)), and alkylcarboxymethylhydroxyethylimidazolinium betaine (the general formula (5)).

[Chemical formula 1]

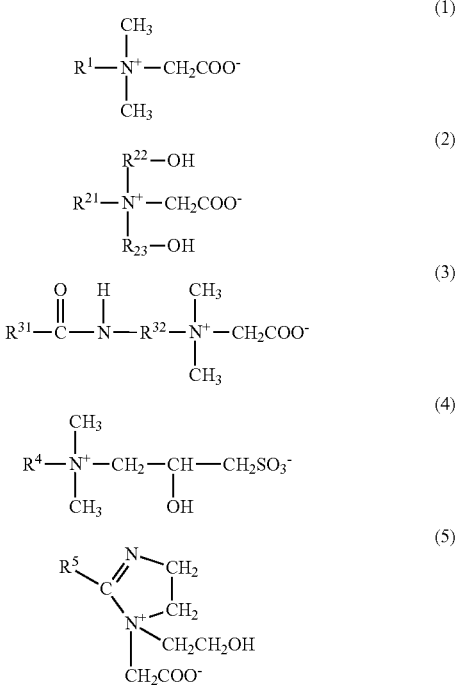

In the formula (1), $R^1$ represents an alkyl group having 8 to 24 carbon atoms or an alkenyl group having 8 to 24 carbon atoms. In the formula (2), $R^{21}$ represents an alkyl group having 8 to 24 carbon atoms or an alkenyl group having 8 to 24 carbon atoms, and $R^{22}$ and $R^{23}$ independently represent an alkylene group having 1 to 3 carbon atoms. In the formula (3), $R^{31}$ represents an alkyl group having 8 to 24 carbon atoms or an alkenyl group having 8 to 24 carbon atoms, and $R^{32}$ represents an alkylene group having 1 to 5 carbon atoms. In the formula (4), $R^4$ represents an alkyl group having 8 to 24 carbon atoms or an alkenyl group having 8 to 24 carbon atoms. In the formula (5), $R^5$ represents an alkyl group having 8 to 24 carbon atoms or an alkenyl group having 8 to 24 carbon atoms.

The alkyl group having 8 to 24 carbon atoms may be a linear alkyl group or a branched alkyl group. Examples of the alkyl group having 8 to 24 carbon atoms include an octyl group, nonyl group, decyl group, undecyl group, dodecyl group, tridecyl group, tetradecyl group, pentadecyl group, hexadecyl group, heptadecyl group, octadecyl group, nonadecyl group, icosyl group, henicosyl group, docosyl group, tricosyl group, and tetracosyl group. In the case that the alkyl group having 8 to 24 carbon atoms is a branched alkyl group, the alkyl group preferably has 3 or less branched chains. The linear alkyl group having 8 to 24 carbon atoms is preferable.

The alkenyl group having 8 to 24 carbon atoms may be a linear alkyl group or a branched alkyl group. Examples of the alkenyl group having 8 to 24 carbon atoms include an octenyl group, nonenyl group, decenyl group, undecenyl group, dodecenyl group, tridecenyl group, tetradecenyl group, pentadecenyl group, hexadecenyl group, heptadecenyl group, octadecenyl group, nonadecenyl group, icosenyl group, henicosenyl group, docosenyl group, tricosenyl group, and tetracosenyl group. Examples of the alkylene group having 1 to 3 carbon atoms include a methylene group, ethylene group, propylene group. Examples of the alkylene group having 1 to 5 carbon atoms include a methylene group, ethylene group, propylene group, butylene group, and pentylene group.

Examples of the alkyldimethylaminoacetic acid betaine include lauryldimethylaminoacetic acid betaine, oleyldimethylaminoacetic acid betaine, and stearyldimethylaminoacetic acid betaine.

Examples of the alkyldihydroxyalkylaminoacetic acid betaine include stearyldihydroxymethylaminoacetic acid betaine, stearyldihydroxyethylaminoacetic acid betaine, lauryldihydroxymethylaminoacetic acid betaine, lauryldihydroxyethylaminoacetic acid betaine, myristyldihydroxymethylaminoacetic acid betaine, behenyldihydroxymethylaminoacetic acid betaine, palmityldihydroxyethylaminoacetic acid betaine, and oleyldihydroxymethylaminoacetic acid betaine.

Examples of the alkylamidoalkylbetaine include coconut oil fatty acid amidopropylaminoacetic acid betaine, and lauric acid amidopropylaminoacetic acid betaine. Examples of the alkylhydroxysulfobetaine include lauric acid amidopropylhydroxysulfobetaine, and coconut oil fatty acid amidodialkylhydroxyalkylsulfobetaine. Examples of the alkylcarboxymethylhydroxyethylimidazolinium betaine include 2-alkyl-N-carboxymethyl-N-hydroxyethylimidazolinium betaine.

In the case that (b1) the betaine type amphoteric surfactant is contained, the amount of the component (b1) in the copolymer composition is preferably 1 part by mass or more, more preferably 3 parts by mass or more, even more preferably 5 parts by mass or more, and is preferably 80 parts by mass or less, more preferably 30 parts by mass or less, even more preferably 20 parts by mass or less, with respect to 100 parts by mass of the resin component. If the amount of the component (b1) is 1 part by mass or more, the golf ball resin composition has a further enhanced rebound resilience, and if the amount of the component (b1) is 80 parts by mass or less, the golf ball resin composition has a further enhanced rebound resilience since the golf ball resin composition less deforms when an external force is loaded thereto and the energy loss due to the excessive deformation is suppressed.

(b2) The saturated fatty acid is not particularly limited, as long as (b2) the saturated fatty acid is a fatty acid not having an unsaturated bond in the hydrocarbon chain. The saturated fatty acid may be a linear saturated fatty acid or a branched saturated fatty acid, and the linear saturated fatty acid is preferred since it has a higher affinity to the polyolefin chain moiety of the resin component which is a base resin. In addition, in the case that the saturated fatty acid is a branched saturated fatty acid, the saturated fatty acid preferably has 3 or less branched chains.

(b2) The saturated fatty acid is preferably, but not particularly limited to, a saturated fatty acid having 4 to 30 carbon atoms, more preferably a saturated fatty acid having 12 to 30 carbon atoms, even more preferably a saturated fatty acid having 16 to 30 carbon atoms.

Specific examples of (b2) the saturated fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of (b2) the saturated fatty acid (common name) include butyric acid (C4), valeric acid (C5), caproic acid (C6), enanthic acid (C7), caprylic acid (C8), pelargonic acid (C9), capric acid (C10), lauric acid (C12), myristic acid (C14), pentadecylic acid (C15), palmitic acid (C16), margaric acid (C17), stearic acid (C18), arachidic acid (C20), behenic acid (C22), lignoceric acid (C24), cerotic acid (C26), montanic acid (C28), and melissic acid (C30).

(b2) The saturated fatty acid may be used solely, or at least two of them may be used in combination. Among them, preferable examples of (b2) the saturated fatty acid include palmitic acid, stearic acid, arachidic acid, behenic acid, lignoceric acid and montanic acid.

In the case that (b2) the saturated fatty acid is contained, the amount of the component (b2) in the copolymer composition is preferably 10 parts by mass or more, more preferably 20 parts by mass or more, even more preferably 30 parts by mass or more, and is preferably 150 parts by mass or less, more preferably 100 parts by mass or less, even more preferably 90 parts by mass or less, with respect to 100 parts by mass of the resin component. If the amount of the component (b2) is 10 parts by mass or more, the golf ball resin composition has a further enhanced rebound resilience, and if the amount of the component (b2) is 150 parts by mass or less, the constituent member formed from the golf ball resin composition has a better durability.

(b3) The unsaturated fatty acid is not particularly limited, as long as (b3) the unsaturated fatty acid is a fatty acid having at least one unsaturated bond in the hydrocarbon chain. Examples of the unsaturated bond include a carbon-carbon double bond and a carbon-carbon triple bond, and the carbon-carbon double bond is preferred since the molecular chain easily bends. In addition, examples of the carbon-carbon double bond include a cis-double bond and a trans-double bond, and the cis-double bond is more preferred.

(b3) The unsaturated fatty acid is preferably, but not particularly limited to, an unsaturated fatty acid having 4 to 30 carbon atoms, more preferably an unsaturated fatty acid having 12 to 30 carbon atoms.

Specific examples of (b3) the unsaturated fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of (b3) the unsaturated fatty acid (common name) include myristoleic acid (C14), palmitoleic acid (C16), stearidonic acid (C18), elaidic acid (C18), vaccenic acid (C18), oleic acid (C18), linoleic acid (C18), linolenic acid (C18), elaidic acid (C18), gadoleic acid (C20), arachidonic acid (C20), eicosenoic acid (C20), eicosapentaenoic acid (C20), eicosadienoic acid (C20), docosahexaenoic acid (C22), erucic acid (C22), and nervonic acid (C24).

The unsaturated fatty acid may be used solely, or at least two of them may be used in combination. Among them, preferable examples of (b3) the unsaturated fatty acid include palmitoleic acid, oleic acid, linoleic acid, and arachidonic acid.

In the case that (b3) the unsaturated fatty acid is contained, the amount of the component (b3) in the copolymer composition is preferably 10 parts by mass or more, more preferably 30 parts by mass or more, even more preferably 50 parts by mass or more, and is preferably 200 parts by mass or less, more preferably 130 parts by mass or less, even more preferably 100 parts by mass or less, with respect to 100 parts by mass of the resin component. If the amount of the component (b3) is 10 parts by mass or more, the golf ball resin composition has a further enhanced rebound resilience, and if the amount of the component (b3) is 200 parts by mass or less, the constituent member formed from the golf ball resin composition has a better durability.

Examples of the copolymer composition include an embodiment containing the resin component and the component (b1) but not containing the component (b2) and the component (b3); an embodiment containing the resin component and the component (b2) but not containing the component (b1) and the component (b3); an embodiment containing the resin component and the component (b3) but not containing the component (b1) and the component (b2); an embodiment containing the resin component, the component (b1) and the component (b2) but not containing the component (b3); an embodiment containing the resin component, the component (b1) and the component (b3) but not containing the component (b2); an embodiment containing the resin component, the component (b2) and the component (b3) but not containing the component (b1); and an embodiment containing the resin component, the component (b1), the component (b2) and the component (b3).

In the case that the copolymer composition contains (b2) the saturated fatty acid and (b3) the unsaturated fatty acid, the total amount of (b2) the saturated fatty acid and (b3) the unsaturated fatty acid is preferably 10 parts by mass or more, more preferably 30 parts by mass or more, even more preferably 50 parts by mass or more, and is preferably 200 parts by mass or less, more preferably 150 parts by mass or less, even more preferably 130 parts by mass or less, with respect to 100 parts by mass of the resin component. If the total amount is 10 parts by mass or more, the golf ball resin composition has a further enhanced rebound resilience, and if the total amount is 200 parts by mass or less, the constituent member formed from the golf ball resin composition has a better durability.

In the case that the copolymer composition contains (b2) the saturated fatty acid and (b3) the unsaturated fatty acid, the mass ratio ((b2)/(b3)) of (b2) the saturated fatty acid to (b3) the unsaturated fatty acid is preferably 0.03 or more, more preferably 0.10 or more, even more preferably 0.25 or more, and is preferably 4.0 or less, more preferably 2.0 or less, even more preferably 1.0 or less. If the mass ratio ((b2)/(b3)) is 0.03 or more, a better balance is stricken between the flexibility improvement effect derived from (b3) the unsaturated fatty acid and the hardness improvement effect of the constrained region surrounding the ion association derived from (b2) the saturated fatty acid, and if the mass ratio ((b2)/(b3)) is 4.0 or less, the flexibility improvement effect derived from (b3) the unsaturated fatty acid is greater.

(c) The metal compound is employed to neutralize unneutralized carboxyl groups of the golf ball resin composition, and may be added where necessary. Examples of the metal ion included in (c) the metal compound include a monovalent metal ion such as sodium, potassium, lithium and the like; a divalent metal ion such as magnesium, calcium, zinc, barium, cadmium and the like; a trivalent metal ion such as aluminum and the like; and other ion such as tin, zirconium and the like. Among them, the monovalent or divalent metal ion is preferable.

Examples of (c) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (c) The metal compound may be used solely, or at least two of them may be used in combination.

The amount of (c) the metal compound can be appropriately adjusted according to the desirable total neutralization degree of the golf ball resin composition. The total neutralization degree is defined by the following formula.

Total neutralization degree (mole %)=100×[Σ(mole number of cation component in resin composition×valence of cation component in resin composition)]/[Σ(mole number of anion component in resin composition×valence of anion component in resin composition)]   [Mathematical formula 1]

In the formula, Σ(mole number of cation component in resin composition×valence of cation component in resin composition) is a sum of a product obtained by multiplying the mole number of the cation-forming group by the valence of the cation-forming group in (b1) the betaine type amphoteric surfactant and a product obtained by multiplying the mole number of the metal component by the valence of the metal component in (c) the metal compound. Σ(mole number of anion component in resin composition×valence of anion component in resin composition) is a sum of a product obtained by multiplying the mole number of the anion-forming group by the valence of the anion-forming group in (b1) the betaine type amphoteric surfactant, the mole number of the carboxyl group in the component (a1-1), the component (a1-2), the component (a2-1) and the component (a2-2), the mole number of the carboxyl group in (b2) the saturated fatty acid, and the mole number of the carboxyl group in (b3) the unsaturated fatty acid. It is noted that the cation-forming group, metal component, carboxyl group and anion-forming group include a unionized precursor. The amount of the cation component, the amount of the cation-forming group, and the amount of the anion-forming group may be determined, for example, by a neutralization titration method.

The total neutralization degree of the golf ball resin composition is preferably 50 mole % or more, more preferably 80 mole % or more, even more preferably 100 mole % or more, and is preferably 200 mole % or less, more preferably 160 mole % or less, even more preferably 140 mole % or less. If the total neutralization degree is 50 mole % or more, the amount of the ion association increases, thus the golf ball resin composition has a further enhanced rebound resilience, and if the total neutralization degree is 200 mole % or less, few metal uninvolved in the ion association exists, and there is little adverse influence on the rebound resilience, thus the golf ball resin composition has a greater rebound resilience.

The golf ball resin composition having the above formulation is prepared by a method comprising a step of melt blending the resin component containing the component (a1-1), the component (a1-2), the component (a2-1) and/or the component (a2-2) with at least one component selected from the group consisting of the component (b1), the component (b2) and the component (b3) to prepare the copolymer composition; and a step of melt blending the obtained copolymer composition with the component (c) to prepare the golf ball resin composition. It is noted that, in the case that all the components are simultaneously blended, and in the case that after at least one component selected from the group consisting of the component (b1), the component (b2) and the component (b3) are blended with the component (c) and the obtained mixture is blended with the resin component, the component (b1), the component (b2) and the component (b3) are not taken into the ion association of the ionomer resin, thus the desirable effects (an affect of enhancing the peak top temperature of the first endothermic peak which will be described later, and an affect of decreasing the thickness of the constrained layer) cannot be obtained. Further, the golf ball resin composition prepared in such the blending order has a high slab hardness and a lowered rebound resilience.

In the step of preparing the copolymer composition, the melt blending may be carried out using a kneader or an extruder (e.g. single-screw extruder, twin-screw extruder, and twin-single screw extruder). The blending temperature (material temperature) when preparing the copolymer composition is preferably 140° C. or more, more preferably 160° C. or more, and is preferably 220° C. or less, more preferably 200° C. or less.

In the step of preparing the golf ball resin composition, the melt blending may be carried out using a kneader or an extruder (e.g. single-screw extruder, twin-screw extruder, and twin-single screw extruder). The blending temperature (material temperature) when preparing the golf ball resin composition is preferably 170° C. or more, more preferably 200° C. or more, and is preferably 260° C. or less, more preferably 240° C. or less.

The slab hardness of the golf ball resin composition is preferably 50 or more, more preferably 65 or more, even more preferably 75 or more, and is preferably 99 or less, more preferably 95 or less, even more preferably 90 or less in Shore C hardness. If the slab hardness is 50 or more in Shore C hardness, the golf ball resin composition has a further enhanced rebound resilience since the golf ball resin composition less deforms when an external force is loaded thereto and the energy loss due to the deformation is suppressed, and if the slab hardness is 99 or less in Shore C hardness, the golf ball having a better shot feeling can be obtained since the impact when hitting the golf ball is suppressed.

The melt flow rate (MFR) (190° C., 2.16 kgf) of the golf ball resin composition is preferably 0.1 g/10 min or more, more preferably 0.6 g/10 min or more, even more preferably 1.5 g/10 min or more, and is preferably 200 g/10 min or less, more preferably 60 g/10 min or less, even more preferably 20 g/10 min or less. If the MFR is 0.1 g/10 min or more, moldability is better in the press molding, injection molding or the like, and if the MFR is 200 g/10 min or less, batch-to-batch fluidity variation is suppressed when molding the golf ball, thus molding defects can be decreased.

A greater rebound resilience is beneficial for the golf ball resin composition, and the upper limit of the rebound resilience is not particularly limited. The rebound resilience of the golf ball resin composition is preferably 50% or more, more preferably 60% or more, even more preferably 65% or more. If the rebound resilience is 50% or more, the obtained golf ball has a further enhanced flight performance.

Next, the preferable embodiments of the golf ball resin composition will be shown.

[Golf Ball Resin Composition of First Embodiment]

The golf ball resin composition of the first embodiment contains (A1) a metal ion-neutralized product of a binary copolymer composed of an olefin and an α,β-unsaturated carboxylic acid having 3 to 8 carbon atoms, and/or (A2) a metal ion-neutralized product of a ternary copolymer composed of an olefin, an α,β-unsaturated carboxylic acid having 3 to 8 carbon atoms and an α,β-unsaturated carboxylic acid ester as a resin component, wherein in a DSC (differential scanning calorimetry) measurement (a measuring atmosphere: a nitrogen atmosphere, a measuring temperature range: from −50° C. to 150° C., and a temperature rising rate: 10° C./min) of the golf ball resin composition, a first endothermic peak and a second endothermic peak appear, and a peak top temperature (Ti) of the first endothermic peak is equal to or lower than a peak top temperature (Tm) of the second endothermic peak and the peak top temperature (Ti) ranges from 60° C. to 70° C.

The component (A1) and the component (A2) are an ionomer resin obtained by neutralizing carboxyl groups of the copolymer with a metal ion. In the ionomer resin, the carboxyl groups aggregate to form an ion association in the polyolefin matrix. A region where the motion of the polymer chain is constrained (constrained region) exists surrounding the ion association. In the polyolefin matrix, the polyolefin segment crystal exists.

The second endothermic peak is an endothermic peak attributed to the melting of the crystal region of the polyolefin segment in the matrix. In other words, the second endothermic peak corresponds to the melting point of the golf ball resin composition of the first embodiment. It is considered that the first endothermic peak is attributed to the melting of the polyolefin quasicrystal that is not as regular as the polyolefin segment crystal, or to the ordered/unordered phase transfer of the ion association. It is noted that there are cases that the first endothermic peak and the second endothermic peak overlap. In other words, there are cases that one endothermic peak appears as the shoulder of another endothermic peak. In this case, the peak top temperature of each endothermic peak is analyzed after the peaks are separated. It is noted that there are cases that the first endothermic peak and the second endothermic peak overlap such that it is difficult to confirm the respective peak top position in the DSC curve by visual observation. In this case, the peak top temperature (Tm) is deemed to be equal to the peak top temperature (Ti) (i.e. Tm=Ti).

It is considered that a higher peak top temperature of the first endothermic peak indicates a stronger constraining of the molecular motion surrounding the ion association. Further, a stronger constraining of the molecular motion surrounding the ion association indicates a lower energy loss at the time of deformation. Accordingly, if the first endothermic peak has the peak top temperature falling within the above range, the golf ball resin composition has an enhanced rebound resilience.

The peak top temperature (Ti) of the first endothermic peak is more preferably 61° C. or more, even more preferably 62° C. or more. If the peak top temperature (Ti) of the first endothermic peak is high, the golf ball resin composition has a further enhanced rebound resilience.

The peak top temperature (Tm) of the second endothermic peak is preferably, but not particularly limited to, 60° C. or more, more preferably 62° C. or more, even more preferably 64° C. or more, and is preferably 85° C. or less, more preferably 75° C. or less, even more preferably 70° C. or less. If the peak top temperature (Tm) is 60° C. or more, the golf ball resin composition has a further enhanced rebound resilience since the durability of the polyolefin segment crystal is better and the energy loss due to the destroying of the polyolefin segment crystal at the time of deformation is suppressed. In addition, if the constrained region surrounding the ion association is extremely strongly pulled at the time of deformation, the energy loss due to the deformation of the constrained region occurs. However, if the peak top temperature (Tm) is 85° C. or less, the polyolefin segment part has a better flexibility, and thus the extremely strong pulling of the constrained region at the time of deformation is suppressed. Accordingly, the energy loss at the time of deformation is suppressed, and the golf ball resin composition has a greater rebound resilience.

The peak top temperature (Ti) of the first endothermic peak is equal to or lower than the peak top temperature (Tm) of the second endothermic peak (Ti≤Tm). Here, the temperature difference (Tm−Ti) between the peak top temperature (Tm) and the peak top temperature (Ti) is 0 or more, and is preferably 30° C. or less, more preferably 20° C. or less, even more preferably 15° C. or less, particularly preferably 5° C. or less. If the temperature difference (Tm−Ti) is 30° C. or less, a better balance can be stricken between the strength of the constrained region surrounding the ion association and the strength of the polyolefin matrix. As a result, the energy loss occurring when the constrained region surrounding the ion association is extremely strongly pulled at the time of deformation, is suppressed, and thus the golf ball resin composition has a greater rebound resilience.

The golf ball resin composition of the first embodiment is preferably obtained by blending the copolymer composition with (c) the metal compound. The copolymer composition contains at least one selected from the group consisting of (a1-1) the binary copolymer composed of an olefin and an α,β-unsaturated carboxylic acid having 3 to 8 carbon atoms, (a1-2) the metal ion-neutralized product of a binary copolymer composed of an olefin and an α,β-unsaturated carboxylic acid having 3 to 8 carbon atoms, (a2-1) the ternary copolymer composed of an olefin, an α,β-unsaturated carboxylic acid having 3 to 8 carbon atoms and an α,β-unsaturated carboxylic acid ester, and (a2-2) the metal ion-neutralized product of a ternary copolymer composed of an olefin, an α,β-unsaturated carboxylic acid having 3 to 8 carbon atoms and an α,β-unsaturated carboxylic acid ester as a resin component, and further contains at least one selected from the group consisting of (b1) the betaine type amphoteric surfactant, (b2) the saturated fatty acid and (b3) the unsaturated fatty acid. The component (b1), the component (b2) and the component (b3) gather at (even surrounding) the ion association part of the golf ball resin composition under the action of the polar group moiety thereof such as the carboxyl group or betaine type amphoteric group. At this time, the alkyl group or alkenyl group at the opposite side of the polar group moiety has an effect of constraining the polyolefin moiety (particularly the polyolefin moiety surrounding the ion association) of the golf ball resin composition. In other words, the component (b1), the component (b2) and the component (b3) have an effect of increasing the peak top temperature (Ti) of the first endothermic peak by increasing the constraining of the molecular motion surrounding the ion association.

[Golf Ball Resin Composition of Second Embodiment]

The golf ball resin composition of the second embodiment contains an ionomer resin as a resin component, wherein a constrained layer of an ion association of the golf ball resin composition has an average thickness ranging from 0.04 nm to 0.50 nm, measured by an X-ray small angle scattering (SAXS) method.

The ionomer resin is an ionic polymer having an ionic group introduced in the polymer chain thereof. In the polymer chain matrix of the ionomer resin, the ionic groups aggregate to form the ion association. Surrounding the ion association, a region where the motion of the polymer chain is constrained (constrained layer) exists. A thinner average thickness of the constrained layer of the ion association indicates a greater rebound resilience of the golf ball resin composition.

The average thickness of the constrained layer of the ion association is measured by the X-ray small angle scattering method. Specifically, based on the scattering strength pattern (SAXS pattern) obtained by the X-ray small angle scattering method, according to the liquid-like model (D. J. Yarusso, S. L. Cooper, Macromolecules, 16, 1871-1880 (1983)) proposed by Yarusso and Cooper, the radius ($R_1$) of the ion association and the radius ($R_{ca}$) of the ion cluster composed of the constrained main chain surrounding the ion association are determined, and the thickness ($R_{ca}$-$R_1$) of the constrained layer is calculated from the difference between them.

The average thickness of the constrained layer is preferably 0.04 nm or more, more preferably 0.05 nm or more, even more preferably 0.06 nm or more, and is preferably 0.50 nm or less, more preferably 0.45 nm or less, even more preferably 0.40 nm or less. If the average thickness of the constrained layer is 0.04 nm or more, the constraining of the molecular motion surrounding the ion association is stronger, and the energy loss due to the molecular motion at the time of deformation is suppressed. In addition, if the average thickness of the constrained layer is 0.50 nm or less, the strength of the constrained layer is retained, and the energy loss due to the destroying of the periphery of the constrained layer at the time of deformation is suppressed. Accordingly, if the average thickness of the constrained layer falls within the above range, the golf ball resin composition has an enhanced rebound resilience.

In addition, in the golf ball resin composition of the second embodiment, the sample volume ($v_p$) allocated to one ion association is preferably 15 $nm^3$ or more, more preferably 20 $nm^3$ or more, even more preferably 25 $nm^3$ or more, and is preferably 90 $nm^3$ or less, more preferably 80 $nm^3$ or less, even more preferably 70 $nm^3$ or less. If the sample volume ($v_p$) allocated to one ion association is 15 $nm^3$ or more, the constrained layer has an appropriate thickness, and thus the golf ball resin composition has a further enhanced rebound resilience. If the sample volume ($v_p$) allocated to one ion association is 90 $nm^3$ or less, the strength of the ion association itself is retained, and the energy loss due to the destroying of the periphery of the constrained layer at the time of deformation is suppressed, thus the golf ball resin composition has a further enhanced rebound resilience. The sample volume ($v_p$) allocated to one ion association is measured by the X-ray small angle scattering method, in the same way as the average thickness of the constrained layer of the ion association.

The golf ball resin composition of the second embodiment is preferably obtained by blending the copolymer composition with (c) the metal compound. The copolymer composition contains the copolymer having a carboxyl group or sulfo group in the molecule and/or the metal ion-neutralized product thereof as a resin component, and further contains at least one selected from the group consisting of (b1) the betaine type amphoteric surfactant, (b2) the saturated fatty acid and (b3) the unsaturated fatty acid. The component (b1), the component (b2) and the component (b3) gather at (even surrounding) the ion association part of the golf ball resin composition under the action of the polar group moiety thereof such as the carboxyl group or betaine type amphoteric group, to increase the volume of the ion association (to expand the ion association part). By this, the thickness of the constrained layer constrained surrounding the ion association and composed of the polyolefin component is lowered.

[Golf Ball Resin Composition of Third Embodiment]

The golf ball resin composition of the third embodiment contains an ionomer resin as a resin component, wherein a hyperfine coupling constant ($A_{zz}$) of the golf ball resin composition ranges from 31.6 G to 35.0 G, measured by a spin probe-electron spin resonance method (spin probe: 5-doxylstearic acid).

The spin probe-electron spin resonance method is a method of performing an electron spin resonance by introducing an electron spin in the system so as to analyze properties of a diamagnetic substance not having an electron spin. 5-doxylstearic acid used as a spin probe has a stearic acid backbone, and is labeled by doxylnitroxide at 5-position. The hyperfine coupling constant ($A_{zz}$) represents a hyperfine structure of nitrogen when a magnetic field is applied in the $2P_z$ direction of N—O of the nitroxide radical of 5-doxylstearic acid. It can be said that a greater hyperfine coupling constant ($A_{zz}$) value indicates a stronger constraining of doxylnitroxide.

The ionomer resin is an ionic polymer having an ionic group introduced in the polymer chain thereof. In the polymer chain matrix of the ionomer resin, the ionic groups aggregate to form the ion association. Surrounding the ion association, a region where the motion of the polymer chain is constrained exists. A stronger constraining of the molecular motion surrounding the ion association of the ionomer resin indicates a lower energy loss at the time of deformation. Accordingly, a stronger constraining of the molecular motion surrounding the ion association indicates a greater rebound resilience of the golf ball resin composition. Here, the carboxyl group moiety of the stearic acid backbone of 5-doxylstearic acid is taken into the ion association of the ionomer resin, and the hydrocarbon chain moiety of 5-doxylstearic acid extends radially towards the outer side of the ion association in the golf ball resin composition of the third embodiment. Thus, it is considered that the doxylnitroxide of 5-doxylstearic acid is located surrounding the ion association. Accordingly, it is considered that a greater hyperfine coupling constant ($A_{zz}$) value measured by the spin probe-electron spin resonance method (spin probe: 5-doxylstearic acid) indicates a stronger constraining of the molecular motion surrounding the ion association, thereby indicating a greater rebound resilience of the golf ball resin composition.

The hyperfine coupling constant ($A_{zz}$) is 31.6 G or more, preferably 31.8 G or more, more preferably 32.0 G or more, and is preferably 35.0 G or less, more preferably 34.5 G or less, even more preferably 34.0 G or less. If the hyperfine coupling constant ($A_{zz}$) is 31.6 G or more, the constraining of the molecular motion surrounding the ion association is stronger, and thus the golf ball resin composition has an enhanced rebound resilience. If the hyperfine coupling constant ($A_{zz}$) is 35.0 G or less, the golf ball resin composition has an enhanced rebound resilience since the flexibility of the golf ball resin composition itself is retained, and the energy loss at the time of deformation is suppressed.

In the case that the ionomer resin contains a divalent metal ion (e.g. magnesium ion) as a metal ion, the hyperfine coupling constant ($A_{zz}$) is preferably 31.6 G or more, more preferably 31.8 G or more, even more preferably 32.0 G or more, and is preferably 33.5 G or less, more preferably 33.4 G or less, even more preferably 33.3 G or less. If the hyperfine coupling constant ($A_{zz}$) is 31.6 G or more, the constraining of the molecular motion surrounding the ion association is stronger, and thus the golf ball resin composition has an enhanced rebound resilience. If the hyperfine coupling constant ($A_{zz}$) is 33.5 G or less, the golf ball resin composition has an enhanced rebound resilience since the flexibility of the golf ball resin composition itself is retained, and the energy loss at the time of deformation is suppressed.

In the case that the ionomer resin contains a monovalent metal ion (e.g. sodium ion) as a metal ion, the hyperfine coupling constant ($A_{zz}$) is preferably 32.5 G or more, more preferably 32.8 G or more, even more preferably 33.1 G or more, and is preferably 35.0 G or less, more preferably 34.5 G or less, even more preferably 34.0 G or less. If the hyperfine coupling constant ($A_{zz}$) is 32.5 G or more, the constraining of the molecular motion surrounding the ion association is stronger, and thus the golf ball resin composition has an enhanced rebound resilience. If the hyperfine coupling constant ($A_{zz}$) is 35.0 G or less, the golf ball resin composition has an enhanced rebound resilience since the flexibility of the golf ball resin composition itself is retained, and the energy loss at the time of deformation is suppressed.

The golf ball resin composition of the third embodiment is preferably obtained by blending the copolymer composition with (c) the metal compound. The copolymer composition contains the copolymer having a carboxyl group or sulfo group in the molecule and/or the metal ion-neutralized product thereof as a resin component, and further contains at least one selected from the group consisting of (b1) the betaine type amphoteric surfactant, (b2) the saturated fatty acid and (b3) the unsaturated fatty acid. The component (b1), the component (b2) and the component (b3) gather at (even surrounding) the ion association part of the golf ball resin composition under the action of the polar group moiety thereof such as the carboxyl group or betaine type amphoteric group. At this time, the alkyl group or alkenyl group at the opposite side of the polar group moiety has an effect of constraining the polyolefin moiety (particularly the polyolefin moiety surrounding the ion association) of the golf ball resin composition. In other words, the component (b1), the component (b2) and the component (b3) have an effect of increasing the hyperfine coupling constant ($A_{zz}$) by increasing the constraining of the molecular motion surrounding the ion association.

[Golf Ball Resin Composition of Fourth Embodiment]

The golf ball resin composition of the fourth embodiment contains an ionomer resin as a resin component, wherein a constrained layer of an ion association has an average thickness ranging from 3.0 Å to 9.0 Å, measured by a temperature variable spin probe-electron spin resonance method.

Figure 2:
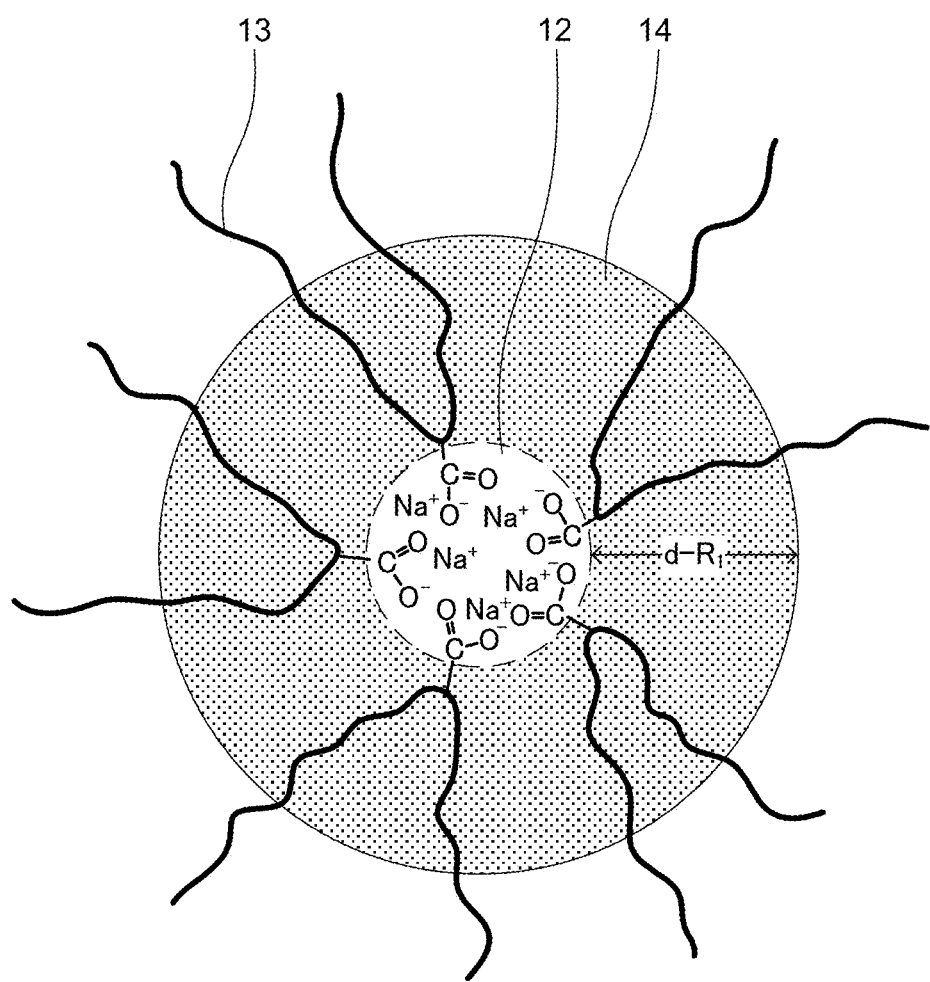
FIG. 2 is a schematic diagram of an ion association of an ionomer resin.

The ionomer resin is an ionic polymer having an ionic group introduced in the polymer chain thereof. FIG. 1 is a schematic diagram of an interior structure of an ionomer resin. FIG. 2 is a schematic diagram of an ion association. As shown in FIG. 1, in the polymer chain matrix 11 of the ionomer resin, the ionic groups aggregate to form the ion association 12. As shown in FIG. 2, the ionic groups aggregate by electrostatic attraction to form each ion association 12 (in FIG. 2, a carboxyl group is depicted as the ionic group, and a sodium ion is depicted as the metal ion). Surrounding the ion association 12, a region (so-called constrained layer 14) where the motion of the polymer chain 13 is constrained exists. A thinner thickness (d-$R_1$) of the constrained layer 14 indicates a greater rebound resilience of the ionomer resin. Accordingly, if the constrained layer of the ion association of the golf ball resin composition containing an ionomer resin has an average thickness ranging from 3.0 Å to 9.0 Å, measured by the temperature variable spin probe-electron spin resonance method, the golf ball resin composition has an enhanced rebound resilience.

The average thickness of the ion association is measured by the temperature variable spin probe-electron spin resonance method. The spin probe-electron spin resonance method is a method of performing an electron spin resonance by introducing an electron spin in the system so as to analyze properties of a diamagnetic substance not having an electron spin. In the spin probe method, the molecular motion at any position of the constrained layer surrounding the ion association or the matrix region in the ionomer resin, can be probed by changing the type of the spin probe. Further, the molecular constraining of the probe position can be evaluated by calculating the motion parameter ($2A'_{zz}$) from the electron spin resonance (ESR) spectrum. In addition, in the temperature variable spin probe-electron spin resonance method, the electron spin resonance can be conducted at any sample temperature. Accordingly, the temperature at which the molecular constraining of the probe position disappears, can be measured by changing the sample temperature to conduct the electron spin resonance. It is noted that, in the present invention, the temperature ($T_{5\ mT}$) at which the motion parameter ($2A'_{zz}$) becomes 5 mT (50 G) is defined to be the temperature at which the molecular constraining disappears.

Here, the molecular constraining in the constrained layer is weaker when the distance from the surface of the ion association is greater. Thus, it is considered that, in the constrained layer, the temperature ($T_{5\ mT}$) decreases proportionally to the distance from the surface of the ion association. Accordingly, if the temperature ($T_{5\ mT}$) is plotted versus the distance from the surface of the ion association, the plot is approximately linear. In addition, the temperature ($T_{5\ mT}$) is lower when the distance from the surface of the ion association is greater, and shows a minimum value when the matrix region is reached. Accordingly, on the extrapolated line of the approximately linear line, the distance from the surface of the ion association corresponding to the temperature ($T_{5\ mT}$) of the matrix region is the thickness of the constrained layer.

In the present invention, the thickness of the constrained layer is measured according to the following order from (i) to (iii).

(i) The radius ($R_1$) of the ion association of the golf ball resin composition is obtained according to the liquid-like model by the X-ray small angle scattering measurement.

(ii) The temperature ($T_{5\ mT}$) of each probe position of the golf ball resin composition is obtained by the temperature variable spin probe-electron spin resonance measurement (spin probe for the constrained layer: 5-doxylstearic acid, 7-doxylstearic acid, 10-doxylstearic acid, 12-doxylstearic acid; and spin probe for the matrix region: 10-doxylnonadecane).

(iii) The temperature ($T_{5\ mT}$) obtained by using the spin probe for the constrained layer is plotted versus the distance (d-$R_1$) from the surface of the ion association, and a linear regression equation is calculated by a least square method. The distance (d-$R_1$) corresponding to the temperature ($T_{5\ mT}$) obtained by using the spin probe for the matrix region is calculated based on the linear regression equation, and adopted as the thickness of the constrained layer.

The radius of the ion association is measured by the X-ray small angle scattering method. Specifically, based on the scattering strength pattern (SAXS pattern) obtained by the X-ray small angle scattering method, according to the liquid-like model (D. J. Yarusso, S. L. Cooper, Macromolecules, 16, 1871-1880 (1983)) proposed by Yarusso and Cooper, the radius ($R_1$) of the ion association is determined.

In the temperature variable spin probe-electron spin resonance method, 5-doxylstearic acid (5DSA), 7-doxylstearic acid (7DSA), 10-doxylstearic acid (10DSA), 12-doxylstearic acid (12DSA) and 10-doxylnonadecane (10DND) are used as the spin probe. 5DSA, 7DSA, 10DSA and 12DSA have a stearic acid backbone and are labelled by doxylnitroxide at 5-position, 7-position, 10-position and 12-position, respectively. 10DND has a nonadecane backbone and is labelled by doxylnitroxide at 10-position.

Figure 3:
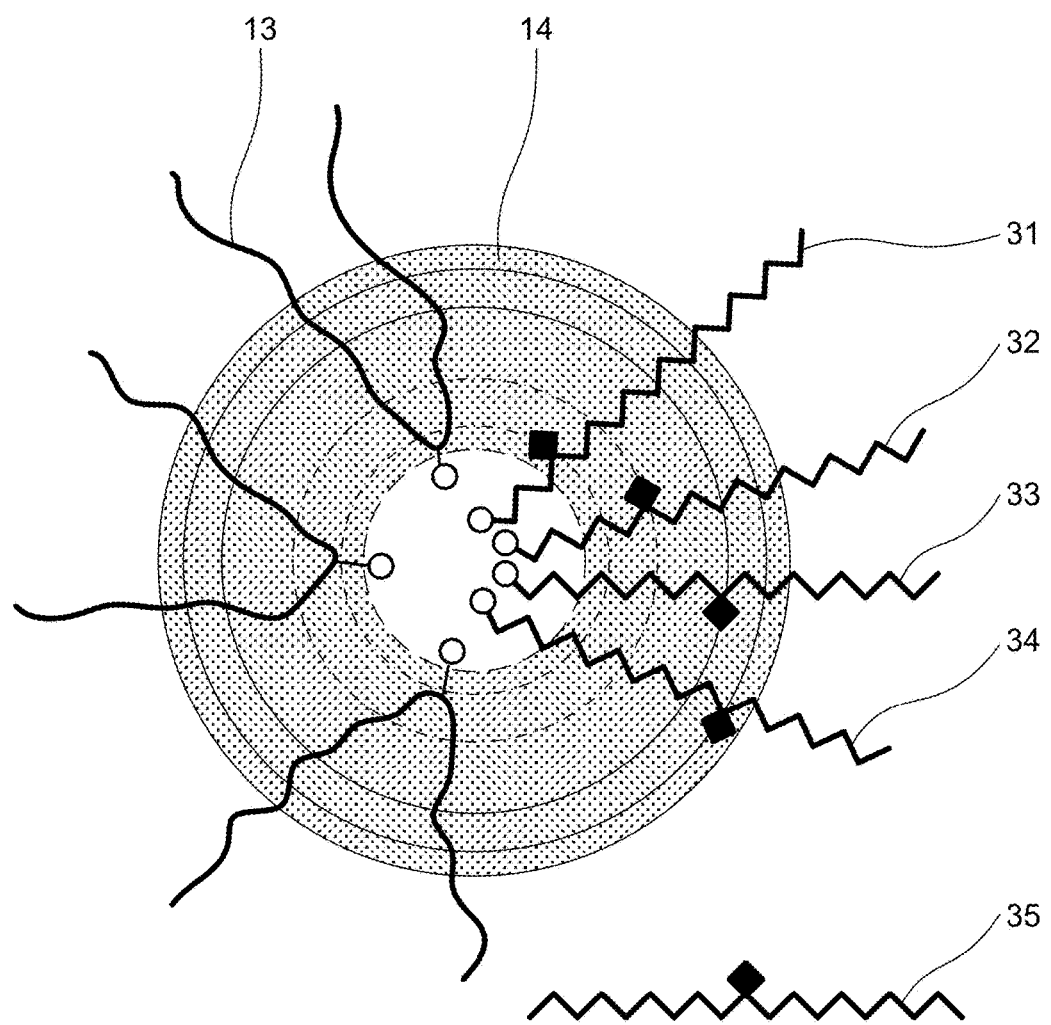
FIG. 3 is a schematic diagram showing a probe position of a spin probe.

FIG. 3 is schematic diagram showing a probe position of a spin probe. In FIG. 3, "○" represents a carboxyl group, "■" represents a doxylnitroxide. The carboxyl group moiety of the stearic acid backbone of 5DSA (31), 7DSA (32), 10DSA (33) and 12DSA (34) is taken into the ion association of the ionomer resin, and the hydrocarbon chain moiety of 5DSA (31), 7DSA (32), 10DSA (33) and 12DSA (34) extends radially towards the outer side of the ion association in the golf ball resin composition. Thus, as shown in FIG. 3, these 5DSA, 7DSA, 10DSA and 12DSA probe various positions in the thickness direction of the constrained layer existing at the periphery of the ion association. The above-mentioned 10DND (35) is not taken into the ion association since it has no carboxyl group, thereby probing the matrix region 11.

The temperature at which the molecular constraining disappears is defined to be the temperature at which the motion parameter ($2A'_{zz}$) becomes 5 mT (50 G). The motion parameter ($2A'_{zz}$) is two folds of the hyperfine coupling constant ($A_{zz}$) which represents a hyperfine structure of nitrogen when a magnetic field is applied in the $2P_z$ direction of N—O of the nitroxide radical. It can be said that a greater motion parameter ($2A'_{zz}$) value indicates a stronger constraining of doxylnitroxide.

The 5 mT (50 G) is determined by the measuring result of the spin probe (10DND) which shows the motion of the polymer chain matrix 11 part in the inner structure of the ionomer resin. As shown in FIG. 3, 10DND certainly shows the motion of the polymer chain matrix 11 part that is located in the more external side than the ion association, regardless of the state of the ion association part. If the motion parameter ($2A'_{zz}$) is measured while the temperature is raised, the motion parameter ($2A'_{zz}$) of 10DND shows a sudden drop from the vicinity of 50 G (refer to FIG. 13). This is attributed to the melting of the polyethylene crystal part in the matrix, and shows that the constraining of the matrix disappears. Accordingly, the temperature corresponding to the motion parameter value ($2A'_{zz}$=50 G) which shows that the constraining of the matrix disappears, is adopted as the temperature ($T_{5\ mT}$) at which the molecular constraining of each probe position disappears.

The distance from the surface of the ion association can be calculated by subtracting the radius ($R_1$) of the ion association from the distance (d) of from the carboxyl group side terminal to the carbon atom where the doxylnitroxide is bonded in the molecule of the spin probe. The distance (d) of from the carboxyl group side terminal to the carbon atom where the doxylnitroxide is bonded can be obtained based on the molecular structure.

The average thickness of the constrained layer is preferably 3.0 Å or more, more preferably 3.3 Å or more, even more preferably 3.6 Å or more, and is preferably 9.0 Å or less, more preferably 8.9 Å or less, even more preferably 8.8 Å or less. If the average thickness of the constrained layer is 3.0 Å or more, the constraining of the molecular motion surrounding the ion association is stronger, and the energy loss due to the molecular motion at the time of deformation is suppressed. In addition, if the average thickness of the constrained layer is 9.0 Å or less, the strength of the constrained layer is retained, and the energy loss due to the destroying of the periphery of the constrained layer at the time of deformation is suppressed. Accordingly, if the average thickness of the constrained layer falls within the above range, the golf ball resin composition has an enhanced rebound resilience.

The golf ball resin composition of the fourth embodiment is preferably obtained by blending the copolymer composition with (c) the metal compound. The copolymer composition contains the copolymer having a carboxyl group or sulfo group in the molecule and/or the metal ion-neutralized product thereof as a resin component, and further contains at least one selected from the group consisting of (b1) the betaine type amphoteric surfactant, (b2) the saturated fatty acid and (b3) the unsaturated fatty acid. The component (b1), the component (b2) and the component (b3) gather at (even surrounding) the ion association part of the golf ball resin composition under the action of the polar group moiety thereof such as the carboxyl group or betaine type amphoteric group, to increase the volume of the ion association (to expand the ion association part). By this, the thickness of the constrained layer constrained surrounding the ion association and composed of the polyolefin component is lowered.

Preferable examples of the golf ball resin composition include an embodiment satisfying the requirement of the golf ball resin composition of the first embodiment and the requirement of the golf ball resin composition of the second embodiment; an embodiment satisfying the requirement of the golf ball resin composition of the first embodiment and the requirement of the golf ball resin composition of the third embodiment; an embodiment satisfying the requirement of the golf ball resin composition of the first embodiment and the requirement of the golf ball resin composition of the fourth embodiment; an embodiment satisfying the requirement of the golf ball resin composition of the first embodiment, the requirement of the golf ball resin composition of the second embodiment and the requirement of the golf ball resin composition of the third embodiment; an embodiment satisfying the requirement of the golf ball resin composition of the first embodiment, the requirement of the golf ball resin composition of the second embodiment and the requirement of the golf ball resin composition of the fourth embodiment; an embodiment satisfying the requirement of the golf ball resin composition of the first embodiment, the requirement of the golf ball resin composition of the third embodiment and the requirement of the golf ball resin composition of the fourth embodiment; and an embodiment satisfying the requirement of the golf ball resin composition of the first embodiment, the requirement of the golf ball resin composition of the second embodiment, the requirement of the golf ball resin composition of the third embodiment and the requirement of the golf ball resin composition of the fourth embodiment.

[Golf Ball]

The golf ball has a constituent member formed from the above golf ball resin composition. The construction of the golf ball includes, but is not particularly limited to, for example, a two-piece golf ball composed of a single layered core and a cover covering the core; a multi-piece golf ball (a three-piece golf ball, four-piece golf ball, five-piece golf ball, and the like) composed of a core, one or more intermediate layer covering the core, and a cover covering the intermediate layer; and the like.

The constituent member formed from the above golf ball resin composition may be any one of the core, the intermediate layer and the cover, and the intermediate layer is preferable. It is noted that a conventionally known material can be employed for the other part of the golf ball than the constituent member formed from the above golf ball resin composition.

The core may have a single layered construction or a multiple layered construction. The core may use a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its advantageous resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. In the case that the α,β-unsaturated carboxylic acid having 3 to 8 carbon atoms is used as the co-crosslinking agent, a metal compound (e.g. magnesium oxide) is preferably used in combination. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.2 part by mass or more, more preferably 0.3 part by mass or more, and is preferably 5 parts by mass or less, more preferably 3 parts by mass or less, with respect to 100 parts by mass of the base rubber.

In addition, the core rubber composition may further contain an organic sulfur compound. As the organic sulfur compound, diphenyl disulfides, thiophenols or thionaphthols may be preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, an aliphatic carboxylic acid or an aromatic carboxylic acid (e.g. benzoic acid) may be used. The amount of the carboxylic acid and/or the salt thereof is preferably 1 part by mass or more and 40 parts by mass or less with respect to 100 parts by mass of the base rubber.

The core rubber composition may further appropriately contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be appropriately determined according to the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

Examples of the intermediate layer material include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Here, examples of the ionomer resin include a product obtained by neutralizing at least a part of carboxyl groups in a copolymer composed of ethylene and an α,β-unsaturated carboxylic acid with a metal ion; and a product obtained by neutralizing at least a part of carboxyl groups in a terpolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, and a pigment.

The method for molding the intermediate layer includes, but is not particularly limited to, for example, a method of molding the intermediate layer composition into hemispherical half shells beforehand, covering the spherical body with two of the hemispherical half shells, and compression molding the spherical body with two of the hemispherical half shells; and a method of injection molding the intermediate layer composition directly onto the spherical body to cover the spherical body.

In case of injection molding the intermediate layer composition onto the spherical body to form the intermediate layer, it is preferred to use upper and lower molds, each having a hemispherical cavity. When molding the intermediate layer by the injection molding method, the hold pin is protruded to hold the spherical body, and the intermediate layer composition which has been heated and melted is charged and then cooled to form the intermediate layer.

When molding the intermediate layer by the compression molding method, the molding of the half shell may be performed by either a compression molding method or an injection molding method, and the compression molding method is preferred. Compression molding the intermediate layer composition into the half shell may be carried out, for example, under a pressure of 1 MPa or more and 20 MPa or less at a temperature of −20° C. or more and +70° C. or less relative to the flow beginning temperature of the intermediate layer composition. If the molding is carried out under the above conditions, the half shell having a uniform thickness can be formed. Examples of the method for molding the intermediate layer by using the half shell include a method of covering the spherical body with two of the half shells, and compression molding the spherical body with two of the half shells. Compression molding the half shells into the intermediate layer may be carried out, for example, under a pressure of 0.5 MPa or more and 25 MPa or less at a temperature of −20° C. or more and +70° C. or less relative to the flow beginning temperature of the intermediate layer composition. If the molding is carried out under the above conditions, the intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the composition may be measured using the thermoplastic resin composition in a pellet form under the following conditions with "Flow Tester CFT-500" available from Shimadzu Corporation.

Measuring conditions: Plunger area: 1 cm$^2$, Die length: 1 mm, Die diameter: 1 mm, Load: 588.399 N, Starting temperature: 30° C., and Temperature rising rate: 3° C./min.

The thickness of the intermediate layer is preferably 0.3 mm or more, more preferably 0.4 mm or more, even more preferably 0.5 mm or more, and is preferably 2.5 mm or less, more preferably 2.4 mm or less, even more preferably 2.3 mm or less. In case of having multiple intermediate layers, the total thickness of the multiple intermediate layers preferably falls within the above range.

The cover is the outermost layer of the golf ball body. The cover is formed from a cover composition containing a resin component. The cover material includes, but is not particularly limited to, for example, an ionomer resin, polyurethane, polyamide, polyester, polystyrene, and the polyurethane and the ionomer resin are preferable.

Specific examples of the cover material include an ionomer resin having a trade name of "Himilan (registered trademark)" available from Mitsui-Du Pont Polychemicals Co., Ltd.; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" or a thermoplastic polyester elastomer having a trade name of "Primalloy" available from Mitsubishi Chemical Corporation. The cover material may be used solely, or two or more of them may be used in combination.

In addition to the above mentioned resin component, the cover may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, as long as they do not impair the performance of the cover.

The embodiment for molding the cover from the cover composition includes, but is not particularly limited to, an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into hollow half-shells, covering the core with two of the hollow half-shells and compression molding the core with two of the hollow half-shells). The golf ball body having the cover formed thereon is ejected from the mold, and as necessary, the golf ball body is preferably subjected to surface treatments such as deburring, cleaning, and sandblast. In addition, if desired, a mark may be formed.

The thickness of the cover is preferably 4.0 mm or less, more preferably 3.0 mm or less, even more preferably 2.0 mm or less. If the thickness of the cover is 4.0 mm or less, the obtained golf ball has better resilience or shot feeling. The thickness of the cover is preferably 0.3 mm or more, more preferably 0.5 mm or more, even more preferably 0.8 mm or more, particularly preferably 1.0 mm or more. If the thickness of the cover is less than 0.3 mm, the durability and wear resistance of the cover may deteriorate.

The total number of the dimples formed on the cover is preferably 200 or more and 500 or less. If the total number of the dimples is less than 200, the dimple effect is hardly obtained. In addition, if the total number of the dimples exceeds 500, the dimple effect is hardly obtained because the size of the respective dimple is small. The shape (shape in a plan view) of the dimples includes, but is not particularly limited to, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The golf ball body having the cover formed thereon is ejected from the mold, and as necessary, the golf ball body is preferably subjected to surface treatments such as deburring, cleaning, and sandblast. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The golf ball according to the present invention preferably has a diameter ranging from 40 mm to 45 mm. In light of satisfying the regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball preferably has a mass of 40 g or more and 50 g or less. In light of obtaining greater inertia, the mass is more preferably 44 g or more, particularly preferably 45.00 g or more. In light of satisfying the regulation of USGA, the mass is particularly preferably 45.93 g or less.

When the golf ball according to the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes greater.

Figure 4:
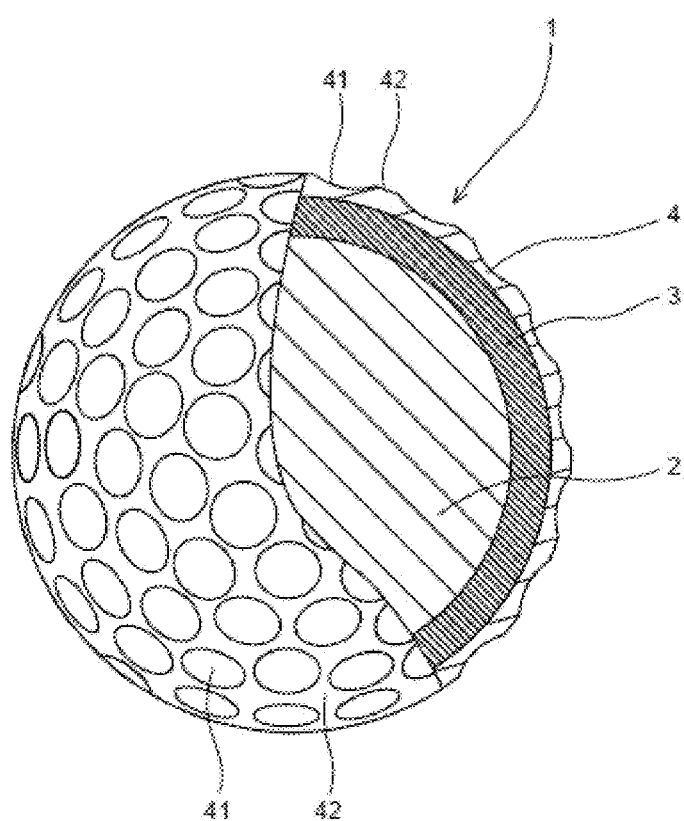
FIG. 4 is a partially cutaway cross-sectional view of a golf ball of one embodiment according to the present invention.

FIG. 4 is a partially cutaway cross-sectional view of a golf ball 1 of one embodiment according to the present invention. The golf ball 1 comprises a spherical core 2, an intermediate layer 3 disposed outside the spherical core 2, and a cover 4 disposed outside the intermediate layer 3. A plurality of dimples 41 are formed on the surface of the cover 4. Other portions than the dimples 41 on the surface of the cover 4 are land 42. The intermediate layer 3 is formed from the above mentioned golf ball resin composition.

EXAMPLES

Next, the present invention will be described in detail by way of examples. However, the present invention is not limited to the examples described below. Various changes and modifications without departing from the spirit of the present invention are included in the scope of the present invention.

[Evaluation Method]

(1) DSC Measurement

The measurement was conducted with a differential scanning calorimeter (Type: Q200, available from TA Instruments Inc.). A measuring sample that had been stored at room temperature for at least four weeks after the preparation, was used. In a sample container (open type sample container, made of aluminum), 5 mg of the sample was put, and the sample container having the sample therein was set in the apparatus. The measurement was conducted under the conditions of a measuring atmosphere: a nitrogen atmosphere, a measuring temperature range: −50° C. to 150° C., and a temperature rising rate: 10° C./min. From the obtained DSC curve, the peak top temperature (Tm) and the peak top temperature (Ti) were determined. It is noted that, in the case that either one of the first endothermic peak and the second endothermic peak appeared as the shoulder of another one, the peak top temperature of each endothermic peak was analyzed after the peaks were separated. A conventional method can be employed for the peak separation. However, there are cases that the first endothermic peak and the second endothermic peak overlap such that it is difficult to confirm the respective peak top position in the DSC curve by visual observation. In this case, the peak top temperature (Tm) is deemed to be equal to the peak top temperature (Ti) (i.e. Tm=Ti).

(2) X-Ray Small Angle Scattering Measurement

The measurement was conducted with a small angle scattering measurement apparatus (Type: NANO-Viewer, CuKα ray (λ=0.154 nm) available from Rigaku Corporation). A measuring sample that had been stored at room temperature for at least four weeks after the preparation, was used. The measurement was conducted under the following conditions.

[Measuring Conditions]
Slit: 1st slit=0.4 mm, 2nd slit=0.2 mm, 3rd slit=0.45 mm
Camera length: 197 mm
Measuring method: transmission method
Exposure time: five minutes exposure for each of upper, middle and lower parts in order
Sample thickness: 1 mm
Angle range: $0.3° \leq 2\theta \leq 10°$ ($0.2 \leq q$ (nm$^{-1}$)$\leq 7$)

Based on the measuring results, the radius ($R_1$) of the ion association and the radius ($R_{ca}$) of the ion cluster were calculated according to the following formulae, and the thickness ($R_{ca}$-$R_1$) of the constrained layer was calculated. Specifically, firstly, data of q values (measuring range: $0.2 \leq q$ (nm$^{-1}$)$\leq 7$) and their corresponding peak strength I(q) values (=$I_e(q) \cdot V \cdot \rho_1^2$) were obtained based on the measuring results. Then, an experimental result curve was obtained by plotting the peak strength I(q) values versus the q values. $R_1$ and $R_{ca}$ were calculated by performing a fitting analysis to the curve.

[Mathematical formula 2]

$$I(q) = I_e(q) V \frac{1}{v_p} v_1^2 \rho_1^2 \Phi^2(qR_1) \frac{1}{1+(8v_{ca}/v_p)\varepsilon\Phi(2qR_{ca})} \quad \text{Formula 1}$$

$$\Phi(x) = \left[\frac{3(\sin x - x\cos x)}{x^3}\right] \quad \text{Formula 2}$$

$$\Phi(qR_1) = \frac{3 \times \sin(2q \times R_1) - 2q \times R_1 \times \cos(2q \times R_1)}{(2q \times R_1)^3} \quad \text{Formula 3}$$

$$\Phi(qR_{ca}) = \frac{3 \times \sin(2q \times R_{ca}) - 2q \times R_{ca} \times \cos(2q \times R_{ca})}{(2q \times R_{ca})^3} \quad \text{Formula 4}$$

$$v_1 = (4/3)\pi R_1^3$$
$$v_{ca} = (4/3)\pi R_{ca}^3$$
$$v_p = V/N$$
$$q = (4\pi/\lambda)\sin\theta$$

$R_1$: radius of ion association (Å)
$R_{ca}$: radius of ion cluster (Å)
$I(q)$: scattering strength
$I_e(q)$: scattering strength from one electron
$V$: sample volume irradiated by X-ray
$N$: ion association number in irradiated sample volume
$\rho_1$: electron density of ion association
$q$: scattering vector (nm$^{-1}$)
$\varepsilon$: relative permittivity of gas at normal temperature/normal pressure ($\varepsilon = 1$)
$\lambda$: wavelength of X-ray (nm)
$2\theta$: diffraction angle The maximum value of the measured peak strength I(q) values is determined by the scattering strength ($I_e$) from one electron, sample volume (V), and ion association density ($\rho_1$) in the sample at that time. Accordingly, the "$I_e(q) \cdot V \cdot \rho_1^2$" portion in the formula 1 is the maximum value of the peak strength when measuring a sample.

Based on the formula 2, $\Phi(qR_1)$ and $\Phi(qR_{ca})$ are expressed as the formula 3 and the formula 4, respectively. Accordingly, $\Phi(qR_1)$ and $\Phi(qR_{ca})$ corresponding to the q value are determined by $R_1$ and $R_{ca}$, respectively. In addition, $v_1$ is a value determined by $R_1$, and $V_{ca}$ is a value determined by $R_{ca}$. Accordingly, based on the formula 1, the peak strength I(q) value corresponding to the q value can be determined by four constants, i.e. the peak strength maximum value (=$I_e(q) \cdot V \cdot \rho_1^2$) obtained from the experimental results at that time, $R_1$ value, $R_{ca}$ value, and $v_p$ value.

Accordingly, $R_1$ and $R_{ca}$ can be calculated by fitting three values, i.e. the $R_1$ value, $R_{ca}$ value and $v_p$ value such that fitted I(q) value has the same value as the I(q) value calculated by assigning each q value of the experimental result and the above four constants to the formula 1.

The fitting was conducted under the following conditions using the solver add-in function of the Table calculation software (EXCEL (registered trademark) 2010 available from Microsoft Inc.).

[Solver Add-in Conditions]

Solution: GRG nonlinearity, differential coefficient median

Repetition times: 10,000 times

Maximum time: 100 seconds

Yield: 0.0001

Initial conditions: $V_p$=1,000, $R_1$=2, $R_{ca}$=4

Other setting conditions: default conditions (3) Electron Spin Resonance

The measurement was conducted with an electron spin resonance (ESR) apparatus (Type: JES-TE 200 available from JEOL Ltd.) by a spin probe method. As the spin probe, 5-doxylstearic acid (available from Aldrich Chemical Inc.) was used.

The golf ball resin composition used for the measurement was stored at room temperature for at least four weeks after the preparation. The golf ball resin composition was immersed in an aqueous solution of 5-doxylstearic acid (concentration: 1.26×10$^{-4}$ mol/L) at normal temperature for seven days, and then dried at 130° C. and 100 Pa for two hours. Further, the golf ball resin composition was sandwiched with a polyethylene terephthalate (PET) film, and pressed at 6.3 MPa to form a sheet with a thickness of about 250 μm. A strip with a width of about 1 mm was cut from the sheet to prepare a measuring sample.

The measuring sample was added in a sample tube made of quartz with a diameter of 5 mm to conduct the measurement. The measurement was conducted under the conditions of a temperature: 20° C., a microwave frequency: X band, a microwave output: 1.0 mW, a chart sweeping time: 4 min, a modulated magnetic field strength: 0.1 mT, and a recorder response: 0.03 s.

From the obtained ESR spectrum, the hyperfine coupling constant ($A_{zz}$) was calculated. Specifically, a difference between the magnetic field strength at the peak top of the convex peak appearing at the lowest magnetic field side and the magnetic field strength at the peak top of the concave peak appearing at the highest magnetic field side was calculated, and the difference was divided by 2. It is noted that the magnetic field strength difference is two folds of the hyperfine coupling constant ($A_{zz}$).

(4) Thickness of Constrained Layer (4-1) X-Ray Small Angle Scattering Measurement The measurement was conducted with a small angle scattering measurement apparatus (Type: NANO-Viewer, CuKα ray (λ=0.154 nm) available from Rigaku Corporation). A measuring sample that had been stored at room temperature for at least four weeks after the preparation, was used. The measurement was conducted under the following conditions.

[Measuring Conditions]

Slit: 1st slit=0.4 mm, 2nd slit=0.2 mm, 3rd slit=0.45 mm

Camera length: 197 mm

Measuring method: transmission method

Exposure time: five minutes exposure for each of upper, middle and lower parts in order Sample thickness: 1 mm Angle range: 0.3°≤2θ≤10° (0.2≤q (nm$^{-1}$)≤7)

Based on the measuring results, the radius ($R_1$) of the ion association was calculated according to the following formulae. Specifically, firstly, data of q values (measuring range: 0.2≤q (nm$^{-1}$)≤7) and their corresponding peak strength I(q) values (=$I_e(q) \cdot V \cdot \rho_1^2$) were obtained based on the measuring results. Then, an experimental result curve was obtained by plotting the peak strength I(q) values versus the q values. $R_1$ was calculated by performing a fitting analysis to the curve.

[Mathematical formula 2]

$$I(q) = I_e(q) V \frac{1}{v_p} v_1^2 \rho_1^2 \Phi^2(qR_1) \frac{1}{1 + (8v_{ca}/v_p)\varepsilon\Phi(2qR_{ca})} \quad \text{Formula 1}$$

$$\Phi(x) = \left[\frac{3(\sin x - x\cos x)}{x^3}\right] \quad \text{Formula 2}$$

$$\Phi(qR_1) = \frac{3 \times \sin(2q \times R_1) - 2q \times R_1 \times \cos(2q \times R_1)}{(2q \times R_1)^3} \quad \text{Formula 3}$$

$$\Phi(qR_{ca}) = \frac{3 \times \sin(2q \times R_{ca}) - 2q \times R_{ca} \times \cos(2q \times R_{ca})}{(2q \times R_{ca})^3} \quad \text{Formula 4}$$

$$v_1 = (4/3)\pi R_1^3$$
$$v_{ca} = (4/3)\pi R_{ca}^3$$
$$v_p = V/N$$
$$q = (4\pi/\lambda)\sin\theta$$

$R_1$: radius of ion association (Å)

$R_{ca}$: radius of ion cluster (Å)

$I(q)$: scattering strength $I_e(q)$: scattering strength from one electron

V: sample volume irradiated by X-ray

N: ion association number in irradiated sample volume $\rho_1$: electron density of ion association q: scattering vector (nm$^{-1}$)

ε: relative permittivity of gas at normal temperature/normal pressure (ε = 1)

λ: wavelength of X-ray (nm)

2θ: diffraction angle

The maximum value of the measured peak strength I(q) values is determined by the scattering strength ($I_e$) from one electron, sample volume (V), and ion association density ($\rho_1$) in the sample at that time. Accordingly, the "$I_e(q) \cdot V \cdot \rho_1^2$" portion in the formula 1 is the maximum value of the peak strength when measuring a sample.

Based on the formula 2, $\Phi(qR_1)$ and $\Phi(qR_{ca})$ are expressed as the formula 3 and the formula 4, respectively. Accordingly, $\Phi(qR_1)$ and $\Phi(qR_{ca})$ corresponding to the q value are determined by $R_1$ and $R_{ca}$, respectively. In addition, $v_1$ is a value determined by $R_1$, and $V_{ca}$ is a value determined by $R_{ca}$. Accordingly, based on the formula 1, the peak strength I(q) value corresponding to the q value can be determined by four constants, i.e. the peak strength maximum value (=$I_e(q) \cdot V \cdot \rho_1^2$) obtained from the experimental results at that time, $R_1$ value, $R_{ca}$ value, and $v_p$ value.

Accordingly, $R_1$ can be calculated by fitting three values, i.e. the $R_1$ value, $R_{ca}$ value and $v_p$ value such that the fitted I(q) value has the same value as the I(q) value calculated by assigning each q value of the experimental result and the above four constants to the formula 1.

The fitting was conducted under the following conditions using the solver add-in function of the Table calculation software (EXCEL (registered trademark) 2010 available from Microsoft Inc.).

[Solver Add-in Conditions]
  Solution: GRG nonlinearity, differential coefficient median
  Repetition times: 10,000 times
  Maximum time: 100 seconds
  Yield: 0.0001
  Initial conditions: $V_\rho=1,000$, $R_1=2$, $R_{ca}=4$
  Other setting conditions: default conditions (4-2) Temperature Variable Spin Probe-Electron Spin Resonance Method The measurement was conducted with an electron spin resonance (ESR) apparatus (Type: JES-TE 200 available from JEOL Ltd.) by a spin probe method. As the spin probe for the constrained layer, 5-doxylstearic acid (5DSA) (available from Aldrich Chemical Inc.), 7-doxylstearic acid (7DSA) (available from NARD institute, Ltd.), 10-doxylstearic acid (10DSA) (available from NARD institute, Ltd.), and 12-doxylstearic acid (12DSA) (available from Aldrich Chemical Inc.) were used. As the spin probe for the matrix region, 10-doxylnonadecane (10DND) (available from Avanti Polar lipids Inc.) was used.

The golf ball resin composition used for the measurement was stored at room temperature for at least four weeks after the preparation. The golf ball resin composition was immersed in each aqueous solution of the spin probe (concentration: $1.26 \times 10^{-4}$ mol/L) at normal temperature for seven days, and then dried at normal temperature and 100 Pa for seven days. Further, the golf ball resin composition was sandwiched with a polyethylene terephthalate (PET) film, and pressed at 6.3 MPa to form a sheet with a thickness of about 250 μm. A strip with a width of about 1 mm was cut from the sheet to prepare a measuring sample.

The measuring sample was added in a sample tube made of quartz with a diameter of 5 mm, the internal pressure of the sample tube was reduced until it became less than 100 Pa, and then the sample tube was sealed. The sample tube was set in the apparatus to conduct the measurement. The measurement was conducted under the conditions of a microwave frequency: X band, a modulated magnetic field strength: 0.1 mT, and a chart sweeping time: 4 min. The sample temperature was firstly cooled to $-196°$ C. with liquid nitrogen and then raised at a temperature rising rate of $1.5°$ C./min, and the measurement was conducted every $10°$ C. in a range from $-120°$ C. to $130°$ C.

It is noted that if the sample temperature is low, the spin-lattice relaxation time becomes long, and thus the ESR signal may saturate. Thus, in order to prevent the ESR signal from saturating, the microwave output was adjusted according to the measuring temperature. The microwave output was adjusted to 0.02 mW when the sample temperature was $-196°$ C. or more and less than $-120°$ C., adjusted to 0.05 mW when the sample temperature was $-120°$ C. or more and less than $-70°$ C., adjusted to 0.1 mW when the sample temperature was $-70°$ C. or more and less than $-50°$ C., adjusted to 0.2 mW when the sample temperature was $-50°$ C. or more and less than $-10°$ C., adjusted to 0.5 mW when the sample temperature was $-10°$ C. or more and less than $10°$ C., and adjusted to 1.0 mW when the sample temperature was $10°$ C. or more.

From the ESR spectrum obtained by using each spin probe, the motion parameter ($2A'_{zz}$) at each temperature was obtained. The motion parameter ($2A_{zz}$) is a difference between the magnetic field strength at the peak top of the convex peak appearing at the lowest magnetic field side and the magnetic field strength at the peak top of the concave peak appearing at the highest magnetic field side. Next, the temperature ($T_{5\ mT}$) of each probe position (a temperature at which the motion parameter ($2A'_{zz}$) became 5 mT (50 G)) was obtained. For each spin probe, the obtained motion parameter ($2A'_{zz}$) was plotted versus the measuring temperature, and each plot was connected with a linear line. Then, the temperature at a point where the linear line crossed with a linear line ($2A'_{zz}=50$ G) parallel to the horizontal axis, was obtained and adopted as the temperature ($T_{5\ mT}$).

(4-3) Thickness of Constrained Layer

The temperature ($T_{5\ mT}$) of each probe position (5DSA, 7DSA, 10DSA, 12DSA) was plotted versus the distance (d-$R_1$) from the surface of the ion association, and a linear regression equation was calculated by a least square method. The distance (d-$R_1$) at the temperature ($T_{5\ mT}$) of the probe position (10DND) was calculated based on the linear regression equation, and adopted as the thickness of the constrained layer. It is noted that, in the calculation, $R_1$ is obtained from the nearest distance between the ion associations by the X-ray small angle scattering measurement, thus there are cases that $R_1$ is greater than the actual value, and the (d-$R_1$) value is a minus value. In the case that d<$R_1$, it is regarded that "(d-$R_1$)=0".

It is noted that the probe position of each spin probe was calculated by subtracting the radius ($R_1$) of the ion association calculated by the aforementioned (1-1), from the distance (d) of from the carboxyl group side terminal to the carbon atom where the doxylnitroxide is bonded in the molecule of the spin probe. The distance (d) of each spin probe was 5DSA=5 Å, 7DSA=8 Å, 10DSA=12 Å, and 12DSA=14 Å.

(5) Slab Hardness

Sheets with a thickness of about 2 mm were produced by injection molding the resin composition. The sheets were stored at $23°$ C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore C".

(6) Melt Flow Rate (MFR) (g/10 min)

MFR was measured according to JIS K7210 (1999) with a flow tester (Shimadzu Flow Tester CFT-100C available from Shimadzu Corporation). It is noted that the measurement was conducted under the conditions of a measuring temperature of $190°$ C. and a load of 2.16 kgf.

(7) Rebound Resilience (%)

The rebound resilience test was carried out according to JIS K6255 (2013). Sheets with a thickness of about 2 mm were produced by heat press molding the resin composition at $170°$ C. for 10 minutes. A cylindrical test piece with a thickness of about 12 mm and a diameter of 28 mm was produced by punching the sheet obtained above into a circular shape with a diameter of 28 mm, and stacking six of the obtained circular sheets. The test piece was stored at a temperature of $23°$ C. plus or minus $2°$ C. and a relative humidity of 50% plus or minus 5% for 12 hours. The rebound resilience of the obtained test piece was measured with a Lupke type rebound resilience tester (available from Ueshima Seisakusho Co., Ltd.). The planar part of the stacked test piece obtained above was held by a mechanical fixing method during the measurement, and the measurement was carried out at a temperature of $23°$ C., relative humidity of 50%, impact end diameter of 12.50 mm plus or minus 0.05 mm, impact mass of 0.35 kg plus or minus 0.01 kg and impact speed of 1.4 m/s plus or minus 0.01 m/s.

(8) Compression Deformation Amount (mm)

The deformation amount along the compression direction of the core or golf ball (shrinking amount along the compression direction of the core or golf ball), when applying a load from an initial load of 98 N to a final load of 1275 N to the core or golf ball, was measured.

(9) Core Hardness (Shore C Hardness)

The hardness measured at the surface of the core was adopted as the surface hardness of the core. In addition, the hardness measured at the central point of a cut plane which was obtained by cutting the core into two hemispheres was adopted as the center hardness of the core. The hardness was measured with an automatic hardness tester (Digitest II, available from Bareiss company) using a detector of "Shore C".

(10) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted using twelve samples for each golf ball, and the average value thereof was adopted as the coefficient of restitution of the golf ball.

[Preparation of Golf Ball Resin Composition of First Embodiment]

Golf Ball Resin Compositions No. A1 to No. A24 and No. A27

According to the formulations shown in Tables 1 and 2, the component (a1-1), the component (a1-2) or the component (a2-1), and the component (b1), the component (b2) and/or the component (b3) were added into a kneader, and kneaded at 180° C. for 30 minutes. Then, the component (c) was charged therein, and further kneaded at 220° C. for 40 minutes to prepare golf ball resin compositions. The golf ball resin compositions were pelletized with an extruder.

Golf ball resin compositions No. A25 and No. A26

According to the formulations shown in Table 2, the component (a2-1) and the component (c) were added into a kneader, and kneaded at 220° C. for 60 minutes to prepare golf ball resin compositions. The golf ball resin compositions were pelletized with an extruder.

Golf Ball Resin Composition No. A28 to No. A32

According to the formulations shown in Table 3, all the materials were simultaneously added into a kneader, and kneaded at 220° C. for 60 minutes to prepare golf ball resin compositions. The golf ball resin compositions were pelletized with an extruder. It is noted that the intermediate layers of the golf balls No. A28 to No. A32 have the same formulation as the intermediate layers of the golf balls No. A2, No. A9, No. A11, No. A16 and No. A23, respectively.

Golf Ball Resin Compositions No. A33 to No. A37

According to the formulations shown in Table 3, the component (b1), the component (b2) and/or the component (b3), and the component (c) were added into a kneader, and kneaded at 140° C. for 30 minutes. After the obtained solid was pulverized with a mortar, the component (a1-1) or the component (a2-1) was charged therein, and kneaded at 220° C. for 40 minutes to prepare golf ball resin compositions. The golf ball resin compositions were pelletized with an extruder. It is noted that the golf ball resin compositions No. A28 to No. A32 have the same formulation as the golf ball resin compositions No. A2, No. A9, No. A11, No. A16 and No. A23, respectively.

Figure 5:
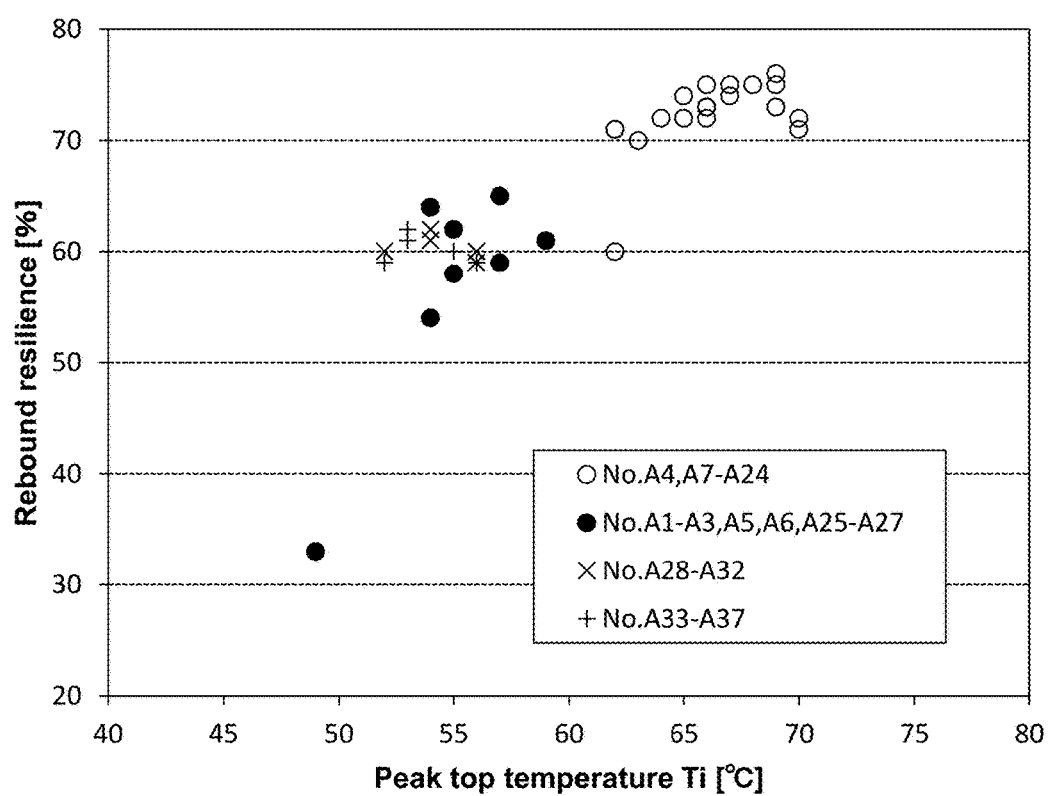
FIG. 5 is a graph showing a relationship between a peak top temperature (Ti) and a rebound resilience of a golf ball resin composition of the first embodiment.
Figure 6:
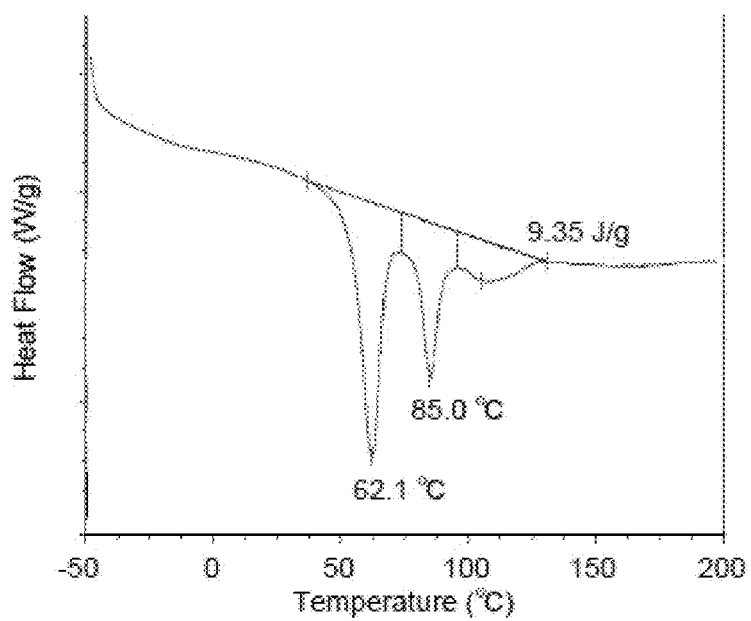
FIG. 6 is a DSC curve of the golf ball resin composition No. A4.
Figure 7:
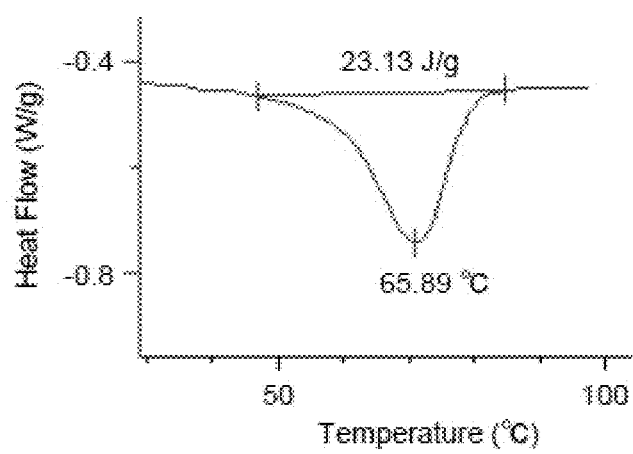
FIG. 7 is a DSC curve of the golf ball resin composition No. A8.

Evaluation results of the golf ball resin compositions are shown in Tables 1 to 3. The relationship between the peak top temperature (Ti) and the rebound resilience of each golf ball resin composition is shown in FIG. 5. In addition, the DSC curve of the golf ball resin composition No. A4 is shown in FIG. 6, and the DSC curve of the golf ball resin composition No. A8 is shown in FIG. 7. In the DSC curve of the golf ball resin composition No. A8, the first endothermic peak and the second endothermic peak completely overlap.

TABLE 1

| | | | | Golf ball No. | | | | | | | |
|---|---|---|---|---|---|---|---|---|---|---|---|
| | | | | A1 | A2 | A3 | A4 | A5 | A6 | A7 | A8 |
| Intermediate layer | Golf ball resin composition No. | | | a1 | a2 | a3 | a4 | a5 | a6 | a7 | a8 |
| | Formulation (part by mass) | (a2-1) | Nucrel AN4319 | 100 | 100 | 100 | 100 | 100 | 100 | 100 | 100 |
| | | (a1-1) | Nucrel N1560 | — | — | — | — | — | — | — | — |
| | | (a1-2) | Himilan AM7311 | — | — | — | — | — | — | — | — |
| | | (b3) | Oleic acid | 30 | 70 | — | — | — | — | — | — |
| | | | Linoleic acid | — | — | — | — | — | — | — | — |
| | | (b2) | Lauric acid | — | — | — | — | — | — | — | — |
| | | | Palmitic acid | — | — | — | — | — | — | — | — |
| | | | Stearic acid | — | — | 30 | 30 | 70 | — | — | — |
| | | | Behenic acid | — | — | — | — | — | 30 | — | — |
| | | | Isostearic acid | — | — | — | — | — | — | — | — |
| | | (b1) | Oleylbetaine | — | — | — | — | — | — | 30 | 70 |
| | | (c) | Sodium carbonate | — | — | — | — | — | — | — | — |
| | | | Magnesium hydroxide | 8.1 | 13.9 | 8.1 | 11.6 | 13.8 | 7.4 | 6.9 | 9.5 |
| | Properties | | Acid amount in copolymer (mass %) | 8 | 8 | 8 | 8 | 8 | 8 | 8 | 8 |
| | | | Total neutralization degree (mole %) | 140 | 140 | 140 | 200 | 140 | 140 | 180 | 180 |
| | | | MFR (g/10 min) | 4.8 | 13.2 | 3.8 | 1.9 | 12.0 | 2.9 | 0.5 | 0.2 |
| | | | Slab hardness (Shore C) | 74 | 74 | 81 | 82 | 83 | 87 | 75 | 72 |
| | | | Rebound resilience (%) | 64 | 65 | 58 | 60 | 62 | 61 | 75 | 72 |
| | | | Peak top temperature Tm (° C.) | 64 | 60 | 69 | 85 | 66 | 68 | 71 | 66 |
| | | | Peak top temperature Ti (° C.) | 54 | 57 | 55 | 62 | 55 | 59 | 68 | 66 |
| | | | Temperature difference (Tm − Ti) (° C.) | 10 | 3 | 14 | 23 | 11 | 9 | 3 | 0 |

TABLE 1-continued

| Golf ball evaluation | Compression deformation amount (mm) | 2.6 | 2.6 | 2.5 | 2.5 | 2.5 | 2.4 | 2.6 | 2.7 |
|---|---|---|---|---|---|---|---|---|---|
| | Coefficient of restitution (40 m/s) | 0.809 | 0.820 | 0.746 | 0.767 | 0.788 | 0.778 | 0.925 | 0.894 |

| | | | | | Golf ball No. | | | | | |
|---|---|---|---|---|---|---|---|---|---|---|
| | | | | A9 | A10 | A11 | A12 | A13 | A14 | A15 |
| Intermediate layer | Golf ball resin composition No. | | | a9 | a10 | a11 | a12 | a13 | a14 | a15 |
| | Formulation (part by mass) | (a2-1) | Nucrel AN4319 | — | — | — | — | — | — | — |
| | | (a1-1) | Nucrel N1560 | 100 | 100 | 100 | 100 | 100 | 100 | 100 |
| | | (a1-2) | Himilan AM7311 | — | — | — | — | — | — | — |
| | | (b3) | Oleic acid | 90 | 100 | 100 | 100 | 70 | 100 | 100 |
| | | | Linoleic acid | — | — | — | — | — | — | — |
| | | (b2) | Lauric acid | — | — | — | — | — | — | — |
| | | | Palmitic acid | — | — | — | — | — | — | — |
| | | | Stearic acid | — | — | — | — | — | — | — |
| | | | Behenic acid | — | 30 | 10 | 30 | 50 | 30 | 30 |
| | | | Isostearic acid | — | — | — | — | — | — | — |
| | | (b1) | Oleylbetaine | 5 | — | 5 | 5 | 5 | 20 | 30 |
| | | (c) | Sodium carbonate | — | — | — | — | — | — | — |
| | | | Magnesium hydroxide | 17.3 | 18.5 | 19.6 | 21.7 | 19.9 | 21.7 | 21.7 |
| | Properties | | Acid amount in copolymer (mass %) | 15 | 15 | 15 | 15 | 15 | 15 | 15 |
| | | | Total neutralization degree (mole %) | 120 | 120 | 120 | 120 | 120 | 119 | 118 |
| | | | MFR (g/10 min) | 3.6 | 4.5 | 3.7 | 3.9 | 4.2 | 3.3 | 2.5 |
| | | | Slab hardness (Shore C) | 84 | 86 | 83 | 84 | 86 | 80 | 77 |
| | | | Rebound resilience (%) | 73 | 70 | 74 | 74 | 75 | 75 | 76 |
| | | | Peak top temperature Tm (° C.) | 68 | 73 | 70 | 71 | 72 | 71 | 70 |
| | | | Peak top temperature Ti (° C.) | 66 | 63 | 65 | 67 | 69 | 66 | 69 |
| | | | Temperature difference (Tm − Ti) (° C.) | 2 | 10 | 5 | 4 | 3 | 5 | 1 |
| Golf ball evaluation | Compression deformation amount (mm) | | | 2.5 | 2.5 | 2.5 | 2.5 | 2.4 | 2.5 | 2.6 |
| | Coefficient of restitution (40 m/s) | | | 0.904 | 0.890 | 0.915 | 0.915 | 0.925 | 0.925 | 0.936 |

TABLE 2

| | | | | Golf ball No. | | | | | |
|---|---|---|---|---|---|---|---|---|---|
| | | | | A16 | A17 | A18 | A19 | A20 | A21 |
| Intermediate layer | Golf ball resin composition No. | | | a16 | a17 | a18 | a19 | a20 | a21 |
| | Formulation (parts by mass) | (a2-1) | Nucrel AN4319 | 100 | — | — | — | — | — |
| | | (a1-1) | Nucrel N1560 | — | — | 100 | 100 | 100 | 100 |
| | | (a1-2) | Himilan AM7311 | — | 100 | — | — | — | — |
| | | (b3) | Oleic acid | 100 | 100 | — | 100 | 100 | 100 |
| | | | Linoleic acid | — | — | 100 | — | — | — |
| | | (b2) | Lauric acid | — | — | — | 30 | — | — |
| | | | Palmitic acid | — | — | — | — | 30 | — |
| | | | Stearic acid | — | — | — | — | — | 30 |
| | | | Behenic acid | 30 | 30 | 30 | — | — | — |
| | | | Isostearic acid | — | — | — | — | — | — |
| | | (b1) | Oleylbetaine | 5 | 5 | 5 | 5 | 5 | 5 |
| | | (c) | Sodium carbonate | — | — | — | — | — | — |
| | | | Magnesium hydroxide | 25.2 | 16.5 | 21.7 | 23.8 | 22.7 | 21.7 |
| | Properties | | Acid amount in copolymer (mass %) | 8 | 15 | 15 | 15 | 15 | 15 |
| | | | Total neutralization degree (mole %) | 160 | 120 | 120 | 120 | 120 | 120 |
| | | | MFR (g/10 min) | 4.2 | 4.2 | 4.1 | 4.6 | 4.4 | 4.2 |
| | | | Slab hardness (Shore C) | 81 | 81 | 86 | 88 | 86 | 85 |
| | | | Rebound resilience (%) | 71 | 71 | 72 | 71 | 72 | 73 |
| | | | Peak top temperature Tm (° C.) | 71 | 71 | 74 | 73 | 74 | 69 |
| | | | Peak top temperature Ti (° C.) | 62 | 70 | 65 | 62 | 64 | 66 |
| | | | Temperature difference (Tm − Ti) (° C.) | 9 | 1 | 9 | 11 | 10 | 3 |
| Golf ball evaluation | Compression deformation amount (mm) | | | 2.5 | 2.6 | 2.4 | 2.4 | 2.4 | 2.5 |
| | Coefficient of restitution (40 m/s) | | | 0.883 | 0.933 | 0.894 | 0.883 | 0.894 | 0.904 |

TABLE 2-continued

|  |  |  |  | Golf ball No. | | | | | |
|---|---|---|---|---|---|---|---|---|---|
|  |  |  |  | A22 | A23 | A24 | A25 | A26 | A27 |
| Intermediate layer | Golf ball resin composition No. | | | a22 | a23 | a24 | a25 | a26 | a27 |
|  | Formulation (parts by mass) | (a2-1) | Nucrel AN4319 | — | — | — | 100 | 100 | 100 |
|  |  | (a1-1) | Nucrel N1560 | 100 | 100 | 100 | — | — | — |
|  |  | (a1-2) | Himilan AM7311 | — | — | — | — | — | — |
|  |  | (b3) | Oleic acid | 100 | 100 | — | — | — | — |
|  |  |  | Linoleic acid | — | — | — | — | — | — |
|  |  | (b2) | Lauric acid | — | — | — | — | — | — |
|  |  |  | Palmitic acid | — | — | — | — | — | — |
|  |  |  | Stearic acid | — | — | — | — | — | — |
|  |  |  | Behenic acid | 30 | 30 | 30 | — | — | — |
|  |  |  | Isostearic acid | — | — | — | — | — | 30 |
|  |  | (b1) | Oleylbetaine | 5 | 5 | 5 | — | — | — |
|  |  | (c) | Sodium carbonate | — | 39.4 | 66.1 | — | — | — |
|  |  |  | Magnesium hydroxide | 32.7 | — | — | 4.3 | 9.0 | 11.6 |
|  | Properties | | Acid amount in copolymer (mass %) | 15 | 15 | 15 | 8 | 8 | 8 |
|  |  | | Total neutralization degree (mole %) | 180 | 120 | 200 | 160 | 332 | 200 |
|  |  | | MFR (g/10 min) | 2.3 | 4.7 | 2.5 | 0.7 | 0.3 | 2.1 |
|  |  | | Slab hardness (Shore C) | 88 | 85 | 87 | 77 | 79 | 72 |
|  |  | | Rebound resilience (%) | 75 | 72 | 73 | 59 | 54 | 33 |
|  |  | | Peak top temperature Tm (° C.) | 76 | 73 | 73 | 71 | 71 | 71 |
|  |  | | Peak top temperature Ti (° C.) | 67 | 70 | 69 | 57 | 54 | 49 |
|  |  | | Temperature difference (Tm − Ti) (° C.) | 9 | 3 | 4 | 14 | 17 | 22 |
| Golf ball evaluation | | | Compression deformation amount (mm) | 2.4 | 2.5 | 2.4 | 2.6 | 2.5 | 2.7 |
|  | | | Coefficient of restitution (40 m/s) | 0.925 | 0.894 | 0.904 | 0.757 | 0.704 | 0.483 |

TABLE 3

|  |  |  |  | Golf ball No. | | | | |
|---|---|---|---|---|---|---|---|---|
|  |  |  |  | A28 | A29 | A30 | A31 | A32 |
| Intermediate layer | Golf ball resin composition No. | | | a28 | a29 | a30 | a31 | a32 |
|  | Formulation (parts by mass) | (a2-1) | Nucrel AN4319 | 100 | — | — | 100 | — |
|  |  | (a1-1) | Nucrel N1560 | — | 100 | 100 | — | 100 |
|  |  | (a1-2) | Himilan AM7311 | — | — | — | — | — |
|  |  | (b3) | Oleic acid | 70 | 90 | 100 | 100 | 100 |
|  |  |  | Linoleic acid | — | — | — | — | — |
|  |  | (b2) | Lauric acid | — | — | — | — | — |
|  |  |  | Palmitic acid | — | — | — | — | — |
|  |  |  | Stearic acid | — | — | — | — | — |
|  |  |  | Behenic acid | — | — | 10 | 30 | 30 |
|  |  |  | Isostearic acid | — | — | — | — | — |
|  |  | (b1) | Oleylbetaine | — | 5 | 5 | 5 | 5 |
|  |  | (c) | Sodium carbonate | — | — | — | — | 39.4 |
|  |  |  | Magnesium hydroxide | 13.9 | 17.3 | 19.6 | 25.2 | — |
|  | Properties | | Acid amount in copolymer (mass %) | 8 | 15 | 15 | 8 | 15 |
|  |  | | Total neutralization degree (mole %) | 140 | 120 | 120 | 160 | 120 |
|  |  | | MFR (g/10 min) | 13.1 | 3.5 | 3.7 | 4.2 | 4.6 |
|  |  | | Slab hardness (Shore C) | 86 | 90 | 91 | 85 | 91 |
|  |  | | Rebound resilience (%) | 60 | 62 | 59 | 60 | 61 |
|  |  | | Peak top temperature Tm (° C.) | 71 | 74 | 75 | 70 | 74 |
|  |  | | Peak top temperature Ti (° C.) | 52 | 54 | 56 | 56 | 54 |
|  |  | | Temperature difference (Tm − Ti) (° C.) | 19 | 20 | 19 | 14 | 20 |
| Golf ball evaluation | | | Compression deformation amount (mm) | 2.4 | 2.4 | 2.4 | 2.3 | 2.4 |
|  | | | Coefficient of restitution (40 m/s) | 0.737 | 0.761 | 0.758 | 0.711 | 0.704 |

|  |  |  |  | Golf ball No. | | | | |
|---|---|---|---|---|---|---|---|---|
|  |  |  |  | A33 | A34 | A35 | A36 | A37 |
| Intermediate layer | Golf ball resin composition No. | | | a33 | a34 | a35 | a36 | a37 |
|  | Formulation (parts by mass) | (a2-1) | Nucrel AN4319 | 100 | — | — | 100 | — |
|  |  | (a1-1) | Nucrel N1560 | — | 100 | 100 | — | 100 |
|  |  | (a1-2) | Himilan AM7311 | — | — | — | — | — |
|  |  | (b3) | Oleic acid | 70 | 90 | 100 | 100 | 100 |
|  |  |  | Linoleic acid | — | — | — | — | — |
|  |  | (b2) | Lauric acid | — | — | — | — | — |
|  |  |  | Palmitic acid | — | — | — | — | — |
|  |  |  | Stearic acid | — | — | — | — | — |
|  |  |  | Behenic acid | — | — | 10 | 30 | 30 |
|  |  |  | Isostearic acid | — | — | — | — | — |

TABLE 3-continued

|  |  |  |  |  |  |  |
|---|---|---|---|---|---|---|
|  | (b1) | Oleylbetaine | — | 5 | 5 | 5 | 5 |
|  | (c) | Sodium carbonate | — | — | — | — | 39.4 |
|  |  | Magnesium hydroxide | 13.9 | 17.3 | 19.6 | 25.2 | — |
| Properties |  | Acid amount in copolymer (mass %) | 8 | 15 | 15 | 8 | 15 |
|  |  | Total neutralization degree (mole %) | 140 | 120 | 120 | 160 | 120 |
|  |  | MFR (g/10 min) | 13.2 | 3.5 | 3.5 | 4.3 | 4.4 |
|  |  | Slab hardness (Shore C) | 85 | 89 | 92 | 85 | 90 |
|  |  | Rebound resilience (%) | 59 | 62 | 60 | 59 | 61 |
|  |  | Peak top temperature Tm (° C.) | 69 | 75 | 73 | 70 | 73 |
|  |  | Peak top temperature Ti (° C.) | 52 | 53 | 55 | 56 | 53 |
|  |  | Temperature difference (Tm − Ti) (° C.) | 17 | 22 | 18 | 14 | 20 |
| Golf ball |  | Compression deformation amount (mm) | 2.4 | 2.4 | 2.4 | 2.3 | 2.4 |
| evaluation |  | Coefficient of restitution (40 m/s) | 0.724 | 0.753 | 0.728 | 0.698 | 0.681 |

Nucrel AN4319: ethylene-methacrylic acid-butyl methacrylate copolymer (amount of methacrylic acid: 8 mass %, MFR (190° C., 2.16 kgf): 55 g) available from Mitsui-Du Pont Polychemicals Co., Ltd.

Nucrel N1560: ethylene-methacrylic acid copolymer (amount of methacrylic acid: 15 mass %, MFR (190° C., 2.16 kgf): 60 g) available from Mitsui-Du Pont Polychemicals Co., Ltd.

Himilan (registered trademark) AM7311: magnesium ion-neutralized product of a binary copolymer composed of an olefin and an α,β-unsaturated carboxylic acid having 3 to 8 carbon atoms (acid amount in copolymer: 15 mass %, neutralization degree: 50 mole %) available from Mitsui-Du Pont Polychemicals Co., Ltd.

Oleic acid: available from Tokyo Chemical Industry Co., Ltd.

Linoleic acid: available from Tokyo Chemical Industry Co., Ltd.

Lauric acid: available from Tokyo Chemical Industry Co., Ltd.

Palmitic acid: available from Tokyo Chemical Industry Co., Ltd.

Stearic acid: available from Tokyo Chemical Industry Co., Ltd.

Behenic acid: available from Tokyo Chemical Industry Co., Ltd.

Oleylbetaine: purified product obtained by removing water and salt from "Chembetaine OL" (oleyldimethylaminoacetic acid betaine) available from The Lubrizol Corporation Isostearic acid: 2,2,4,8,10,10-hexamethylundecane-5-carboxylic acid (C18) available from Tokyo Chemical Industry Co., Ltd.

Sodium carbonate: available from Tokyo Chemical Industry Co., Ltd.

Magnesium hydroxide: available from Wako Pure Chemical Industries, Ltd.

The golf ball resin compositions No. A4 and No. A7 to No. A24 contain an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer) as a resin component, wherein the peak top temperature (Ti) ranges from 60° C. to 70° C. These golf ball resin compositions have a high rebound resilience.

The golf ball resin compositions No. A1 to No. A3, No. A5, No. A6, and No. A25 to No. A37 are the cases where the peak top temperature (Ti) is less than 60° C. These golf ball resin compositions have a poor rebound resilience. It is noted that although the golf ball resin compositions No. A28 to No. A37 have the same formulation as the golf ball resin compositions No. A2, No. A9, No. A11, No. A16 and No. A23, respectively, the peak top temperature (Ti) thereof is less than 60° C. since they were manufactured in a different process.

[Preparation of Golf Ball Resin Composition of Second Embodiment]

Golf Ball Resin Compositions No. B1 to No. B21

According to the formulations shown in Tables 4 and 5, the component (a1-1), the component (a1-2) or the component (a2-1), and the component (b1), the component (b2) and/or the component (b3) were added into a kneader, and kneaded at 180° C. for 30 minutes. Then, the component (c) was charged therein, and further kneaded at 220° C. for 40 minutes to prepare golf ball resin compositions. The golf ball resin compositions were pelletized with an extruder.

Golf Ball Resin Compositions No. B22 and No. B23

According to the formulations shown in Table 5, the component (a2-1) and the component (c) were added into a kneader, and kneaded at 220° C. for 60 minutes to prepare golf ball resin compositions. The golf ball resin compositions were pelletized with an extruder.

Golf Ball Resin Compositions No. B24 to No. B28

According to the formulations shown in Table 6, all the materials were simultaneously added into a kneader, and kneaded at 220° C. for 60 minutes to prepare golf ball resin compositions. The golf ball resin compositions were pelletized with an extruder. It is noted that the intermediate layers of the golf balls No. B24 to No. B28 have the same formulation as the intermediate layers of the golf balls No. B2, No. B6, No. B8, No. B13 and No. B20, respectively.

Golf Ball Resin Compositions No. B29 to B33

According to the formulations shown in Table 6, the component (b1), the component (b2) and/or the component (b3), and the component (c) were added into a kneader, and kneaded at 140° C. for 30 minutes. After the obtained solid was pulverized with a mortar, the component (a1-1) or the component (a2-1) was charged therein, and kneaded at 220° C. for 40 minutes to prepare golf ball resin compositions. The golf ball resin compositions were pelletized with an extruder. It is noted that the golf ball resin compositions No. B29 to No. B33 have the same formulation as the golf ball resin compositions No. B2, No. B6, No. B8, No. B13 and No. B20, respectively.

Figure 8:
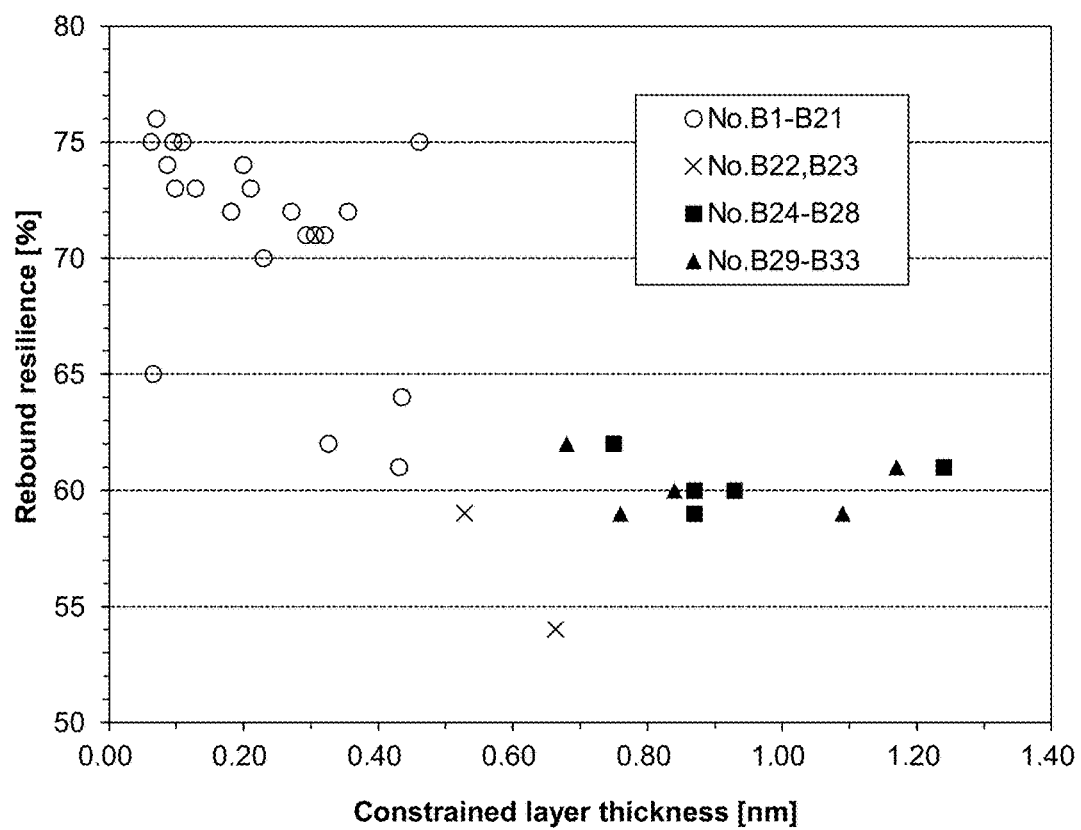
FIG. 8 is a graph showing a relationship between a constrained layer thickness and a rebound resilience of a golf ball resin composition of the second embodiment.
Figure 9:
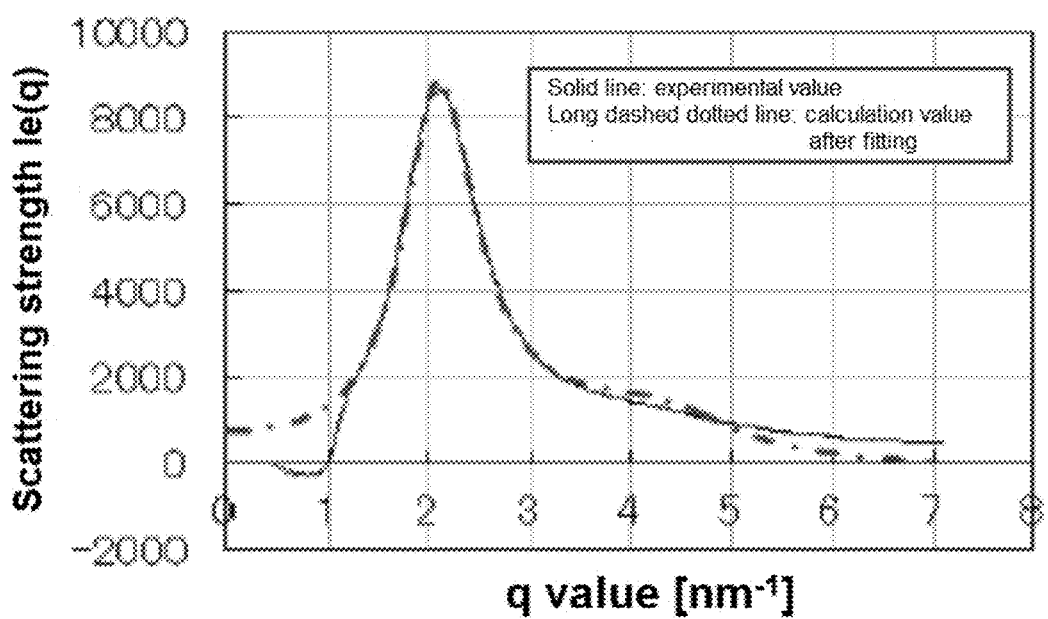
FIG. 9 is an SAXS pattern of the golf ball resin composition No. B1.

Evaluation results of the golf ball resin compositions are shown in Tables 4 to 6. The relationship between the constrained layer thickness and the rebound resilience of each golf ball resin composition is shown in FIG. 8. In addition, the SAXS pattern and the fitting analysis curve of the golf ball resin composition No. B1 are shown in FIG. 9.

TABLE 4

| | | | | | Golf ball No. | | | | | |
|---|---|---|---|---|---|---|---|---|---|---|
| | | | | | B1 | B2 | B3 | B4 | B5 | B6 |
| Intermediate layer | Golf ball resin composition No. | | | | b1 | b2 | b3 | b4 | b5 | b6 |
| | Formulation (parts by mass) | (a2-1) | Nucrel AN4319 | | 100 | 100 | 100 | 100 | 100 | — |
| | | (a1-1) | Nucrel N1560 | | — | — | — | — | — | 100 |
| | | (a1-2) | Himilan AM7311 | | — | — | — | — | — | — |
| | | (b3) | Oleic acid | | 30 | 70 | — | — | — | 90 |
| | | | Linoleic acid | | — | — | — | — | — | — |
| | | (b2) | Lauric acid | | — | — | — | — | — | — |
| | | | Palmitic acid | | — | — | — | — | — | — |
| | | | Stearic acid | | — | — | 70 | — | — | — |
| | | | Behenic acid | | — | — | — | 30 | — | — |
| | | (b1) | Oleylbetaine | | — | — | — | — | 30 | 5 |
| | | (c) | Sodium carbonate | | — | — | — | — | — | — |
| | | | Magnesium hydroxide | | 8.1 | 13.9 | 13.8 | 7.4 | 6.9 | 17.3 |
| | Properties | Acid amount in copolymer (mass %) | | | 8 | 8 | 8 | 8 | 8 | 15 |
| | | Total neutralization degree (mole %) | | | 140 | 140 | 140 | 140 | 180 | 120 |
| | | MFR (g/10 min) | | | 4.8 | 13.2 | 12.0 | 2.9 | 0.5 | 3.6 |
| | | Slab hardness (Shore C) | | | 74 | 74 | 83 | 87 | 75 | 84 |
| | | Rebound resilience (%) | | | 64 | 65 | 62 | 61 | 75 | 73 |
| | | Radius of ion association $R_1$ (nm) | | | 0.79 | 1.10 | 1.03 | 1.10 | 0.67 | 1.24 |
| | | Radius of ion cluster $R_{ca}$ (nm) | | | 1.22 | 1.17 | 1.36 | 1.53 | 1.13 | 1.37 |
| | | Volume of ion association $V_p$ (nm$^3$) | | | 38.4 | 37.5 | 49.1 | 56.6 | 51.3 | 42.7 |
| | | Thickness of constrained layer (nm) | | | 0.44 | 0.07 | 0.33 | 0.43 | 0.46 | 0.13 |
| Golf ball evaluation | Compression deformation amount (mm) | | | | 2.6 | 2.6 | 2.5 | 2.4 | 2.6 | 2.5 |
| | Coefficient of restitution (40 m/s) | | | | 0.809 | 0.820 | 0.788 | 0.778 | 0.925 | 0.904 |

| | | | | | Golf ball No. | | | | | |
|---|---|---|---|---|---|---|---|---|---|---|
| | | | | | B7 | B8 | B9 | B10 | B11 | B12 |
| Intermediate layer | Golf ball resin composition No. | | | | b7 | b8 | b9 | b10 | b11 | b12 |
| | Formulation (parts by mass) | (a2-1) | Nucrel AN4319 | | — | — | — | — | — | — |
| | | (a1-1) | Nucrel N1560 | | 100 | 100 | 100 | 100 | 100 | 100 |
| | | (a1-2) | Himilan AM7311 | | — | — | — | — | — | — |
| | | (b3) | Oleic acid | | 100 | 100 | 100 | 70 | 100 | 100 |
| | | | Linoleic acid | | — | — | — | — | — | — |
| | | (b2) | Lauric acid | | — | — | — | — | — | — |
| | | | Palmitic acid | | — | — | — | — | — | — |
| | | | Stearic acid | | — | — | — | — | — | — |
| | | | Behenic acid | | 30 | 10 | 30 | 50 | 30 | 30 |
| | | (b1) | Oleylbetaine | | — | 5 | 5 | 5 | 20 | 30 |
| | | (c) | Sodium carbonate | | — | — | — | — | — | — |
| | | | Magnesium hydroxide | | 18.5 | 19.6 | 21.7 | 19.9 | 21.7 | 21.7 |
| | Properties | Acid amount in copolymer (mass %) | | | 15 | 15 | 15 | 15 | 15 | 15 |
| | | Total neutralization degree (mole %) | | | 120 | 120 | 120 | 120 | 119 | 118 |
| | | MFR (g/10 min) | | | 4.5 | 3.7 | 3.9 | 4.2 | 3.3 | 2.5 |
| | | Slab hardness (Shore C) | | | 86 | 83 | 84 | 86 | 80 | 77 |
| | | Rebound resilience (%) | | | 70 | 74 | 74 | 75 | 75 | 76 |
| | | Radius of ion association $R_1$ (nm) | | | 1.21 | 1.27 | 1.25 | 1.20 | 1.24 | 1.36 |
| | | Radius of ion cluster $R_{ca}$ (nm) | | | 1.44 | 1.47 | 1.34 | 1.31 | 1.34 | 1.43 |
| | | Volume of ion association $V_p$ (nm$^3$) | | | 39.8 | 36.6 | 51.6 | 49.4 | 66.4 | 65.3 |
| | | Thickness of constrained layer (nm) | | | 0.23 | 0.20 | 0.09 | 0.11 | 0.10 | 0.07 |
| Golf ball evaluation | Compression deformation amount (mm) | | | | 2.4 | 2.5 | 2.5 | 2.4 | 2.5 | 2.6 |
| | Coefficient of restitution (40 m/s) | | | | 0.890 | 0.915 | 0.915 | 0.925 | 0.925 | 0.936 |

TABLE 5

| | | | | | Golf ball No. | | | | | |
|---|---|---|---|---|---|---|---|---|---|---|
| | | | | | B13 | B14 | B15 | B16 | B17 | B18 |
| Intermediate layer | Golf ball resin composition No. | | | | b13 | b14 | b15 | b16 | b17 | b18 |
| | Formulation (parts by mass) | (a2-1) | Nucrel AN4319 | | 100 | — | 13 | — | — | — |
| | | (a1-1) | Nucrel N1560 | | — | — | 100 | 100 | 100 | 100 |
| | | (a1-2) | Himilan AM7311 | | — | 100 | — | — | — | — |
| | | (b3) | Oleic acid | | 100 | 100 | — | 100 | 100 | 100 |
| | | | Linoleic acid | | — | — | 100 | — | — | — |
| | | (b2) | Lauric acid | | — | — | — | — | — | — |
| | | | Palmitic acid | | — | — | — | 30 | — | — |
| | | | Stearic acid | | — | — | — | — | 30 | — |
| | | | Behenic acid | | 30 | 30 | 30 | — | — | 30 |
| | | (b1) | Oleylbetaine | | 5 | 5 | 5 | 5 | 5 | 5 |
| | | (c) | Sodium carbonate | | — | — | — | — | — | — |
| | | | Magnesium hydroxide | | 25.2 | 16.5 | 21.7 | 23.8 | 22.7 | 21.7 |

TABLE 5-continued

| | | | | | | | |
|---|---|---|---|---|---|---|---|
| Properties | Acid amount in copolymer (mass %) | 8 | 15 | 15 | 15 | 15 | 15 |
| | Total neutralization degree (mole %) | 160 | 120 | 120 | 120 | 120 | 120 |
| | MFR (g/10 min) | 4.2 | 4.2 | 4.1 | 4.6 | 4.4 | 4.2 |
| | Slab hardness (Shore C) | 81 | 81 | 86 | 88 | 86 | 85 |
| | Rebound resilience (%) | 71 | 71 | 72 | 71 | 72 | 73 |
| | Radius of ion association $R_1$ (nm) | 1.14 | 1.25 | 1.19 | 1.23 | 1.22 | 1.23 |
| | Radius of ion cluster $R_{ca}$ (nm) | 1.43 | 1.57 | 1.46 | 1.54 | 1.40 | 1.33 |
| | Volume of ion association $V_p$ (nm$^3$) | 61.2 | 56.4 | 42.9 | 45.5 | 39.6 | 48.8 |
| | Thickness of constrained layer (nm) | 0.29 | 0.32 | 0.27 | 0.31 | 0.18 | 0.10 |
| Golf ball evaluation | Compression deformation amount (mm) | 2.5 | 2.5 | 2.4 | 2.4 | 2.4 | 2.5 |
| | Coefficient of restitution (40 m/s) | 0.883 | 0.933 | 0.894 | 0.883 | 0.894 | 0.904 |

| | | | Golf ball No. | | | | |
|---|---|---|---|---|---|---|---|
| | | | B19 | B20 | B21 | B22 | B23 |
| Intermediate layer | Golf ball resin composition No. | | b19 | b20 | b21 | b22 | b23 |
| | Formulation (a2-1) | Nucrel AN4319 | — | — | — | 100 | 100 |
| | (parts by mass) (a1-1) | Nucrel N1560 | 100 | 100 | 100 | — | — |
| | (a1-2) | Himilan AM7311 | — | — | — | — | — |
| | (b3) | Oleic acid | 100 | 100 | 100 | — | — |
| | | Linoleic acid | — | — | — | — | — |
| | (b2) | Lauric acid | — | — | — | — | — |
| | | Palmitic acid | — | — | — | — | — |
| | | Stearic acid | — | — | — | — | — |
| | | Behenic acid | 30 | 30 | 30 | — | — |
| | (b1) | Oleylbetaine | 5 | 5 | 5 | — | — |
| | (c) | Sodium carbonate | — | 39.4 | 66.1 | — | — |
| | | Magnesium hydroxide | 32.7 | — | — | 4.3 | 9.0 |
| Properties | Acid amount in copolymer (mass %) | | 15 | 15 | 15 | 8 | 8 |
| | Total neutralization degree (mole %) | | 180 | 120 | 200 | 160 | 332 |
| | MFR (g/10 min) | | 2.3 | 4.7 | 2.5 | 0.7 | 0.3 |
| | Slab hardness (Shore C) | | 88 | 85 | 87 | 77 | 79 |
| | Rebound resilience (%) | | 75 | 72 | 73 | 59 | 54 |
| | Radius of ion association $R_1$ (nm) | | 1.24 | 1.41 | 1.40 | 0.36 | 0.41 |
| | Radius of ion cluster $R_{ca}$ (nm) | | 1.30 | 1.77 | 1.61 | 0.89 | 1.08 |
| | Volume of ion association $V_p$ (nm$^3$) | | 52.7 | 21.8 | 26.7 | 10.6 | 11.0 |
| | Thickness of constrained layer (nm) | | 0.06 | 0.36 | 0.21 | 0.53 | 0.66 |
| Golf ball evaluation | Compression deformation amount (mm) | | 2.4 | 2.5 | 2.4 | 2.6 | 2.5 |
| | Coefficient of restitution (40 m/s) | | 0.925 | 0.894 | 0.904 | 0.757 | 0.704 |

TABLE 6

| | | | | Golf ball No. | | | | | | | | | |
|---|---|---|---|---|---|---|---|---|---|---|---|---|---|
| | | | | B24 | B25 | B26 | B27 | B28 | B29 | B30 | B31 | B32 | B33 |
| Intermediate layer | Golf ball resin composition No. | | | b24 | b25 | b26 | b27 | b28 | b29 | b30 | b31 | b32 | b33 |
| | Formulation (parts by mass) | (a2-1) | Nucrel AN4319 | 100 | — | — | 100 | — | 100 | — | — | 100 | — |
| | | (a1-1) | Nucrel N1560 | — | 100 | 100 | — | 100 | — | 100 | 100 | — | 100 |
| | | (a1-2) | Himilan AM7311 | — | — | — | — | — | — | — | — | — | — |
| | | (b3) | Oleic acid | 70 | 90 | 100 | 100 | 100 | 70 | 90 | 100 | 100 | 100 |
| | | | Linoleic acid | — | — | — | — | — | — | — | — | — | — |
| | | (b2) | Lauric acid | — | — | — | — | — | — | — | — | — | — |
| | | | Palmitic acid | — | — | — | — | — | — | — | — | — | — |
| | | | Stearic acid | — | — | — | — | — | — | — | — | — | — |
| | | | Behenic acid | — | — | 10 | 30 | 30 | — | — | 10 | 30 | 30 |
| | | (b1) | Oleylbetaine | — | 5 | 5 | 5 | 5 | — | 5 | 5 | 5 | 5 |
| | | (c) | Sodium carbonate | — | — | — | — | 39.4 | — | — | — | — | 39.4 |
| | | | Magnesium hydroxide | 13.9 | 17.3 | 19.6 | 25.2 | — | 13.9 | 17.3 | 19.6 | 25.2 | — |
| | Properties | Acid amount in copolymer (mass %) | | 8 | 15 | 15 | 8 | 15 | 8 | 15 | 15 | 8 | 15 |
| | | Total neutralization degree (mole %) | | 140 | 120 | 120 | 160 | 120 | 140 | 120 | 120 | 160 | 120 |
| | | MFR (g/10 min) | | 13.1 | 3.5 | 3.7 | 4.2 | 4.6 | 13.2 | 3.5 | 3.5 | 4.3 | 4.4 |
| | | Slab hardness (Shore C) | | 86 | 90 | 91 | 85 | 91 | 85 | 89 | 92 | 85 | 90 |
| | | Rebound resilience (%) | | 60 | 62 | 59 | 60 | 61 | 59 | 62 | 60 | 59 | 61 |
| | | Radius of ion association $R_1$ (nm) | | 0.54 | 0.64 | 0.71 | 0.64 | 0.85 | 0.62 | 0.78 | 0.77 | 0.61 | 0.82 |

TABLE 6-continued

| | | Golf ball No. | | | | | | | | | |
|---|---|---|---|---|---|---|---|---|---|---|---|
| | | B24 | B25 | B26 | B27 | B28 | B29 | B30 | B31 | B32 | B33 |
| | Radius of ion cluster $R_{ca}$ (nm) | 1.41 | 1.39 | 1.58 | 1.57 | 2.09 | 1.38 | 1.46 | 1.61 | 1.70 | 1.99 |
| | Volume of ion association $V_p$ (nm$^3$) | 14.1 | 13.2 | 12.8 | 7.9 | 11.6 | 13.6 | 11.5 | 13.0 | 8.3 | 11.8 |
| | Thickness of constrained layer (nm) | 0.87 | 0.75 | 0.87 | 0.93 | 1.24 | 0.76 | 0.68 | 0.84 | 1.09 | 1.17 |
| Golf ball evaluation | Compression deformation amount (mm) | 2.4 | 2.4 | 2.4 | 2.3 | 2.4 | 2.4 | 2.4 | 2.4 | 2.3 | 2.4 |
| | Coefficient of restitution (40 m/s) | 0.737 | 0.761 | 0.758 | 0.711 | 0.704 | 0.724 | 0.753 | 0.728 | 0.698 | 0.681 |

Nucrel AN4319: ethylene-methacrylic acid-butyl methacrylate copolymer (amount of methacrylic acid: 8 mass %, MFR (190° C., 2.16 kgf): 55 g) available from Mitsui-Du Pont Polychemicals Co., Ltd.
Nucrel N1560: ethylene-methacrylic acid copolymer (amount of methacrylic acid: 15 mass %, MFR (190° C., 2.16 kgf): 60 g) available from Mitsui-Du Pont Polychemicals Co., Ltd.
Himilan (registered trademark) AM7311: magnesium ion-neutralized product of a binary copolymer composed of an olefin and an α,β-unsaturated carboxylic acid having 3 to 8 carbon atoms (acid amount in copolymer: 15 mass %, neutralization degree: 50 mole %) available from Mitsui-Du Pont Polychemicals Co., Ltd.
Oleic acid: available from Tokyo Chemical Industry Co., Ltd.
Linoleic acid: available from Tokyo Chemical Industry Co., Ltd.
Lauric acid: available from Tokyo Chemical Industry Co., Ltd.
Palmitic acid: available from Tokyo Chemical Industry Co., Ltd.
Stearic acid: available from Tokyo Chemical Industry Co., Ltd.
Behenic acid: available from Tokyo Chemical Industry Co., Ltd.
Oleylbetaine: purified product obtained by removing water and salt from "Chembetaine OL" (oleyldimethylaminoacetic acid betaine) available from The Lubrizol Corporation
Sodium carbonate: available from Tokyo Chemical Industry Co., Ltd.
Magnesium hydroxide: available from Wako Pure Chemical Industries, Ltd.

The golf ball resin compositions No. B1 to No. B21 contain an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer) as a resin component, wherein the constrained layer has an average thickness ranging from 0.04 nm to 0.50 nm. These golf ball resin compositions have a high rebound resilience.

The golf ball resin compositions No. B22 to No. B33 are the cases where the constrained layer has an average thickness of more than 0.50 nm. These golf ball resin compositions have a poor rebound resilience. It is noted that although the golf ball resin compositions No. B24 to No. B33 have the same formulation as the golf ball resin compositions No. B2, No. B6, No. B8, No. B13 and No. B20, respectively, the constrained layer thereof has an average thickness of more than 0.50 nm since they were manufactured in a different process.

[Preparation of Golf Ball Resin Composition of Third Embodiment]
Golf Ball Resin Compositions No. C1 to No. C23, and No. C26
According to the formulations shown in Tables 7 and 8, the component (a1-1), the component (a1-2) or the component (a2-1), and the component (b1), the component (b2) and/or the component (b3) were added into a kneader, and kneaded at 180° C. for 30 minutes. Then, the component (c) was charged therein, and further kneaded at 220° C. for 40 minutes to prepare golf ball resin compositions. The golf ball resin compositions were pelletized with an extruder.
Golf Ball Resin Compositions No. C24 and No. C25
According to the formulations shown in Table 8, the component (a2-1) and the component (c) were added into a kneader, and kneaded at 220° C. for 60 minutes to prepare golf ball resin compositions. The golf ball resin compositions were pelletized with an extruder.
Golf Ball Resin Compositions No. C27 to No. C31
According to the formulations shown in Table 9, all the materials were simultaneously added into a kneader, and kneaded at 220° C. for 60 minutes to prepare golf ball resin compositions. The golf ball resin compositions were pelletized with an extruder. It is noted that the intermediate layers of the golf balls No. C27 to No. C31 have the same formulation as the intermediate layers of the golf balls No. C2, No. C8, No. C10, No. C15 and No. C22, respectively.
Golf Ball Resin Compositions No. C32 to No. C36
According to the formulations shown in Table 9, the component (b1), the component (b2) and/or the component (b3), and the component (c) were added into a kneader, and kneaded at 140° C. for 30 minutes. After the obtained solid was pulverized with a mortar, the component (a1-1) or the component (a2-1) was charged therein, and kneaded at 220° C. for 40 minutes to prepare golf ball resin compositions. The golf ball resin compositions were pelletized with an extruder. It is noted that the golf ball resin compositions No. C32 to No. C36 have the same formulation as the golf ball resin compositions No. C2, No. C8, No. C10, No. C15 and No. C22, respectively.

Figure 10:
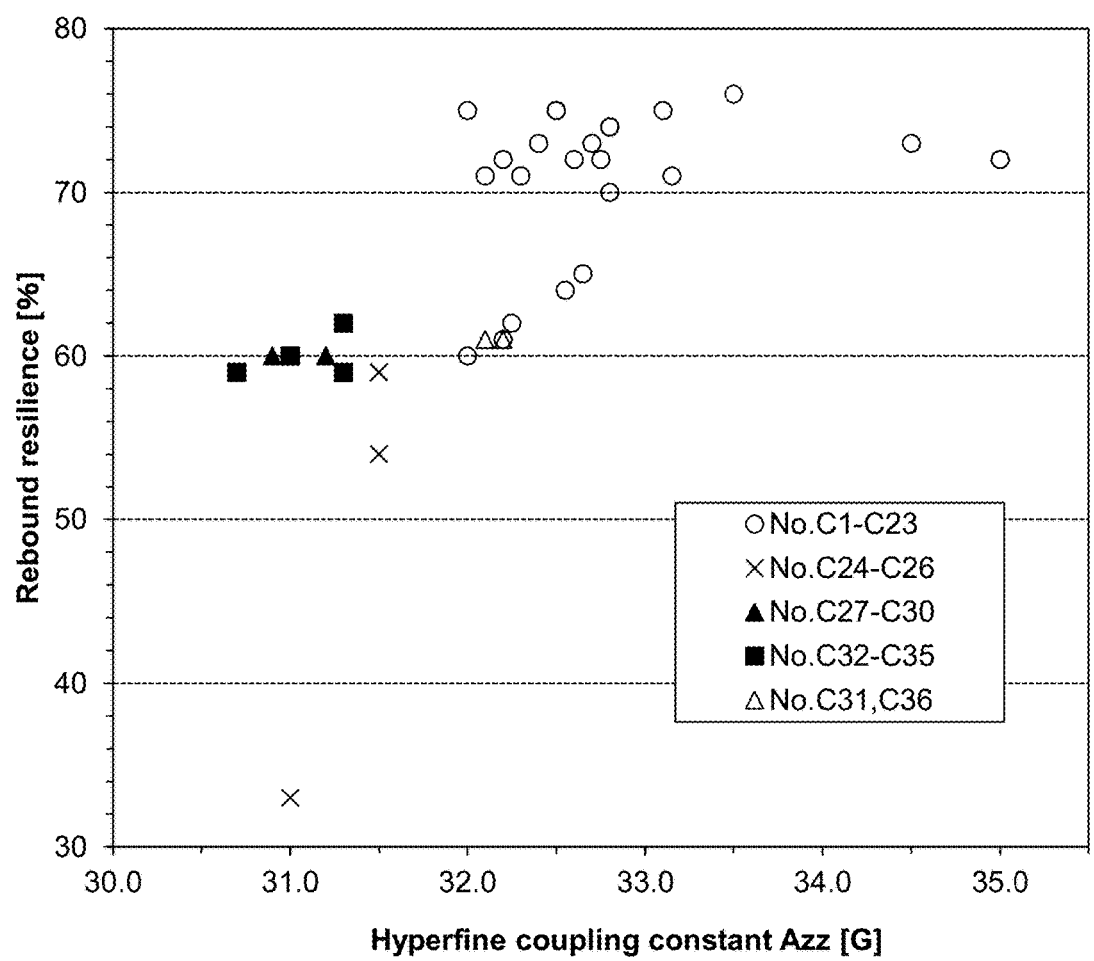
FIG. 10 is a graph showing a relationship between a hyperfine coupling constant ($A_{zz}$) and a rebound resilience of a golf ball resin composition of the third embodiment.
Figure 11:
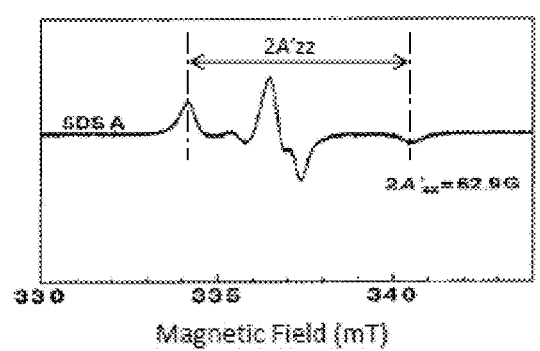
FIG. 11 is an ESR spectrum of the golf ball resin composition No. C24.

Evaluation results of the golf ball resin compositions are shown in Tables 7 to 9. The relationship between the hyperfine coupling constant ($A_{zz}$) and the rebound resilience of each golf ball resin composition is shown in FIG. 10. In addition, the ESR spectrum of the golf ball resin composition No. C24 is shown in FIG. 11.

TABLE 7

| | | | | Golf ball No. | | | | | | |
|---|---|---|---|---|---|---|---|---|---|---|
| | | | | C1 | C2 | C3 | C4 | C5 | C6 | C7 |
| Intermediate layer | Golf ball resin composition No. | | | c1 | c2 | c3 | c4 | c5 | c6 | c7 |
| | Formulation (parts by mass) | (a2-1) | Nucrel AN4319 | 100 | 100 | 100 | 100 | 100 | 100 | 100 |
| | | (a1-1) | Nucrel N1560 | — | — | — | — | — | — | — |
| | | (a1-2) | Himilan AM7311 | — | — | — | — | — | — | — |
| | | (b3) | Oleic acid | 30 | 70 | — | — | — | — | — |
| | | | Linoleic acid | — | — | — | — | — | — | — |
| | | (b2) | Lauric acid | — | — | — | — | — | — | — |
| | | | Palmitic acid | — | — | — | — | — | — | — |
| | | | Stearic acid | — | — | 30 | 70 | — | — | — |
| | | | Behenic acid | — | — | — | — | 30 | — | — |
| | | | Isostearic acid | — | — | — | — | — | — | — |
| | | (b1) | Oleylbetaine | — | — | — | — | — | 30 | 70 |
| | | (c) | Sodium carbonate | — | — | — | — | — | — | — |
| | | | Magnesium hydroxide | 8.1 | 13.6 | 11.6 | 13.8 | 7.4 | 6.9 | 9.5 |
| | Properties | | Acid amount in copolymer (mass %) | 8 | 8 | 8 | 8 | 8 | 8 | 8 |
| | | | Total neutralization degree (mole %) | 140 | 140 | 200 | 140 | 140 | 180 | 180 |
| | | | MFR (g/10 min) | 4.8 | 13.2 | 1.9 | 12.0 | 2.9 | 0.5 | 0.2 |
| | | | Slab hardness (Shore C) | 74 | 74 | 82 | 83 | 87 | 75 | 72 |
| | | | Rebound resilience (%) | 64 | 65 | 60 | 62 | 61 | 75 | 72 |
| | | | Hyperfine coupling constant $A_{zz}$ (G) | 32.6 | 32.7 | 32.0 | 32.3 | 32.2 | 32.5 | 32.6 |
| Golf ball evaluation | | | Compression deformation amount (mm) | 2.6 | 2.6 | 2.5 | 2.5 | 2.4 | 2.6 | 2.7 |
| | | | Coefficient of restitution (40 m/s) | 0.809 | 0.820 | 0.767 | 0.788 | 0.778 | 0.925 | 0.894 |

| | | | | Golf ball No. | | | | | | |
|---|---|---|---|---|---|---|---|---|---|---|
| | | | | C8 | C9 | C10 | C11 | C12 | C13 | C14 |
| Intermediate layer | Golf ball resin composition No. | | | c8 | c9 | c10 | c11 | c12 | c13 | c14 |
| | Formulation (parts by mass) | (a2-1) | Nucrel AN4319 | — | — | — | — | — | — | — |
| | | (a1-1) | Nucrel N1560 | 100 | 100 | 100 | 100 | 100 | 100 | 100 |
| | | (a1-2) | Himilan AM7311 | — | — | — | — | — | — | — |
| | | (b3) | Oleic acid | 90 | 100 | 100 | 100 | 70 | 100 | 100 |
| | | | Linoleic acid | — | — | — | — | — | — | — |
| | | (b2) | Lauric acid | — | — | — | — | — | — | — |
| | | | Palmitic acid | — | — | — | — | — | — | — |
| | | | Stearic acid | — | — | — | — | — | — | — |
| | | | Behenic acid | — | 30 | 10 | 30 | 50 | 30 | 30 |
| | | | Isostearic acid | — | — | — | — | — | — | — |
| | | (b1) | Oleylbetaine | 5 | — | 5 | 5 | 5 | 20 | 30 |
| | | (c) | Sodium carbonate | — | — | — | — | — | — | — |
| | | | Magnesium hydroxide | 17.3 | 18.5 | 19.6 | 21.7 | 19.9 | 21.7 | 21.7 |
| | Properties | | Acid amount in copolymer (mass %) | 15 | 15 | 15 | 15 | 15 | 15 | 15 |
| | | | Total neutralization degree (mole %) | 120 | 120 | 120 | 120 | 120 | 119 | 118 |
| | | | MFR (g/10 min) | 3.6 | 4.5 | 3.7 | 3.9 | 4.2 | 3.3 | 2.5 |
| | | | Slab hardness (Shore C) | 84 | 86 | 83 | 84 | 86 | 80 | 77 |
| | | | Rebound resilience (%) | 73 | 70 | 74 | 74 | 75 | 75 | 76 |
| | | | Hyperfine coupling constant $A_{zz}$ (G) | 32.7 | 32.8 | 32.8 | 32.8 | 32.0 | 32.5 | 33.5 |
| Golf ball evaluation | | | Compression deformation amount (mm) | 2.5 | 2.5 | 2.5 | 2.5 | 2.4 | 2.5 | 2.6 |
| | | | Coefficient of restitution (40 m/s) | 0.904 | 0.890 | 0.915 | 0.915 | 0.925 | 0.925 | 0.936 |

TABLE 8

| | | | | Golf ball No. | | | | | |
|---|---|---|---|---|---|---|---|---|---|
| | | | | C15 | C16 | C17 | C18 | C19 | C20 |
| Intermediate layer | Golf ball resin composition No. | | | c15 | c16 | c17 | c18 | c19 | c20 |
| | Formulation (parts by mass) | (a2-1) | Nucrel AN4319 | 100 | — | — | — | — | — |
| | | (a1-1) | Nucrel N1560 | — | 100 | — | — | — | — |
| | | (a1-2) | Himilan AM7311 | — | — | 100 | 100 | 100 | 100 |
| | | (b3) | Oleic acid | 100 | 100 | — | 100 | 100 | 100 |
| | | | Linoleic acid | — | — | 100 | — | — | — |
| | | (b2) | Lauric acid | — | — | — | 30 | — | — |

TABLE 8-continued

|  |  |  |  |  |  |  |  |  |
|---|---|---|---|---|---|---|---|---|
|  |  |  | Palmitic acid | — | — | — | — | 30 | — |
|  |  |  | Stearic acid | — | — | — | — | — | 30 |
|  |  |  | Behenic acid | 30 | 30 | 30 | — | — | — |
|  |  |  | Isostearic acid | — | — | — | — | — | — |
|  |  | (b1) | Oleylbetaine | 5 | 5 | 5 | 5 | 5 | 5 |
|  |  | (c) | Sodium carbonate | — | — | — | — | — | — |
|  |  |  | Magnesium hydroxide | 25.2 | 16.5 | 21.7 | 23.8 | 22.7 | 21.7 |
|  | Properties |  | Acid amount in copolymer (mass %) | 8 | 15 | 15 | 15 | 15 | 15 |
|  |  |  | Total neutralization degree (mole %) | 160 | 120 | 120 | 120 | 120 | 120 |
|  |  |  | MFR (g/10 min) | 4.2 | 4.2 | 4.1 | 4.6 | 4.4 | 4.2 |
|  |  |  | Slab hardness (Shore C) | 81 | 81 | 86 | 88 | 86 | 85 |
|  |  |  | Rebound resilience (%) | 71 | 71 | 72 | 71 | 72 | 73 |
|  |  |  | Hyperfine coupling constant $A_{zz}$ (G) | 32.1 | 32.3 | 32.8 | 33.2 | 32.2 | 32.4 |
| Golf ball evaluation |  |  | Compression deformation amount (mm) | 2.5 | 2.6 | 2.4 | 2.4 | 2.4 | 2.5 |
|  |  |  | Coefficient of restitution (40 m/s) | 0.883 | 0.933 | 0.894 | 0.883 | 0.894 | 0.904 |

|  |  |  |  | Golf ball No. |
|---|---|---|---|---|
|  |  |  |  | C21 | C22 | C23 | C24 | C25 | C26 |
| Intermediate layer | Golf ball resin composition No. |  |  | c21 | c22 | c23 | c24 | c25 | c26 |
|  | Formulation | (a2-1) | Nucrel AN4319 | — | — | — | 100 | 100 | 100 |
|  | (parts by mass) | (a1-1) | Nucrel N1560 | 100 | 100 | 100 | — | — | — |
|  |  | (a1-2) | Himilan AM7311 | — | — | — | — | — | — |
|  |  | (b3) | Oleic acid | 100 | 100 | 100 | — | — | — |
|  |  |  | Linoleic acid | — | — | — | — | — | — |
|  |  | (b2) | Lauric acid | — | — | — | — | — | — |
|  |  |  | Palmitic acid | — | — | — | — | — | — |
|  |  |  | Stearic acid | — | — | — | — | — | — |
|  |  |  | Behenic acid | 30 | 30 | 30 | — | — | — |
|  |  |  | Isostearic acid | — | — | — | — | — | 30 |
|  |  | (b1) | Oleylbetaine | 5 | 5 | 5 | — | — | — |
|  |  | (c) | Sodium carbonate | — | 39.4 | 66.1 | — | — | — |
|  |  |  | Magnesium hydroxide | 32.7 | — | — | 4.3 | 9.0 | 11.6 |
|  | Properties |  | Acid amount in copolymer (mass %) | 15 | 15 | 15 | 8 | 8 | 8 |
|  |  |  | Total neutralization degree (mole %) | 180 | 120 | 200 | 160 | 332 | 200 |
|  |  |  | MFR (g/10 min) | 2.3 | 4.7 | 2.5 | 0.7 | 0.3 | 2.1 |
|  |  |  | Slab hardness (Shore C) | 88 | 85 | 87 | 77 | 79 | 72 |
|  |  |  | Rebound resilience (%) | 75 | 72 | 73 | 59 | 54 | 33 |
|  |  |  | Hyperfine coupling constant $A_{zz}$ (G) | 33.1 | 35.0 | 34.5 | 31.5 | 31.5 | 31.0 |
| Golf ball evaluation |  |  | Compression deformation amount (mm) | 2.4 | 2.5 | 2.4 | 2.6 | 2.5 | 2.7 |
|  |  |  | Coefficient of restitution (40 m/s) | 0.925 | 0.894 | 0.904 | 0.757 | 0.704 | 0.483 |

TABLE 9

|  |  |  |  | Golf ball No. |
|---|---|---|---|---|
|  |  |  |  | C27 | C28 | C29 | C30 | C31 | C32 | C33 | C34 | C35 | C36 |
| Intermediate layer | Golf ball resin composition No. |  |  | c27 | c28 | c29 | c30 | c31 | c32 | c33 | c34 | c35 | c36 |
|  | Formulation | (a2-1) | Nucrel AN4319 | 100 | — | — | 100 | — | 100 | — | — | 100 | — |
|  | (parts by mass) | (a1-1) | Nucrel N1560 | — | 100 | 100 | — | 100 | — | 100 | 100 | — | 100 |
|  |  | (a1-2) | Himilan AM7311 | — | — | — | — | — | — | — | — | — | — |
|  |  | (b3) | Oleic acid | 70 | 90 | 100 | 100 | 100 | 70 | 90 | 100 | 100 | 100 |
|  |  |  | Linoleic acid | — | — | — | — | — | — | — | — | — | — |
|  |  | (b2) | Lauric acid | — | — | — | — | — | — | — | — | — | — |
|  |  |  | Palmitic acid | — | — | — | — | — | — | — | — | — | — |
|  |  |  | Stearic acid | — | — | — | — | — | — | — | — | — | — |
|  |  |  | Behenic acid | — | — | 10 | 30 | 30 | — | — | 10 | 30 | 30 |
|  |  |  | Isostearic acid | — | — | — | — | — | — | — | — | — | — |
|  |  | (b1) | Oleylbetaine | — | 5 | 5 | 5 | 5 | — | 5 | 5 | 5 | 5 |
|  |  | (c) | Sodium carbonate | — | — | — | — | 39.4 | — | — | — | — | 39.4 |
|  |  |  | Magnesium hydroxide | 13.9 | 17.3 | 19.6 | 25.2 | — | 13.9 | 17.3 | 19.6 | 25.2 | — |
|  | Properties |  | Acid amount in copolymer (mass %) | 8 | 15 | 15 | 8 | 15 | 8 | 15 | 15 | 8 | 15 |

TABLE 9-continued

| | | Golf ball No. | | | | | | | | | |
|---|---|---|---|---|---|---|---|---|---|---|---|
| | | C27 | C28 | C29 | C30 | C31 | C32 | C33 | C34 | C35 | C36 |
| | Total neutralization degree (mole %) | 140 | 120 | 120 | 160 | 120 | 140 | 120 | 120 | 160 | 120 |
| | MFR (g/10 min) | 13.1 | 3.5 | 3.7 | 4.2 | 4.6 | 13.2 | 3.5 | 3.5 | 4.3 | 4.4 |
| | Slab hardness (Shore C) | 86 | 90 | 91 | 85 | 91 | 85 | 89 | 92 | 85 | 90 |
| | Rebound resilience (%) | 60 | 62 | 59 | 60 | 61 | 59 | 62 | 60 | 59 | 61 |
| | Hyperfine coupling constant $A_{zz}$ (G) | 31.2 | 31.3 | 31.3 | 30.9 | 32.1 | 31.3 | 31.3 | 31.0 | 30.7 | 32.2 |
| Golf ball evaluation | Compression deformation amount (mm) | 2.4 | 2.4 | 2.4 | 2.3 | 2.4 | 2.4 | 2.4 | 2.4 | 2.3 | 2.4 |
| | Coefficient of restitution (40 m/s) | 0.737 | 0.761 | 0.758 | 0.711 | 0.704 | 0.724 | 0.753 | 0.728 | 0.698 | 0.681 |

Nucrel AN4319: ethylene-methacrylic acid-butyl methacrylate copolymer (amount of methacrylic acid: 8 mass %, MFR (190° C., 2.16 kgf): 55 g) available from Mitsui-Du Pont Polychemicals Co., Ltd.
Nucrel N1560: ethylene-methacrylic acid copolymer (amount of methacrylic acid: 15 mass %, MFR (190° C., 2.16 kgf): 60 g) available from Mitsui-Du Pont Polychemicals Co., Ltd.
Himilan (registered trademark) AM7311: magnesium ion-neutralized product of a binary copolymer composed of an olefin and an α,β-unsaturated carboxylic acid having 3 to 8 carbon atoms (acid amount in copolymer: 15 mass %, neutralization degree: 50 mole %) available from Mitsui-Du Pont Polychemicals Co., Ltd.
Oleic acid: available from Tokyo Chemical Industry Co., Ltd.
Linoleic acid: available from Tokyo Chemical Industry Co., Ltd.
Lauric acid: available from Tokyo Chemical Industry Co., Ltd.
Palmitic acid: available from Tokyo Chemical Industry Co., Ltd.
Stearic acid: available from Tokyo Chemical Industry Co., Ltd.
Behenic acid: available from Tokyo Chemical Industry Co., Ltd.
Oleylbetaine: purified product obtained by removing water and salt from "Chembetaine OL" (oleyldimethylaminoacetic acid betaine) available from The Lubrizol Corporation
Isostearic acid: 2,2,4,8,10,10-hexamethylundecane-5-carboxylic acid (C18) available from Tokyo Chemical Industry Co., Ltd.
Sodium carbonate: available from Tokyo Chemical Industry Co., Ltd.
Magnesium hydroxide: available from Wako Pure Chemical Industries, Ltd.

The golf ball resin compositions No. C1 to No. C23, No. C31 and No. C 36 contain an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer) as a resin component, wherein the hyperfine coupling constant ($A_{zz}$) measured by ESR ranges from 31.6 G to 35.0 G. These golf balls resin composition have a high rebound resilience.

The golf ball resin compositions No. C24 to No. C30 and No. C32 to No. C35 are the cases where the hyperfine coupling constant ($A_{zz}$) measured by ESR is less than 31.6 G, and thus have a poor rebound resilience. It is noted that although the golf ball resin compositions No. C27 to No. C36 have the same formulation as the golf ball resin compositions No. C2, No. C8, No. C10, No. C15 and No. C22, respectively, the hyperfine coupling constant ($A_{zz}$) thereof is different since they were manufactured in a different process.

[Preparation of Golf Ball Resin Composition of Fourth Embodiment]
Golf Ball Resin Compositions No. D1 to No. D23, and No. D26

According to the formulations shown in Tables 10 and 11, the component (a1-1), the component (a1-2) or the component (a2-1), and the component (b1), the component (b2) and/or the component (b3) were added into a kneader, and kneaded at 180° C. for 30 minutes. Then, the component (c) was charged therein, and further kneaded at 220° C. for 40 minutes to prepare golf ball resin compositions. The golf ball resin compositions were pelletized with an extruder.
Golf Ball Resin Compositions No. D24 and No. D25

According to the formulations shown in Table 11, the component (a2-1) and the component (c) were added into a kneader, and kneaded at 220° C. for 60 minutes to prepare golf ball resin compositions. The golf ball resin compositions were pelletized with an extruder.
Golf Ball Resin Compositions No. D27 to No. D31

According to the formulations shown in Table 12, all the materials were simultaneously added into a kneader, and kneaded at 220° C. for 60 minutes to prepare golf ball resin compositions. The golf ball resin compositions were pelletized with an extruder. It is noted that the intermediate layers of the golf balls No. D27 to No. D31 have the same formulation as the intermediate layers of the golf balls No. D2, No. D8, No. D10, No. D15 and No. D22, respectively.
Golf Ball Resin Compositions No. D32 to No. D36

According to the formulations shown in Table 12, the component (b1), the component (b2) and/or the component (b3), and the component (c) were added into a kneader, and kneaded at 140° C. for 30 minutes. After the obtained solid was pulverized with a mortar, the component (a1-1) or the component (a2-1) was charged therein, and kneaded at 220° C. for 40 minutes to prepare golf ball resin compositions. The golf ball resin compositions were pelletized with an extruder. It is noted that the golf ball resin compositions No. D32 to No. D36 have the same formulation as the golf ball resin compositions No. D2, No. D8, No. D10, No. D15 and No. D22, respectively.

Figure 12:
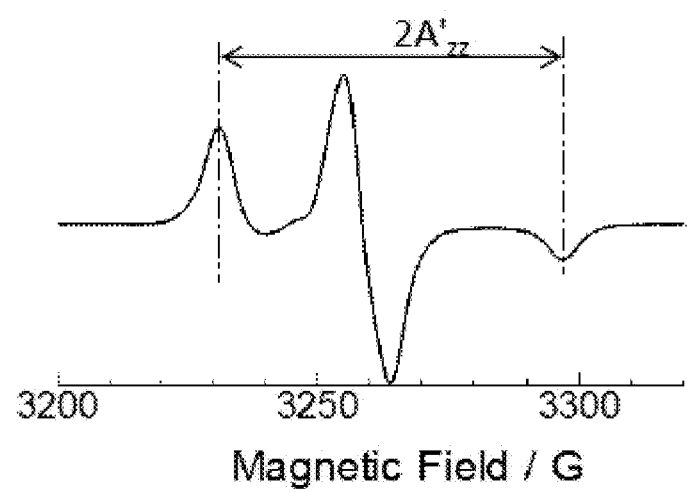
FIG. 12 is an ESR spectrum (spin probe: 10DND, measuring temperature: 120° C.) of the golf ball resin composition No. D3.
Figure 13:
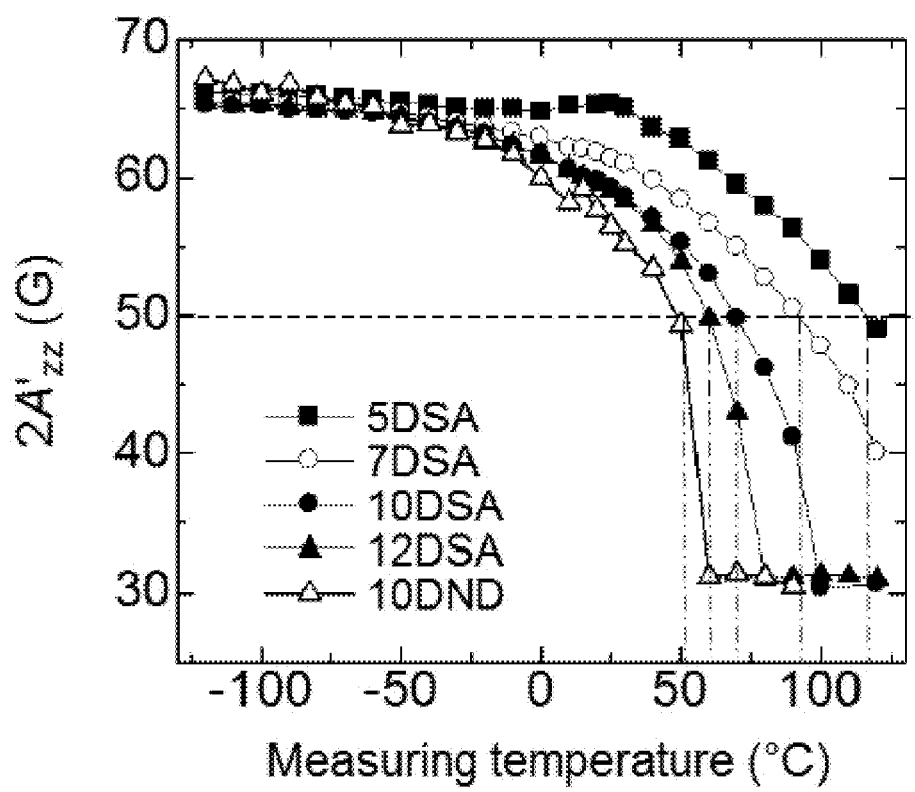
FIG. 13 is a graph showing a relationship between a motion parameter ($2A'_{zz}$) and a temperature of the golf ball resin composition No. D3.
Figure 14:
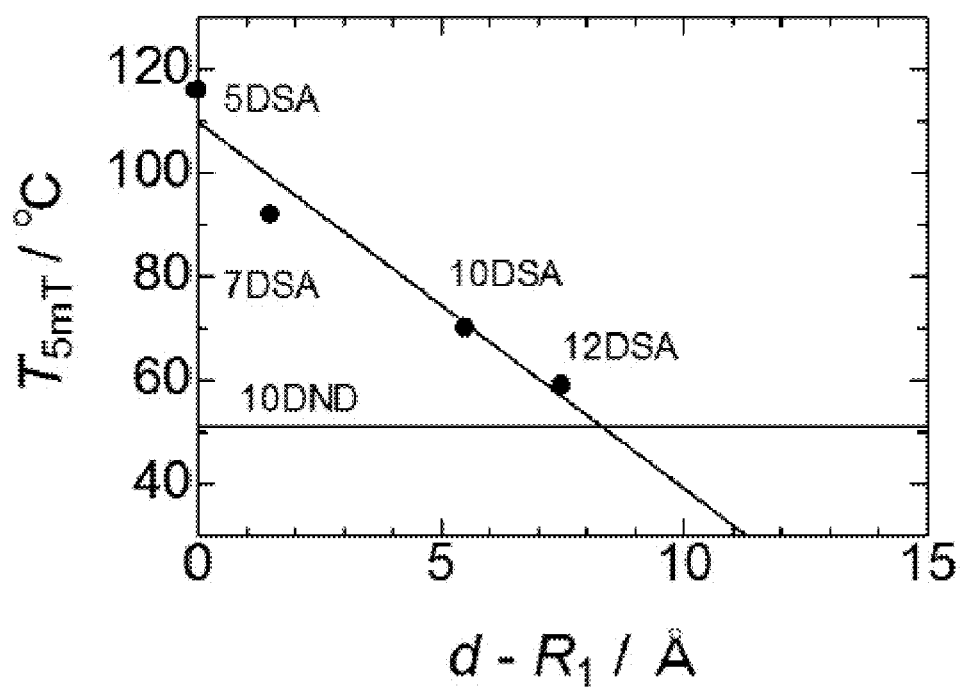
FIG. 14 is a graph showing a relationship between a temperature ($T_{5\ mT}$) and a distance ($d\text{-}R_1$) of the golf ball resin composition No. D3.
Figure 15:
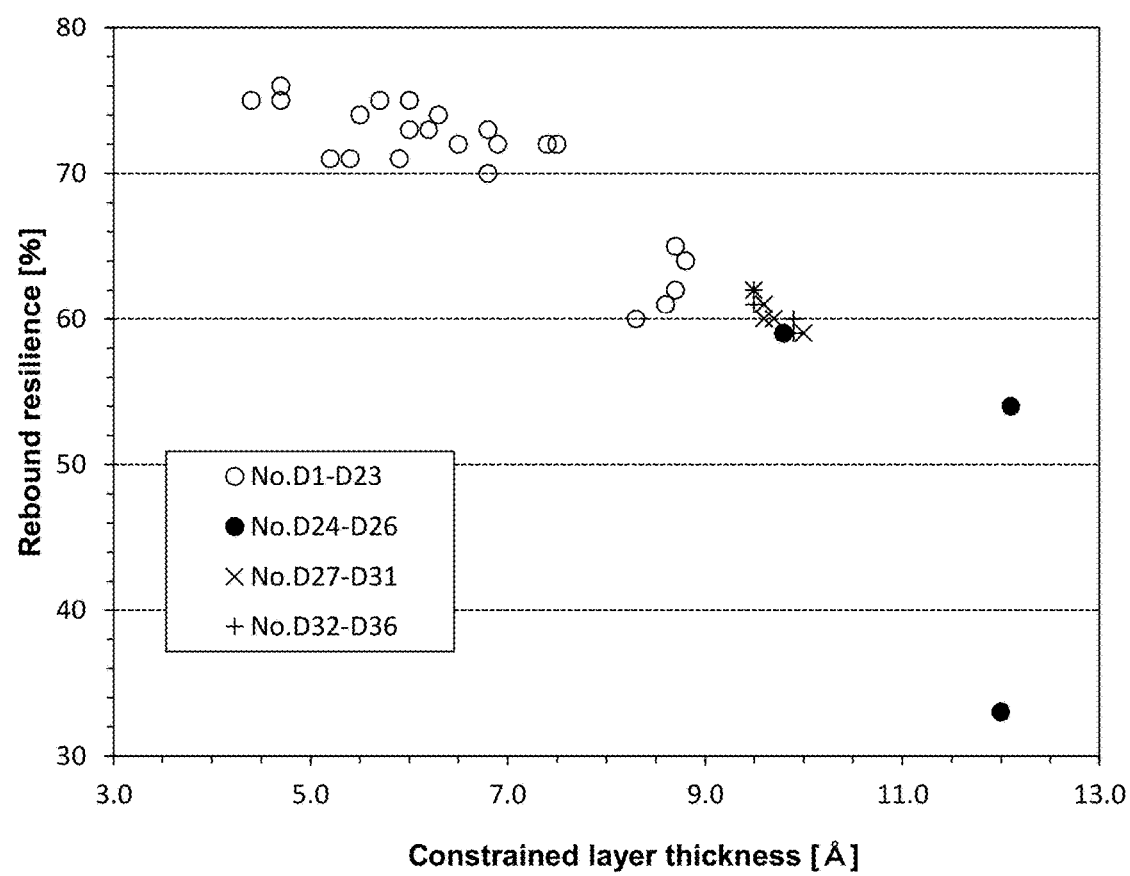
FIG. 15 is a graph showing a relationship between a constrained layer thickness and a rebound resilience of a golf ball resin composition of the fourth embodiment.

Evaluation results of the golf ball resin compositions are shown in Tables 10 to 12. As one example, regarding the golf ball resin composition No. D3, the ESR spectrum (spin probe: 10DND, measuring temperature: 120° C.) is shown in FIG. 12, the relationship between the motion parameter ($2A'_{zz}$) and the temperature is shown in FIG. 13, and the relationship between the temperature ($T_{5\ mT}$) and the distance (d-$R_1$) is shown in FIG. 14. As shown in FIG. 12, the motion parameter ($2A'_{zz}$) can be obtained from the ESR spectrum. The curve obtained by plotting the motion parameter ($2A'_{zz}$) at each measuring temperature versus the temperature is shown in FIG. 13. As shown in FIG. 13, for the measuring sample using 10DND as the spin probe, the motion parameter ($2A'_{zz}$) shows a sudden drop from the vicinity of 50 G. In FIG. 13, the temperature ($T_{5\ mT}$) of each probe position is 5DSA=118.0° C., 7DSA=82.3° C., 10DSA=70.8° C., 12DSA=58.0° C., 10DND=51.3° C. The curve obtained by plotting the temperature ($T_{5\ mT}$) of each probe position (5DSA, 7DSA, 10DSA, 12DSA) versus the distance (d-$R_1$) from the surface of the ion association is shown in FIG. 14. In FIG. 14, on the linear approximation curve obtained from the plot of each probe position (5DSA, 7DSA, 10DSA, 12DSA) by a least square method, the distance (d-$R_1$) (8.3 Å in FIG. 14) corresponding to the temperature ($T_{5\ mT}$) of the probe position (10DND) is the thickness of the constrained layer. The relationship between the constrained layer thickness and the rebound resilience of each golf ball resin composition is shown in FIG. 15.

TABLE 10

| | | | | Golf ball No. | | | | | | |
|---|---|---|---|---|---|---|---|---|---|---|
| | | | | D1 | D2 | D3 | D4 | D5 | D6 | D7 |
| Intermediate layer | Golf ball resin composition No. | | | d1 | d2 | d3 | d4 | d5 | d6 | d7 |
| | Formulation (parts by mass) | (a2-1) | Nucrel AN4319 | 100 | 100 | 100 | 100 | 100 | 100 | 100 |
| | | (a1-1) | Nucrel N1560 | — | — | — | — | — | — | — |
| | | (a1-2) | Himilan AM7311 | — | — | — | — | — | — | — |
| | | (b3) | Oleic acid | 30 | 70 | — | — | — | — | — |
| | | | Linoleic acid | — | — | — | — | — | — | — |
| | | (b2) | Lauric acid | — | — | — | — | — | — | — |
| | | | Palmitic acid | — | — | — | — | — | — | — |
| | | | Stearic acid | — | — | 30 | 70 | — | — | — |
| | | | Behenic acid | — | — | — | — | 30 | — | — |
| | | | Isostearic acid | — | — | — | — | — | — | — |
| | | (b1) | Oleylbetaine | — | — | — | — | — | 30 | 70 |
| | | (c) | Sodium carbonate | — | — | — | — | — | — | — |
| | | | Magnesium hydroxide | 8.1 | 13.9 | 11.6 | 13.8 | 7.4 | 6.9 | 9.5 |
| | Properties | | Acid amount in copolymer (mass %) | 8 | 8 | 8 | 8 | 8 | 8 | 8 |
| | | | Total neutralization degree (mole %) | 140 | 140 | 200 | 140 | 140 | 180 | 180 |
| | | | MFR (g/10 min) | 4.8 | 13.2 | 1.9 | 12.0 | 2.9 | 0.5 | 0.2 |
| | | | Slab hardness (Shore C) | 74 | 74 | 82 | 83 | 87 | 75 | 72 |
| | | | Rebound resilience (%) | 64 | 65 | 60 | 62 | 61 | 75 | 72 |
| | | | Thickness of constrained layer (Å) | 8.8 | 8.7 | 8.3 | 8.7 | 8.6 | 6.0 | 6.5 |
| Golf ball evaluation | | | Compression deformation amount (mm) | 2.6 | 2.6 | 2.5 | 2.5 | 2.4 | 2.6 | 2.7 |
| | | | Coefficient of restitution (40 m/s) | 0.809 | 0.820 | 0.767 | 0.788 | 0.778 | 0.925 | 0.894 |

| | | | | Golf ball No. | | | | | | |
|---|---|---|---|---|---|---|---|---|---|---|
| | | | | D8 | D9 | D10 | D11 | D12 | D13 | D14 |
| Intermediate layer | Golf ball resin composition No. | | | d8 | d9 | d10 | d11 | d12 | d13 | d14 |
| | Formulation (parts by mass) | (a2-1) | Nucrel AN4319 | — | — | — | — | — | — | — |
| | | (a1-1) | Nucrel N1560 | 100 | 100 | 100 | 100 | 100 | 100 | 100 |
| | | (a1-2) | Himilan AM7311 | — | — | — | — | — | — | — |
| | | (b3) | Oleic acid | 90 | 100 | 100 | 100 | 70 | 100 | 100 |
| | | | Linoleic acid | — | — | — | — | — | — | — |
| | | (b2) | Lauric acid | — | — | — | — | — | — | — |
| | | | Palmitic acid | — | — | — | — | — | — | — |
| | | | Stearic acid | — | — | — | — | — | — | — |
| | | | Behenic acid | — | 30 | 10 | 30 | 50 | 30 | 30 |
| | | | Isostearic acid | — | — | — | — | — | — | — |
| | | (b1) | Oleylbetaine | 5 | — | 5 | 5 | 5 | 20 | 30 |
| | | (c) | Sodium carbonate | — | — | — | — | — | — | — |
| | | | Magnesium hydroxide | 17.3 | 18.5 | 19.6 | 21.7 | 19.9 | 21.7 | 21.7 |
| | Properties | | Acid amount in copolymer (mass %) | 15 | 15 | 15 | 15 | 15 | 15 | 15 |
| | | | Total neutralization degree (mole %) | 120 | 120 | 120 | 120 | 120 | 119 | 118 |
| | | | MFR (g/10 min) | 3.6 | 4.5 | 3.7 | 3.9 | 4.2 | 3.3 | 2.5 |
| | | | Slab hardness (Shore C) | 84 | 86 | 83 | 84 | 86 | 80 | 77 |
| | | | Rebound resilience (%) | 73 | 70 | 74 | 74 | 75 | 75 | 76 |
| | | | Thickness of constrained layer (Å) | 6.2 | 6.8 | 5.5 | 6.3 | 4.4 | 4.7 | 4.7 |
| Golf ball evaluation | | | Compression deformation amount (mm) | 2.5 | 2.5 | 2.5 | 2.5 | 2.4 | 2.5 | 2.6 |
| | | | Coefficient of restitution (40 m/s) | 0.904 | 0.890 | 0.915 | 0.915 | 0.925 | 0.925 | 0.936 |

TABLE 11

|  |  |  |  | Golf ball No. | | | | | |
|---|---|---|---|---|---|---|---|---|---|
|  |  |  |  | D15 | D16 | D17 | D18 | D19 | D20 |
| Intermediate layer | Golf ball resin composition No. | | | d15 | d16 | d17 | d18 | d19 | d20 |
|  | Formulation (parts by mass) | (a2-1) | Nucrel AN4319 | 100 | — | — | — | — | — |
|  |  | (a1-1) | Nucrel N1560 | — | — | 100 | 100 | 100 | 100 |
|  |  | (a1-2) | Himilan AM7311 | — | 100 | — | — | — | — |
|  |  | (b3) | Oleic acid | 100 | 100 | — | 100 | 100 | 100 |
|  |  |  | Linoleic acid | — | — | 100 | — | — | — |
|  |  | (b2) | Lauric acid | — | — | — | 30 | — | — |
|  |  |  | Palmitic acid | — | — | — | — | 30 | — |
|  |  |  | Stearic acid | — | — | — | — | — | 30 |
|  |  |  | Behenic acid | 30 | 30 | 30 | — | — | — |
|  |  |  | Isostearic acid | — | — | — | — | — | — |
|  |  | (b1) | Oleylbetaine | 5 | 5 | 5 | 5 | 5 | 5 |
|  |  | (c) | Sodium carbonate | — | — | — | — | — | — |
|  |  |  | Magnesium hydroxide | 25.2 | 16.5 | 21.7 | 23.8 | 22.7 | 21.7 |
|  | Properties | Acid amount in copolymer (mass %) | | 8 | 15 | 15 | 15 | 15 | 15 |
|  |  | Total neutralization degree (mole %) | | 160 | 120 | 120 | 120 | 120 | 120 |
|  |  | MFR (g/10 min) | | 4.2 | 4.2 | 4.1 | 4.6 | 4.4 | 4.2 |
|  |  | Slab hardness (Shore C) | | 81 | 81 | 86 | 88 | 86 | 85 |
|  |  | Rebound resilience (%) | | 71 | 71 | 72 | 71 | 72 | 73 |
|  |  | Thickness of constrained layer (Å) | | 5.9 | 5.2 | 6.9 | 5.4 | 7.5 | 6.8 |
| Golf ball evaluation | Compression deformation amount (mm) | | | 2.5 | 2.6 | 2.4 | 2.4 | 2.4 | 2.5 |
|  | Coefficient of restitution (40 m/s) | | | 0.883 | 0.933 | 0.894 | 0.883 | 0.894 | 0.904 |

|  |  |  |  | Golf ball No. | | | | | |
|---|---|---|---|---|---|---|---|---|---|
|  |  |  |  | D21 | D22 | D23 | D24 | D25 | D26 |
| Intermediate layer | Golf ball resin composition No. | | | d21 | d22 | d23 | d24 | d25 | d26 |
|  | Formulation (parts by mass) | (a2-1) | Nucrel AN4319 | — | — | — | 100 | 100 | 100 |
|  |  | (a1-1) | Nucrel N1560 | 100 | 100 | 100 | — | — | — |
|  |  | (a1-2) | Himilan AM7311 | — | — | — | — | — | — |
|  |  | (b3) | Oleic acid | 100 | 100 | 100 | — | — | — |
|  |  |  | Linoleic acid | — | — | — | — | — | — |
|  |  | (b2) | Lauric acid | — | — | — | — | — | — |
|  |  |  | Palmitic acid | — | — | — | — | — | — |
|  |  |  | Stearic acid | — | — | — | — | — | — |
|  |  |  | Behenic acid | 30 | 30 | 30 | — | — | — |
|  |  |  | Isostearic acid | — | — | — | — | — | 30 |
|  |  | (b1) | Oleylbetaine | 5 | 5 | 5 | — | — | — |
|  |  | (c) | Sodium carbonate | — | 39.4 | 66.1 | — | — | — |
|  |  |  | Magnesium hydroxide | 32.7 | — | — | 4.3 | 9.0 | 11.6 |
|  | Properties | Acid amount in copolymer (mass %) | | 15 | 15 | 15 | 8 | 8 | 8 |
|  |  | Total neutralization degree (mole %) | | 180 | 120 | 200 | 160 | 332 | 200 |
|  |  | MFR (g/10 min) | | 2.3 | 4.7 | 2.5 | 0.7 | 0.3 | 2.1 |
|  |  | Slab hardness (Shore C) | | 88 | 85 | 87 | 77 | 79 | 72 |
|  |  | Rebound resilience (%) | | 75 | 72 | 73 | 59 | 54 | 33 |
|  |  | Thickness of constrained layer (Å) | | 5.7 | 7.4 | 6.0 | 9.8 | 12.1 | 12.0 |
| Golf ball evaluation | Compression deformation amount (mm) | | | 2.4 | 2.5 | 2.4 | 2.6 | 2.5 | 2.7 |
|  | Coefficient of restitution (40 m/s) | | | 0.925 | 0.894 | 0.904 | 0.757 | 0.704 | 0.483 |

TABLE 12

|  |  |  |  | Golf ball No. | | | | | | | | | |
|---|---|---|---|---|---|---|---|---|---|---|---|---|---|
|  |  |  |  | D27 | D28 | D29 | D30 | D31 | D32 | D33 | D34 | D35 | D36 |
| Intermediate layer | Golf ball resin composition No. | | | d27 | d28 | d29 | d30 | d31 | d32 | d33 | d34 | d35 | d36 |
|  | Formulation (parts by mass) | (a2-1) | Nucrel AN4319 | 100 | — | — | 100 | — | 100 | — | 100 | — | 100 |
|  |  | (a1-1) | Nucrel N1560 | — | 100 | 100 | — | 100 | — | 100 | — | 100 | — |
|  |  | (a1-2) | Himilan AM7311 | — | — | — | — | — | — | — | — | — | — |
|  |  | (b3) | Oleic acid | 70 | 90 | 100 | 100 | 100 | 70 | 90 | 100 | 100 | 100 |
|  |  |  | Linoleic acid | — | — | — | — | — | — | — | — | — | — |

TABLE 12-continued

| | | Golf ball No. | | | | | | | | | |
|---|---|---|---|---|---|---|---|---|---|---|---|
| | | | D27 | D28 | D29 | D30 | D31 | D32 | D33 | D34 | D35 | D36 |
| | (b2) | Lauric acid | — | — | — | — | — | — | — | — | — | — |
| | | Palmitic acid | — | — | — | — | — | — | — | — | — | — |
| | | Stearic acid | — | — | — | — | — | — | — | — | — | — |
| | | Behenic acid | — | — | 10 | 30 | 30 | — | — | 10 | 30 | 30 |
| | | Isostearic acid | — | — | — | — | — | — | — | — | — | — |
| | (b1) | Oleylbetaine | — | 5 | 5 | 5 | 5 | — | 5 | 5 | 5 | 5 |
| | (c) | Sodium carbonate | — | — | — | — | 39.4 | — | — | — | — | 39.4 |
| | | Magnesium hydroxide | 13.9 | 17.3 | 19.6 | 25.2 | — | 13.9 | 17.3 | 19.6 | 25.2 | — |
| Properties | | Acid amount in copolymer (mass %) | 8 | 15 | 15 | 8 | 15 | 8 | 15 | 15 | 8 | 15 |
| | | Total neutralization degree (mole %) | 140 | 120 | 120 | 160 | 120 | 140 | 120 | 120 | 160 | 120 |
| | | MFR (g/10 min) | 13.1 | 3.5 | 3.7 | 4.2 | 4.6 | 13.2 | 3.5 | 3.5 | 4.3 | 4.4 |
| | | Slab hardness (Shore C) | 86 | 90 | 91 | 85 | 91 | 85 | 89 | 92 | 85 | 90 |
| | | Rebound resilience (%) | 60 | 62 | 59 | 60 | 61 | 59 | 62 | 60 | 59 | 61 |
| | | Thickness of constrained layer (Å) | 9.6 | 9.5 | 10.0 | 9.7 | 9.6 | 9.8 | 9.5 | 9.9 | 9.9 | 9.5 |
| Golf ball evaluation | | Compression deformation amount (mm) | 2.4 | 2.4 | 2.4 | 2.3 | 2.4 | 2.4 | 2.4 | 2.4 | 2.3 | 2.4 |
| | | Coefficient of restitution (40 m/s) | 0.737 | 0.761 | 0.758 | 0.711 | 0.704 | 0.724 | 0.753 | 0.728 | 0.698 | 0.681 |

Nucrel AN4319: ethylene-methacrylic acid-butyl methacrylate copolymer (amount of methacrylic acid: 8 mass %, MFR (190° C., 2.16 kgf): 55 g) available from Mitsui-Du Pont Polychemicals Co., Ltd.

Nucrel N1560: ethylene-methacrylic acid copolymer (amount of methacrylic acid: 15 mass %, MFR (190° C., 2.16 kgf): 60 g) available from Mitsui-Du Pont Polychemicals Co., Ltd.

Himilan (registered trademark) AM7311: magnesium ion-neutralized product of a binary copolymer composed of an olefin and an α,β-unsaturated carboxylic acid having 3 to 8 carbon atoms (acid amount in copolymer: 15 mass %, neutralization degree: 50 mole %) available from Mitsui-Du Pont Polychemicals Co., Ltd.

Oleic acid: available from Tokyo Chemical Industry Co., Ltd.

Linoleic acid: available from Tokyo Chemical Industry Co., Ltd.

Lauric acid: available from Tokyo Chemical Industry Co., Ltd.

Palmitic acid: available from Tokyo Chemical Industry Co., Ltd.

Stearic acid: available from Tokyo Chemical Industry Co., Ltd.

Behenic acid: available from Tokyo Chemical Industry Co., Ltd.

Oleylbetaine: purified product obtained by removing water and salt from "Chembetaine OL" (oleyldimethylaminoacetic acid betaine) available from The Lubrizol Corporation Isostearic acid: 2,2,4,8,10,10-hexamethylundecane-5-carboxylic acid (C18) available from Tokyo Chemical Industry Co., Ltd.

Sodium carbonate: available from Tokyo Chemical Industry Co., Ltd.

Magnesium hydroxide: available from Wako Pure Chemical Industries, Ltd.

The golf ball resin compositions No. D1 to No. D23 contain an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer) as a resin component, wherein the constrained layer of the ion association measured by the temperature variable spin probe-electron spin resonance method has an average thickness ranging from 3.0 Å to 9.0 Å. These golf balls resin composition have a high rebound resilience.

The golf ball resin compositions No. D24 to No. D36 are the cases where the constrained layer of the ion association measured by the temperature variable spin probe-electron spin resonance method has an average thickness of more than 9.0 Å, and thus have a poor rebound resilience. It is noted that although the golf ball resin compositions No. D27 to No. D36 have the same formulation as the golf ball resin compositions No. D2, No. D8, No. D10, No. D15 and No. D22, respectively, the average thickness of the constrained layer thereof is different since they were manufactured in a different process.

[Preparation of Golf Ball]

(1) Preparation of Spherical Core

The core rubber composition having the formulation shown in Table 13 was kneaded with a kneading roll, and heat pressed in upper and lower molds, each having a hemispherical cavity, at 170° C. for 20 minutes to obtain a spherical core. It is noted that barium sulfate was appropriately added such that the obtained golf balls have a mass of 45.4 g.

TABLE 13

| | Core | |
|---|---|---|
| | | |
| Formulation (parts by mass) | Polybutadiene rubber | 100 |
| | Zinc acrylate | 30 |
| | Dicumyl peroxide | 0.5 |
| | 2-Thionaphthol | 0.2 |
| | Barium sulfate | Appropriate amount *) |

TABLE 13-continued

| | Core | | |
|---|---|---|---|
| Properties | Diameter (mm) | 39.1 | |
| | Compression deformation amount (mm) | 3.86 | |
| | Center hardness (Shore C) | 59.4 | |
| | Surface hardness (Shore C) | 76.0 | |

*) The amount of barium sulfate was adjusted such that the golf ball has a mass of 45.4 g.
Polybutadiene rubber: "BR730 (cis-bond amount: 95 mass %)" available from JSR Corporation
Zinc acrylate: available from Sigma-Aldrich Co. LLC.
Dicumyl peroxide: available from Tokyo Chemical Industry Co., Ltd.
2-Thionaphthol: available from Tokyo Chemical Industry Co., Ltd.

(2) Preparation of Intermediate Layer

The intermediate layer (thickness: 1 mm) covering the spherical core was formed by injection molding the golf ball resin composition onto the spherical core. The golf ball resin composition was heated to 200° C. to 260° C. at the cylinder part of the injection unit, injected into a mold held under a pressure of 15 MPa, and cooled for 30 seconds. The spherical body having the intermediate layer formed thereon was ejected from the mold.

(3) Preparation of Cover

The cover composition in a pellet form was prepared by mixing the materials having the formulation shown in Table 14 with a twin-screw kneading extruder. Extrusion of the cover composition was carried out under the conditions of screw diameter: 45 mm, screw revolution: 200 rpm and screw L/D=35. The blended materials were heated to 160° C. to 230° C. at the die position of the extruder.

TABLE 14

| | Cover composition | |
|---|---|---|
| Formulation | Thermoplastic polyurethane | 100 |
| (parts by mass) | Titanium oxide | 4 |
| Properties | Slab hardness (Shore C) | 57 |

Thermoplastic polyurethane: Elastollan (registered trademark) XNY85A available from BASF Japan Ltd.
Titanium oxide: A220 available from Ishihara Sangyo Kaisha, Ltd.

When molding the cover, the hold pin was protruded to hold the spherical body having the intermediate layer formed thereon, and the cover composition heated to 260° C. was charged into the mold held under a pressure of 80 ton for 0.3 second, and cooled for 30 seconds. The golf ball bodies were ejected from the mold. The surface of the obtained golf ball bodies was treated with sandblast, marked, and painted with a clear paint. The paint was dried in an oven at 40° C. to obtain golf balls with a diameter of 42.7 mm and a mass of 45.4 g. Evaluation results of the obtained golf balls are shown in Tables 1 to 12.

The intermediate layers of the golf balls No. A4 and No. A7 to No. A24 are formed from a golf ball resin composition containing an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer), wherein the peak top temperature (Ti) ranges from 60° C. to 70° C. These golf balls have an excellent rebound resilience. The golf ball resin composition for forming the intermediate layers of the golf balls No. A1 to No. A3, No. A5, No. A6, and No. A25 to No. A37 has the peak top temperature (Ti) of less than 60° C. These golf balls have a poor rebound resilience.

The intermediate layers of the golf balls No. B1 to No. B21 are formed from a golf ball resin composition containing an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer), wherein the constrained layer of the golf ball composition has an average thickness ranging from 0.04 nm to 0.50 nm. These golf balls have an excellent rebound resilience. The golf ball resin composition for forming the intermediate layers of the golf balls No. B22 to No. B33 has the constrained layer with an average thickness of more than 0.50 nm. These golf balls have a poor rebound resilience.

The intermediate layers of the golf balls No. C1 to No. C23, C31 and C36 are formed from a golf ball resin composition containing an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer), wherein the hyperfine coupling constant ($A_{zz}$) of the golf ball composition ranges from 31.6 G to 35.0 G. These golf balls have an excellent rebound resilience. The golf ball resin composition for forming the intermediate layers of the golf balls No. C24 to No. C30, and No. C32 to No. C35 has the hyperfine coupling constant ($A_{zz}$) of less than 31.6 G. These golf balls have a poor rebound resilience.

The intermediate layers of the golf balls No. D1 to No. D23 are formed from a golf ball resin composition containing an ionomer resin (a magnesium ion-neutralized product of ethylene-methacrylic acid-butyl methacrylate copolymer, a magnesium ion-neutralized product of ethylene-methacrylic acid copolymer, or a sodium ion-neutralized product of ethylene-methacrylic acid copolymer), wherein the ion association of the golf ball composition has a constrained layer with an average thickness ranging from 3.0 Å to 9.0 Å. These golf balls have an excellent rebound resilience. The ion association of the golf ball resin composition for forming the intermediate layers of the golf balls No. D27 to No. B36 has the constrained layer with an average thickness of more than 9.0 Å. These golf balls have a poor rebound resilience.

This application is based on Japanese patent applications No. 2015-225654, No. 2015-225655, No. 2015-225656 and No. 2015-225657, filed on Nov. 18, 2015, the contents of which are hereby incorporated by reference.

The invention claimed is:

1. A golf ball resin composition containing as a resin component:
(A1) a metal ion-neutralized product of a binary copolymer composed of an olefin and an α,β-unsaturated carboxylic acid having 3 to 8 carbon atoms, and/or (A2) a metal ion-neutralized product of a ternary copolymer composed of an olefin, an α,β-unsaturated carboxylic acid having 3 to 8 carbon atoms and an α,β-unsaturated carboxylic acid ester,
wherein the golf ball resin composition is obtained by blending a copolymer composition with (c) a metal compound;
wherein the copolymer composition contains
at least one selected from the group consisting of (a1-1) a binary copolymer composed of an olefin and an α,β-unsaturated carboxylic acid having 3 to 8 carbon atoms, (a1-2) a metal ion-neutralized product of a binary copolymer composed of an olefin and an α,β-unsaturated carboxylic acid having 3 to 8 carbon atoms, (a2-1) a ternary copolymer composed of an olefin, an α,β-unsaturated carboxylic acid having 3 to 8 carbon atoms and an α,β-unsaturated carboxylic acid ester, and (a2-2) a metal ion-neutralized product of a ternary copolymer composed of an olefin, an α,β-unsaturated carboxylic acid having 3 to 8 carbon atoms and an α,β-unsaturated carboxylic acid ester as a resin component, (b1) a betaine type amphoteric surfactant, and at least one selected from the group consisting of (b2) a saturated fatty acid and (b3) an unsaturated fatty acid, and wherein in a DSC measurement (a measuring atmosphere: a nitrogen atmosphere, a measuring temperature range: from −50° C. to 150° C., and a temperature rising rate: 10° C./min) of the golf ball resin composition, a first endothermic peak and a second endothermic peak appear, and a peak top temperature (Ti) of the first endothermic peak is equal to or lower than a peak top temperature (Tm) of the second endothermic peak and the peak top temperature (Ti) ranges from 60° C. to 70° C.

2. The golf ball resin composition according to claim 1, wherein a hyperfine coupling constant ($A_{zz}$) of the golf ball resin composition ranges from 31.6 G to 35.0 G, measured by a spin probe-electron spin resonance method (spin probe: 5-doxylstearic acid).

3. The golf ball resin composition according to claim 2, wherein the resin component contains a divalent metal ion as a metal ion, and the hyperfine coupling constant ($A_{zz}$) ranges from 31.6 G to 33.5 G.

4. The golf ball resin composition according to claim 2, wherein the resin component contains a monovalent metal ion as a metal ion, and the hyperfine coupling constant ($A_{zz}$) ranges from 32.5 G to 35.0 G.

5. The golf ball resin composition according to claim 1, wherein a constrained layer of an ion association of the golf ball resin composition has an average thickness ranging from 3.0 Å to 9.0 Å, measured by a temperature variable spin probe-electron spin resonance method.

6. The golf ball resin composition according to claim 1, wherein a constrained layer of an ion association of the golf ball resin composition has an average thickness ranging from 0.04 nm to 0.50 nm, measured by an X-ray small angle scattering method.

7. The golf ball resin composition according to claim 1, wherein the golf ball resin composition has a total neutralization degree ranging from 50 mole % to 200 mole %.

8. The golf ball resin composition according to claim 1, wherein the peak top temperature (Tm) of the second endothermic peak ranges from 60° C. to 85° C.

9. The golf ball resin composition according to claim 1, wherein the golf ball resin composition has a melt flow rate (190° C., 2.16 kgf) of 1.5 g/10 min or more, and 200 g/10 min or less.

10. A golf ball having a constituent member formed from a golf ball resin composition, wherein the golf ball resin composition contains as a resin component:

(A1) a metal ion-neutralized product of a binary copolymer composed of an olefin and an α,β-unsaturated carboxylic acid having 3 to 8 carbon atoms, and/or (A2) a metal ion-neutralized product of a ternary copolymer composed of an olefin, an α,β-unsaturated carboxylic acid having 3 to 8 carbon atoms and an α,β-unsaturated carboxylic acid ester as a resin component;

wherein the golf ball resin composition is obtained by blending a copolymer composition with (c) a metal compound;

wherein the copolymer composition contains at least one selected from the group consisting of (a1-1) a binary copolymer composed of an olefin and an α,β-unsaturated carboxylic acid having 3 to 8 carbon atoms, (a1-2) a metal ion-neutralized product of a binary copolymer composed of an olefin, an α,β-unsaturated carboxylic acid having 3 to 8 carbon atoms, (a2-1) a ternary copolymer composed of an olefin and an α,β-unsaturated carboxylic acid having 3 to 8 carbon atoms and an α,β-unsaturated carboxylic acid ester, and (a2-2) a metal ion-neutralized product of a ternary copolymer composed of an olefin, an α,β-unsaturated carboxylic acid having 3 to 8 carbon atoms and an α,β-unsaturated carboxylic acid ester as a resin component, (b1) a betaine type amphoteric surfactant, and at least one selected from the group consisting of (b2) a saturated fatty acid and (b3) an unsaturated fatty acid, and wherein in a DSC measurement (a measuring atmosphere: a nitrogen atmosphere, a measuring temperature range: from −50° C. to 150° C., and a temperature rising rate: 10° C./min) of the golf ball resin composition, a first endothermic peak and a second endothermic peak appear, and a peak top temperature (Ti) of the first endothermic peak is equal to or lower than a peak top temperature (Tm) of the second endothermic peak and the peak top temperature (Ti) ranges from 60° C. to 70° C.

11. The golf ball according to claim 10, wherein a hyperfine coupling constant ($A_{zz}$) of the golf ball resin composition ranges from 31.6 G to 35.0 G, measured by a spin probe-electron spin resonance method (spin probe: 5-doxylstearic acid).

12. The golf ball according to claim 11, wherein the resin component contains a divalent metal ion as a metal ion, and the hyperfine coupling constant ($A_{zz}$) ranges from 31.6 G to 33.5 G.

13. The golf ball according to claim 11, wherein the resin component contains a monovalent metal ion as a metal ion, and the hyperfine coupling constant ($A_{zz}$) ranges from 32.5 G to 35.0 G.

14. The golf ball according to claim 10, wherein a constrained layer of an ion association of the golf ball resin composition has an average thickness ranging from 3.0 Å to 9.0 Å, measured by a temperature variable spin probe-electron spin resonance method.

15. The golf ball according to claim 10, wherein a constrained layer of an ion association of the golf ball resin composition has an average thickness ranging from 0.04 nm to 0.50 nm, measured by an X-ray small angle scattering method.

16. The golf ball according to claim 10, wherein the golf ball resin composition has a total neutralization degree ranging from 50 mole % to 200 mole %.

17. The golf ball according to claim 10, wherein the golf ball comprises a core, at least one intermediate layer covering the core, and a cover covering the intermediate layer; and wherein at least one layer of the intermediate layer is formed from the golf ball resin composition.

18. The golf ball according to claim 17, wherein the intermediate layer has a total thickness of 2.5 mm or less.

19. The golf ball according to claim 10, wherein the peak top temperature (Tm) of the second endothermic peak ranges from 60° C. to 85° C.

20. The golf ball according to claim 10, wherein the golf ball resin composition has a melt flow rate (190° C., 2.16 kgf) of 1.5 g/10 min or more, and 200 g/10 min or less.

\* \* \* \* \*